United States Patent
Harper et al.

(10) Patent No.: US 9,313,146 B2
(45) Date of Patent: *Apr. 12, 2016

(54) MANAGING NETWORK BANDWIDTH

(71) Applicant: ShoreTel, Inc., Sunnyvale, CA (US)

(72) Inventors: Jason Harper, Pleasanton, CA (US);
Pramod Madabhushi, Austin, TX (US);
Pascal Crausaz, San Jose, CA (US);
Kent Fritz, Mountain View, CA (US);
Thomas E. Miller, Mountain View, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/161,067

(22) Filed: Jan. 22, 2014

(65) Prior Publication Data

US 2014/0198786 A1 Jul. 17, 2014

Related U.S. Application Data

(63) Continuation of application No. 12/860,784, filed on Aug. 20, 2010, now Pat. No. 8,699,481.

(51) Int. Cl.
*H04L 12/911* (2013.01)
*H04L 29/06* (2006.01)
*H04L 12/913* (2013.01)

(52) U.S. Cl.
CPC ............ *H04L 47/821* (2013.01); *H04L 47/781* (2013.01); *H04L 65/1046* (2013.01); *H04L 65/1069* (2013.01); *H04L 65/80* (2013.01); *H04L 47/724* (2013.01)

(58) Field of Classification Search
CPC .. H04L 47/821; H04L 65/1069; H04L 47/781

USPC ................ 370/352, 230, 252, 465, 229, 238
See application file for complete search history.

(56) References Cited

U.S. PATENT DOCUMENTS 7,072,959 B2 7/2006 Huart
7,260,060 B1 8/2007 Abaye et al.
(Continued)

FOREIGN PATENT DOCUMENTS

KR 1020050002341 1/2005

OTHER PUBLICATIONS

PCT International Search Report and Written Opinion, PCT Application No. PCT/US09/31702, Mar. 3, 2009, 7 pages.
(Continued)

*Primary Examiner* — Parth Patel
(74) *Attorney, Agent, or Firm* — Kilpatrick Townsend & Stockton LLP

(57) ABSTRACT

A system for using one or more via sites to manage network bandwidth, according to one embodiment of the present invention comprises a first call manager at a source site receiving an offer message to connect a call. The offer message includes an endpoint media settings list. The first call manager determines a first filtered media preferences list based on a source media settings list and the endpoint media settings list. The first call manager and transmits an invite message to a second call manager at a first via site. The invite message includes the first filtered media preferences list. The first call manager receives from the second call manager a call settings list that includes a description of the call settings negotiated between the source site, the first via site and a destination site.

20 Claims, 40 Drawing Sheets

(56) References Cited

U.S. PATENT DOCUMENTS

| | | | |
|---|---|---|---|
| 7,738,492 B2* | 6/2010 | Lauwers | H04L 41/0896 370/468 |
| 8,520,541 B2* | 8/2013 | Harper | H04L 41/0896 370/229 |
| 8,699,481 B2* | 4/2014 | Harper | H04L 47/781 370/352 |
| 2003/0084277 A1 | 5/2003 | Przywara | |
| 2005/0083922 A1 | 4/2005 | Takai et al. | |
| 2005/0091392 A1 | 4/2005 | Gesswein et al. | |
| 2005/0193141 A1 | 9/2005 | Jensen | |
| 2006/0013133 A1* | 1/2006 | Peng | H04L 12/5695 370/230 |
| 2006/0109838 A1* | 5/2006 | Smith | H04L 29/06027 370/352 |
| 2006/0256810 A1 | 11/2006 | Yarlagadda | |
| 2006/0291447 A1* | 12/2006 | Siliquini | H04L 29/06027 370/352 |
| 2007/0019544 A1 | 1/2007 | Ashwood Smith et al. | |
| 2007/0116043 A1* | 5/2007 | MeLampy | H04L 12/4625 370/466 |
| 2007/0118881 A1 | 5/2007 | Mitchell et al. | |
| 2007/0140116 A1 | 6/2007 | Vega-Garcia | |
| 2007/0147243 A1* | 6/2007 | He | H04L 12/5695 370/230 |
| 2007/0156440 A1* | 7/2007 | Sorisho | G06Q 30/06 705/1.1 |
| 2007/0206505 A1 | 9/2007 | Forbes et al. | |
| 2007/0258361 A1* | 11/2007 | McEwen | H04L 12/5695 370/229 |
| 2008/0013544 A1 | 1/2008 | Ginde et al. | |
| 2008/0081648 A1* | 4/2008 | Kang | H04M 7/0072 455/500 |
| 2008/0123687 A1 | 5/2008 | Bangalore et al. | |
| 2008/0130563 A1 | 6/2008 | Xu et al. | |
| 2008/0192732 A1 | 8/2008 | Riley et al. | |
| 2009/0028161 A1 | 1/2009 | Fullarton et al. | |
| 2009/0225747 A1* | 9/2009 | Madabhushi | H04M 7/0072 370/352 |
| 2009/0303964 A1* | 12/2009 | Lamer | H04L 29/06027 370/331 |
| 2009/0327499 A1* | 12/2009 | Strickland | H04M 7/0072 709/228 |
| 2010/0044931 A1 | 2/2010 | Harper et al. | |
| 2010/0103851 A1* | 4/2010 | Chintada | H04W 88/04 370/312 |
| 2010/0220745 A1* | 9/2010 | Lauwers | H04L 41/0896 370/468 |
| 2012/0044817 A1* | 2/2012 | Harper | H04L 41/0896 370/252 |
| 2014/0198786 A1* | 7/2014 | Harper | H04L 47/781 370/352 |

OTHER PUBLICATIONS

International Search Report and Written Opinion of International Application No. PCT/US2011/048489, Dec. 22, 2011, 13 pages.
European Supplementary Search Report, Appl. No. 09716587.2, Nov. 3, 2011, 8 pages.
Avaya Communication Manager Network Region Configuration Guide, Jul. 2004, 24 pages.
Mitel 3300 IP Communications Platform, Engineering Guidelines Release 8.0, Jul. 2007, 430 pages.
Mitel 3300 IP Communications Platform, Engineering Guidelines Release 9.01, Sep. 2008, 12 pages.
Non-Final Office Action of Aug. 9, 2012 for U.S. Appl. No. 12/860,784, 29 pages.
Final Office Action of Dec. 6, 2012 for U.S. Appl. No. 12/860,784, 35 pages.
Non-Final Office Action of Mar. 19, 2013 for U.S. Appl. No. 12/860,784, 40 pages.
Final Office Action of Jul. 31, 2013 for U.S. Appl. No. 12/860,784, 42 pages.
Notice of Allowance of Oct. 21, 2013 for U.S. Appl. No. 12/860,784, 22 pages.
Non-Final Office Action of Sep. 6, 2012 for U.S. Appl. No. 12/860,778, 22 pages.
Notice of Allowance of Mar. 27, 2013 for U.S. Appl. No. 12/860,778, 16 pages.

* cited by examiner

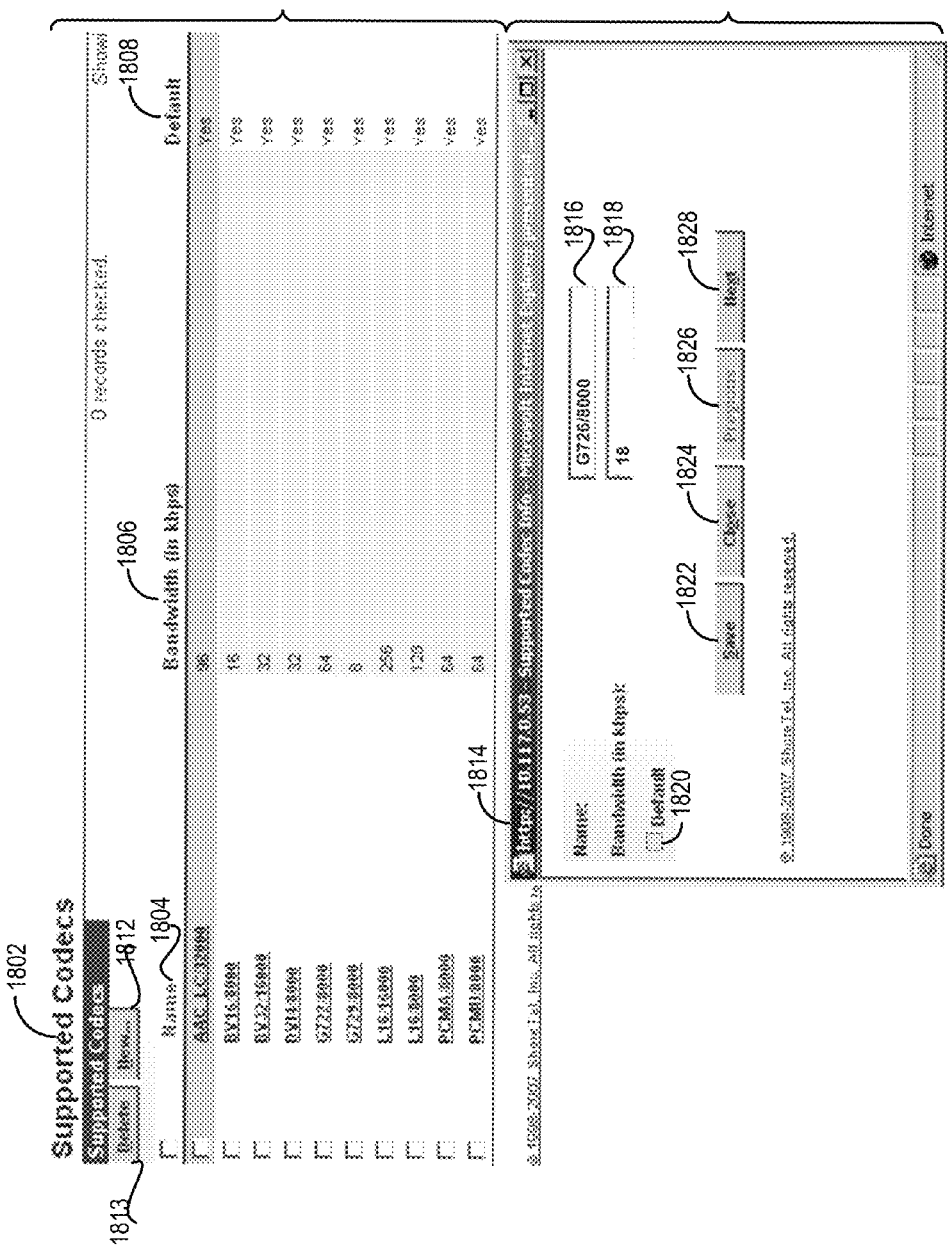

Figure 21

MANAGING NETWORK BANDWIDTH

CROSS-REFERENCE TO RELATED APPLICATIONS

This application is a continuation of U.S. patent application Ser. No. 12/860,784, filed Aug. 20, 2010, the entire contents of which are hereby incorporated by reference in their entirety for all purposes.

BACKGROUND OF THE INVENTION

1. Field of the Invention

The present invention relates to telephony systems such as those using Voice over Internet Protocol (VoIP). In particular, the present invention relates to users with administrative rights defining new codecs to be supported by a telephony system and to negotiating a codec to place a call in the telephony system.

2. Description of the Background Art

The prior art includes a variety of distributed telephony systems. Traditional switched network systems have given way to new telephony systems that use VoIP. These VoIP systems offer the same functionality as more traditional switched system such as the ability to transfer calls, put calls on hold, automated attendant functions, hunt groups, etc. VoIP systems use a codec during a call to convert analog signals to a compressed digital bit stream. The codecs allow VoIP systems to transmit encoded audio, video or data across Internet Protocol networks. Each codec has an associated bandwidth, which is a factor in determining the bandwidth allocated for a call along with other factors such as the bandwidth required for the network protocol headers and the packetization rate. For example, if at the initiation of a call it is determined that codec PCMU/8000 with an associated bandwidth of 64 kbps will be used for the call, then accordingly sufficient bandwidth is allocated.

New VoIP systems offer users the ability to make and receive not only voice calls, but also video and data conferencing calls (e.g., whiteboarding and screensharing). Video and data conferencing calls each have their own codecs. In addition to codecs, VoIP system use settings such as frame rate and resolution to determine how best to connect these calls. Codecs, frame rate and resolution are referred to collectively as call settings. Existing VoIP systems work one of two ways, either they are programmed to support specific call settings and only allow endpoints (e.g., IP phones, software phones) to use those call settings or they blindly pass through the call settings offered by the endpoints but do not attempt to account for bandwidth or do not provide administrative control over how the call settings should be managed.

SUMMARY OF THE INVENTION

The present invention overcomes the deficiencies and shortcomings of the prior art by providing a system and method for using a via site to manage network bandwidth. The system of the present invention is particularly advantageous because it allows end users to instruct a communication system on how to negotiate one or more codecs for calls involving one or more media types (e.g., voice, video and/or data collaboration). The system is also advantageous because it provides a structure for managing use of codecs in an IP telephony system. In one embodiment, the system of the present invention comprises a first call manager at a source site receiving an offer message to connect a call. The offer message includes an endpoint media settings list. The first call manager determines a first filtered media preferences list based on a source media settings list and the endpoint media settings list. The first call manager and transmits an invite message to a second call manager at a first via site. The invite message includes the first filtered media preferences list. The first call manager receives from the second call manager a call settings list that includes a description of the call settings negotiated between the source site, the first via site and a destination site.

BRIEF DESCRIPTION OF THE DRAWINGS

The accompanying drawings illustrate several embodiments of the invention and, together with the description, serve to explain the principles of the invention. The invention is illustrated by way of example, and not by way of limitation in the figures of the accompanying drawings in which like reference numerals are used to refer to similar elements.

FIGS. 18A and 18B are examples of a supported codecs panel according to one embodiment of the present invention.

FIG. 21 is an example of an edit site panel according to one embodiment of the present invention.

DETAILED DESCRIPTION OF THE PREFERRED EMBODIMENTS

Figure 1A:
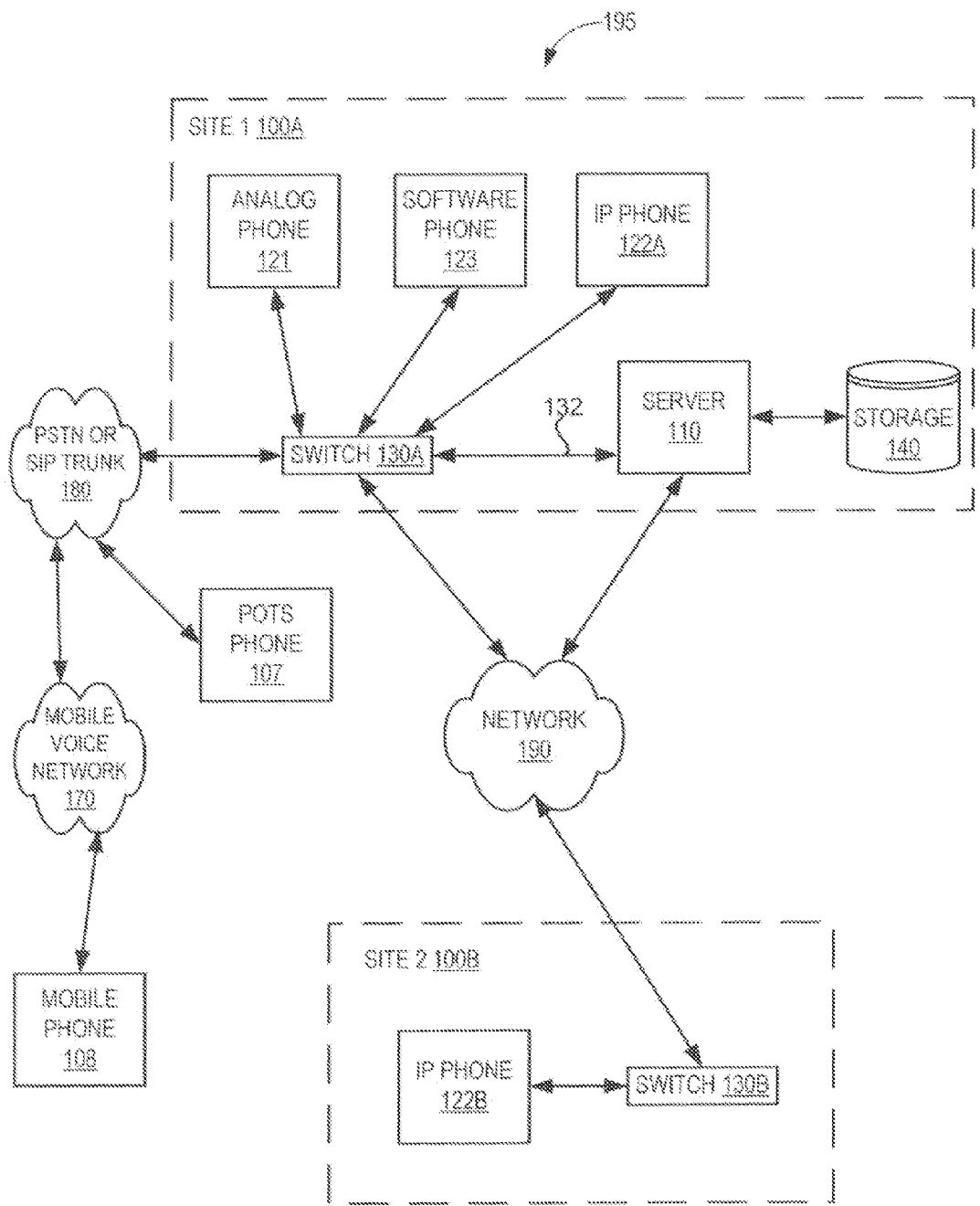
FIG. 1A-1C are high-level block diagrams illustrating a functional view of a distributed telephony system according to one embodiment of the present invention.

A system and method for managing network bandwidth is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to system operation and particular hardware. However, the present invention applies to any type of computing device that can receive a data and commands, and any peripheral devices providing services.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a non-transitory computer-readable memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs and magnetic optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

Enterprises often have several offices or call centers that are located in a plurality of disparate locations. To interconnect all of these sites, enterprise telephony systems have been developed. Enterprise telephony systems, which comprise a distributed set of voice switches, servers and one or more networks, offer enterprise applications enabled by the integration of computer systems with telephony services that include, among other things: (1) voice calls; (2) videophone, videoconference and videopresence calls (referred to collectively as "video calls"); and (3) data conferencing calls that include voice, video and additional data such as screen sharing, whiteboarding and presentation sharing. These different types of calls are referred to collectively as different "media types." Thus, a media type is any conventional form of telephony communication, such as voice calls, video calls and data conferencing calls. A person having ordinary skill in the art will recognize that other media types are possible such as fax and modem calls.

In one embodiment of the present invention, the network is a partially public or a wholly public network such as the Internet. The network can also be a private network or include one or more distinct or logical private networks (e.g., virtual private networks, Wide Area Networks ("WAN") and/or Local Area Networks ("LAN")). Additionally, the communication links to and from the network can be wireline or wireless (i.e., terrestrial- or satellite-based transceivers). In one embodiment of the present invention, the network is an IP-based wide or metropolitan area network.

The software that supports the computer-integrated functionality of providing the above-described telephony services is generally implemented as a client-server environment in which the participants or clients (distributed telephony users) communicate with a server. Computer-integrated features rely not only on a server's application platform but also on the availability of the network bandwidth that connects the switches, servers and application services. In one embodiment, each site's bandwidth is divided into different "pools." A pool is an amount of bandwidth allocated from a site's bandwidth that is set aside for providing a particular media type for a site. For example, a voice pool is an amount of bandwidth that is set aside for providing voice calls for a site. Similarly, a video pool is an amount of bandwidth that is set aside for providing video calls and a media conferencing pool is an amount of bandwidth set aside for providing media conferencing calls.

In one embodiment, a distributed telephony system comprises multiple sites and every site is assigned one or more WANs. The different sites are communicatively coupled to one another via different WANs. This interconnectivity is discussed further with reference to FIGS. 1A-1C, 4 and 5. The WANs provide bandwidth to the sites they are assigned to, and this bandwidth is divided into one or more pools. The switch at each site is configurable so that different pools can be allocated different amounts of bandwidth. For example, a site has 20 megabytes per second (MB/S) of bandwidth available from one or more associated WANs, and the voice pool is allocated 15 MB/S, the video pool 2 MB/S and the data conferencing pool 2 MB/S, for a total of 19 MB/S allocated to the different pools. In this example, the remaining 1 MB/S is not managed, and is reserved for asynchronous data use at the site. Asynchronous data use is bandwidth use that is not predictable and includes, for example, instant messaging (IM), presence, electronic mail (e-mail) and file transfers.

Figure 22:
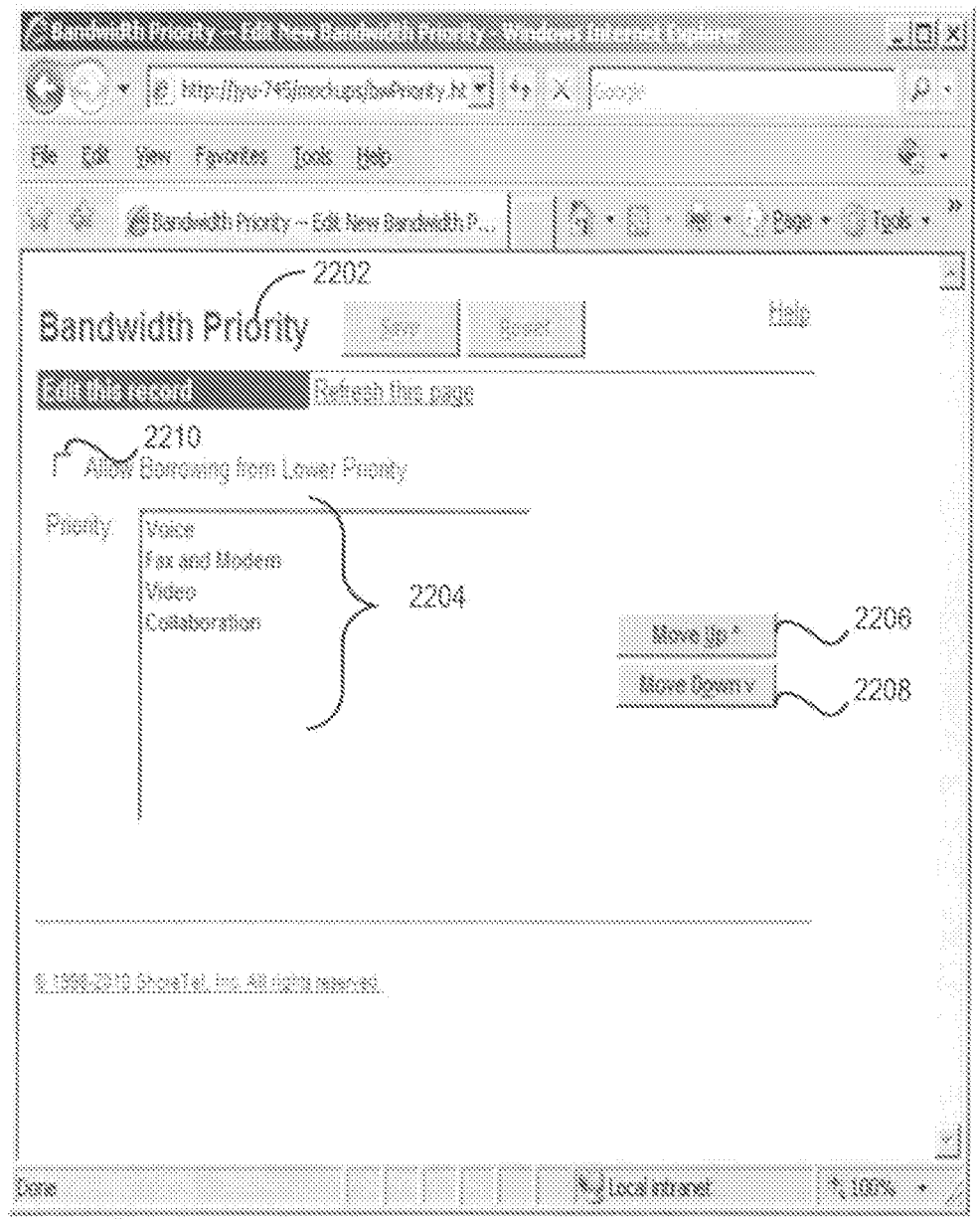
FIG. 22 is an example bandwidth priority panel according to one embodiment of the present invention.

In one embodiment, some media types have a higher priority than other media types and the switch is configurable so a user can assign a priority order to the different pools (see FIG. 22). For example, an administrator determines that the voice pool is a higher priority than the video pool, and the video pool a higher priority than the data conferencing pool. In this embodiment, if all the bandwidth for a higher priority media type is in use and a new call for that media type is requested, the switch borrows unused bandwidth from the pool of a lower priority media type so that the call for the higher priority media type can occur. For example, assume the voice pool is a higher priority than the video pool, and the video pool a higher priority than the data conferencing pool. Further assume that an offer for a voice call is received at a time when all the bandwidth for the voice pool is in use. If the video pool has unused bandwidth, the switch borrows bandwidth from the video pool so that the incoming voice call can be answered. Similarly, if the video pool does not have unused bandwidth, or if the bandwidth available in the video pool is by itself inadequate to answer the incoming voice call, the switch borrows bandwidth from the video pool and/or the data conferencing pool so that the incoming call can be answered. This process is referred to herein as "cascading pools" or "the cascading pools feature" since a higher priority pool can only borrow bandwidth from a lower priority pool.

FIG. 1A illustrates a block diagram of a distributed telephony system 195, according to one embodiment of the present invention. The illustrated embodiment of telephony system 195 includes a first site 100A and a second site 100B. As used herein, a site represents a grouping of resources. In the illustrated embodiment, the two sites 100A, 100B are communicatively coupled via a network 190. One skilled in the art will note that sites 100A, 100B can be physically distinct from each other or merely topology-related groupings that are not in physically distinct locations. The telephony system 195 architecture in FIG. 1A is used only by way of example. While FIG. 1A illustrates two sites, the present invention applies to any system architecture containing one or more sites. Furthermore, while only one network 190 is coupled to the sites 100A and 100B, in practice any number of networks 190 can be connected to the sites 100A and 100B.

The first site 100A includes a server 110, a switch 130A, three endpoints (analog phone 121, IP phone 122A and software phone 123) and a storage device 140. The switch 130A represents a Voice over Internet Protocol (VoIP) device to which a number of endpoints can be coupled, such as analog phones 121, IP phones 122A and software phones (softphones) 123. In the illustrated embodiment, the switch 130A is coupled to the network 190. The switch 130A is also coupled to the server 110 via signal line 132 and to the public switched telephone network (PSTN) trunk 180 via an analog or digital trunk line (e.g., a T1 or E1 interface) or a session initiation protocol ("SIP") trunk service provider. In the illustrated configuration, the switch 130A provides an interface for calls originating from or terminating on the PSTN or SIP trunk 180. The PSTN 180 is coupled to a plain old telephone phone service phone (POTS phone) 107, and a mobile voice network 170 coupled to any number of mobile phones represented by mobile phone 108. Thus, POTS phone 107 calls and mobile phone 108 calls can originate on the switch 130A via the PSTN 180.

Although only a single switch 130A is shown in FIG. 1A, those skilled in the art will recognize that a particular site such as the first site 100A may include a plurality of switches. The switch 130 will be described in more detail below with reference to FIG. 2.

An endpoint enables a user to carry on a phone call. Although in the illustrated embodiment the first site 100A has three endpoints (one analog phone 121, one IP phone 122A and one softphone 123), in other embodiments the first site 100A has different numbers and types of endpoints. Examples of endpoints include a video conferencing device, a Multipoint Control Unit ("MCU"), a conference bridge, an Analog Terminal Adapter ("ATA"), and any other device that originates and/or terminates a media stream. An endpoint is coupled to the switch 130, the server 110, or both. Each of the endpoints can also include a display device (not shown) that is used in conjunction with the phone of the endpoint.

In one embodiment, an endpoint is a conference bridge adapted to have the functionality of a switch 130. For example, the conference bridge includes hardware that provides the conference bridge with the functionality of a switch 130. Such hardware includes, for example, one or more electronic circuit boards, one or more processors and/or a non-transitory storage device (e.g., RAM, hard drive, etc.) storing data and/or software (e.g., a call manager 150), and these components are configured to work together with the other components of the conference bridge so that the conference bridge has the functionality of a switch 130. In another embodiment, the conference bridge has, among other things, a processor and a non-transitory storage device that stores a call manager 150 that, when executed by the processor, causes the conference bridge to have the functionality of a switch 130. For example, turning to FIG. 3B, in one embodiment Endpoint B is a conference bridge and the bandwidth manager 220B and the settings manager 218B are components of a call manager 150 stored on a storage device that is comprised within the conference bridge.

In one embodiment, an endpoint has a user interface to send data to and receive data from a user. The analog phone 121 has, for example, a Telephone User Interface ("TUI") that sends data through a speaker and receives data through a microphone and a keypad. The IP phone 122A has, for example, both a TUI and a Graphical User Interface ("GUI") that sends data through a display device associated with the IP phone 122A. In one embodiment, the IP phone's graphical user interface also receives data from a touch screen display device associated with the IP phone 122A. The softphone 123 has, for example, a software application that runs on a computer and sends data through a display device and a speaker and receives data through a microphone, a keyboard and a pointing device.

The server 110 is configured to implement features or functions of the telephony system in accordance with the present invention. The server 110 is coupled to the network 190 and although not shown can also be coupled to one or more endpoints, such as IP phone 122A and softphone 123. The server 110 implements a server architecture according to one embodiment of the present invention. Server 110 includes a processor. The processor can be a conventional processing device, such as a general-purpose microprocessor. Server 110 also includes a non-transitory computer-readable memory. The memory includes program instructions or functional units that in one embodiment implement features of the present invention. Specifically, the memory includes a Telephony Management Software ("TMS") unit, a Telephony Application Programming Interface ("TAPI") unit and a directory unit. In one embodiment, the memory also includes one or more application units that interact with the TMS unit and the TAPI unit to enable a specific computer-integrated function. An application unit uses the TAPI unit to exchange data with the TMS unit. The TMS unit is able to communicate with and manage one or more switches 130. For example, with reference to FIG. 1A, the TMS unit included in the server 110 can manage the switches 130A, 130B. Through the TAPI unit, the TMS unit presents an application with Computer-Telephony Integration ("CTI") view of these switches 130A, 130B. This allows the application to manage the switches 130A, 130B. Such switches 130A, 130B operate without an associated TMS unit if CTI features are not being used. The server has a user interface to send data to and receive data from a user. The user interface interacts with TMS in order to allow a user with administrative rights to manage the switches and change the configuration settings of the switches. The user can access the user interface at the server or at an endpoint (e.g., soft phone).

In one embodiment the server 110 includes an application unit and/or a directory unit. The application unit assists the switch 130 in providing one or more phones communicatively coupled to the switch 130 with access to conventional PBX applications (e.g., among others, instant messaging, collaboration tools, sidebar conversations between two or more users during ongoing PBX calls, chat sessions between two or more users and/or APIs for integrating third party applications with the standard PBX functions provided by the switch 130). For example, the application unit is data and routines stored on a non-transitory computer-readable medium comprised within the server 110. In one embodiment, the server 110 does not include the application unit and the switch can provides PBX functionality without assistance from the switch.

In general, the directory unit enables a phone to access a directory and use the directory in conjunction with other phone functions. In one embodiment, the directory unit is implemented as a service that interacts with TMS unit. Communication or data exchange is between the TMS unit and the directory unit. The directory unit can be distributed among computing devices as is known to one of skill in the art. For example, the functionality enabled by directory unit can be implemented in a client-server fashion by having the client (user's local system, such as a general-purpose computer or endpoint) perform some functions and having the server 110 (directory unit) perform others. As another example, some or all of the functionality enabled by the directory unit can be implemented by having a switch 130 perform some or all functions.

The storage device 140 contains directory information, including directory entries and associations between directories and phones. In one embodiment, the storage device 140 also includes information regarding which users have administrative rights to access the server's user interface and make changes to the configuration settings of the switches. For example, the storage device 140 will include the user name and password of users with administrative rights. In one embodiment, the storage includes data that is accessed by the switches in order to operate. In the illustrated embodiment, the storage device 140 is directly coupled to the server 110. In an alternate embodiment, the storage device 140 is coupled to the server 110 via the network 190.

One skilled in the art will appreciate that additional networking devices (not shown) can be added to the first site 100A, for example, if needed to support additional endpoints, servers 110, switches 130 or other systems. For example, the first site 100A can include a second switch 130B and an edge router to couple the first site 100A to the network 190 and to provide local area connectivity for the first and second switches 130A, 130B. One skilled in the art will also recognize that numerous configurations of switches 130 and communication links are contemplated. For example, PSTN links can be coupled to multiple switches 130 at several points within the topology and soft-switches 130 can also be used.

The second site 100B similarly includes an endpoint (IP phone 122B) and a switch 130B. The configuration of the second site 100B demonstrates that a server is not required for each site. Switch 130B of the second site 100B can be managed by server 110 that is illustrated in the first site 100A. A call can involve more than one switch 130. For example, a call that originates from the PSTN or SIP trunk 180 and terminates on an endpoint that is communicatively coupled to switch 130B of the second site 100B involves two switches: switch 130A of the first site 100A and switch 130B of the second site 100B. In addition, each switch 130A, 130B can be managed by a different server 110. In one embodiment, one or more of the sites 100A, 100B have one or more servers 110.

In one embodiment of the present invention, the network 190 is a partially public or a wholly public network such as the Internet. The network 190 can also be a private network or include one or more distinct or logical private networks (e.g., virtual private networks or wide area networks). Additionally, the communication links to and from the network 190 can be wire line or wireless (i.e., terrestrial- or satellite-based transceivers). In one embodiment of the present invention, the network 190 is an IP-based wide or metropolitan area network.

Figure 1B:
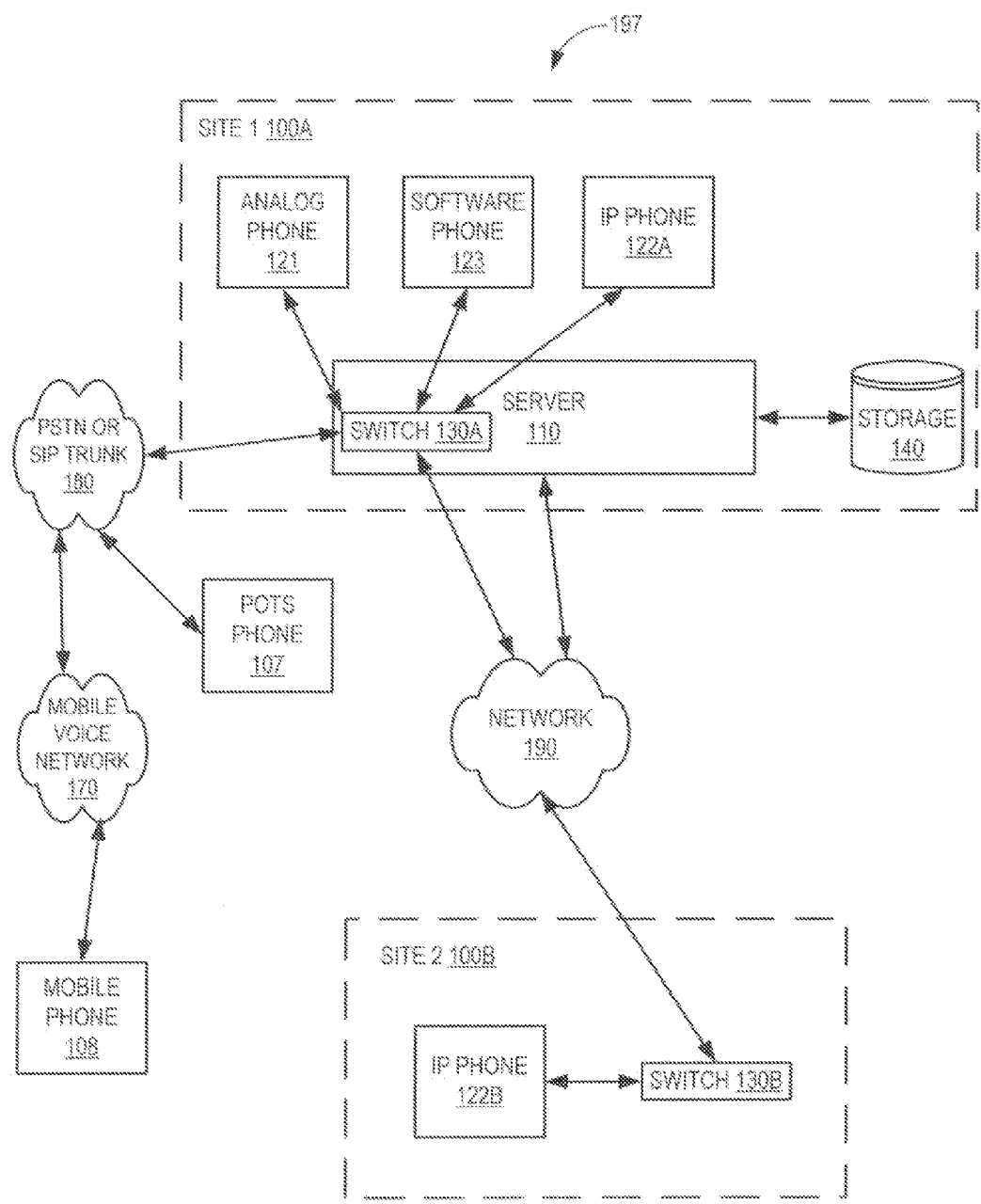
Figure 1C:
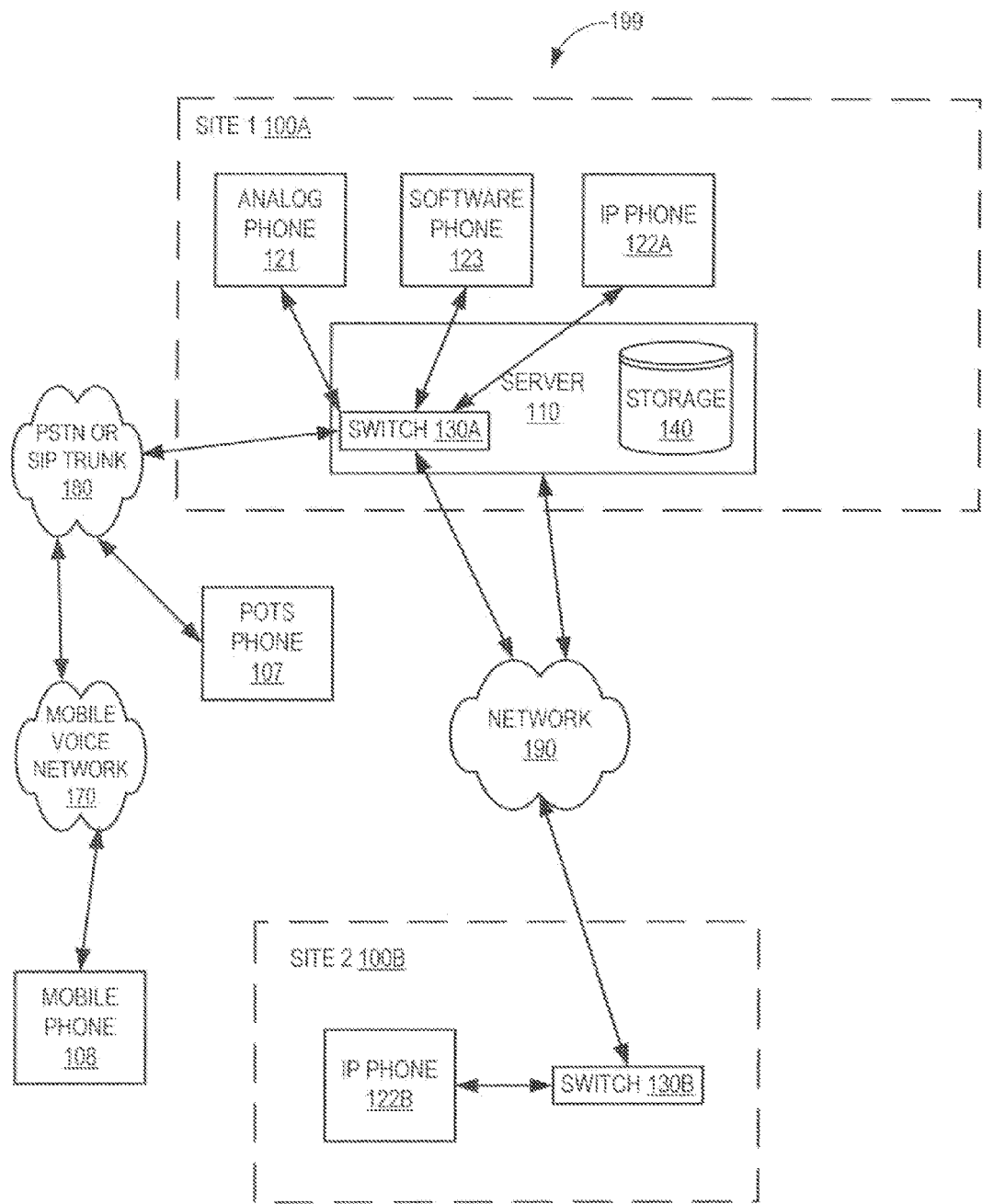

Turning now to FIG. 1B, depicted is a block diagram of a distributed telephony network system 197, according to one embodiment of the present invention. In the illustrated embodiment, the switch 130A is comprised within the server 110. Similarly, FIG. 1C depicts a block diagram of extruded telephony network system 199, according to one embodiment present invention, in which the switch 130A and the storage device 140 are comprised in the server 110.

Switch 130

Figure 2:
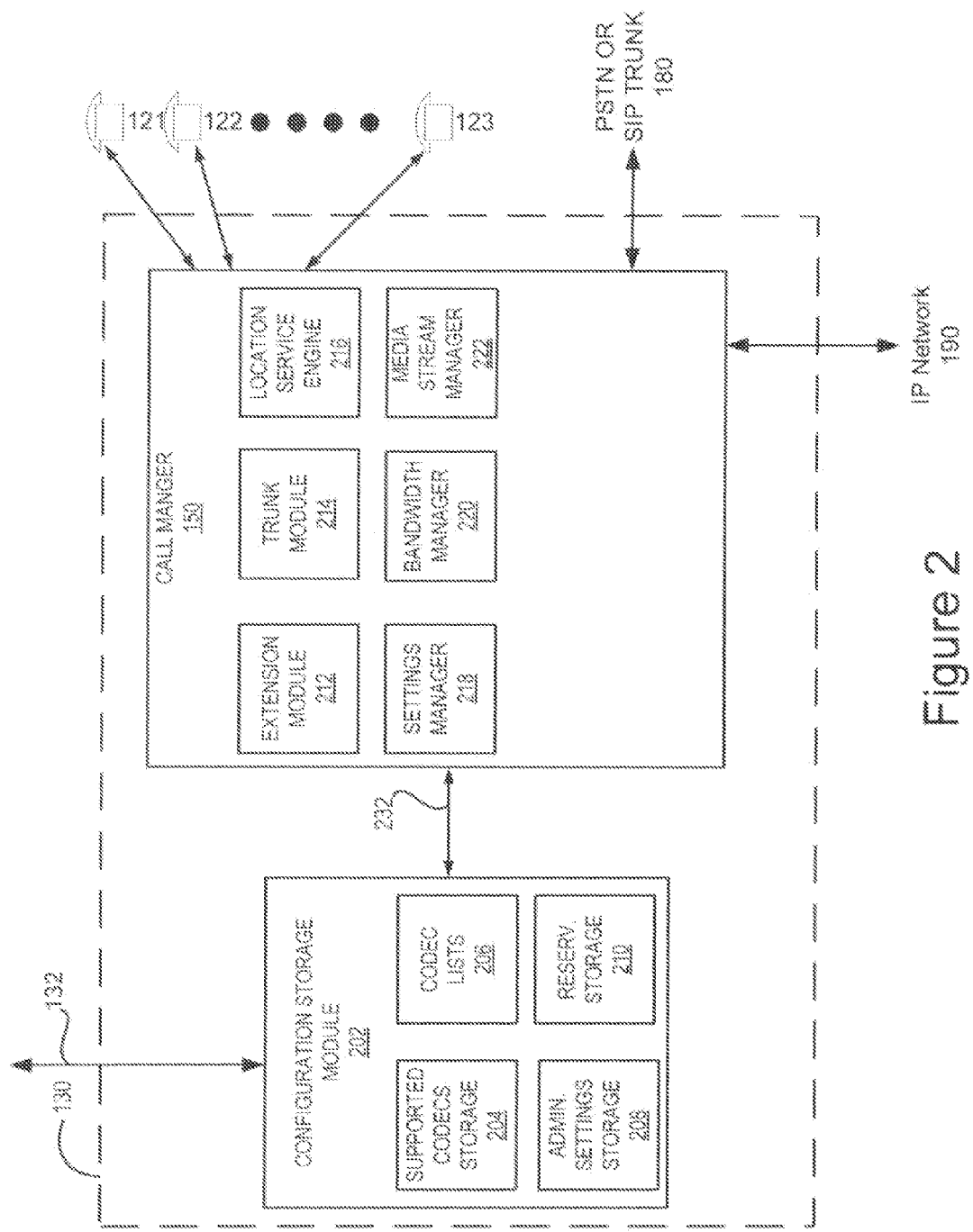
FIG. 2 is a high-level block diagram illustrating a switch according to one embodiment of the present invention.

Referring now to FIG. 2, an embodiment of the switch 130 according to one embodiment of the present invention is shown. In this embodiment, switch 130 is configured to implement features or functions of the present invention. Switch 130 includes one or more processors (not shown). The processor can be a conventional processing device, such as a general-purpose microprocessor. Switch 130 also includes a non-transitory computer readable memory. The memory stores software and routines (not shown) conventionally used to operate a switch 130 in a VoIP telephony system. For example, the switch 130 includes software routines for performing call monitoring, transferring calls, placing calls on hold, establishing hunt groups, automated attendant functions, etc. The memory also stores program instructions or functional units that implement the features of the present invention. The switch 130 also includes a configuration storage module 202 and a call manager 150.

The configuration storage module 202 is for storing preferences, settings and other information utilized by the call manager 150 to perform its functions. In one embodiment, the configuration storage module 202 is a portion of the memory of the switch 130. To enable the feature of determining call settings for a call, the configuration storage module 202 includes a supported codecs storage 204, codec lists 206 and administrator settings storage 208. The configuration storage module 202 also includes a reservation storage module 210 to enable the feature of reserving bandwidth for a call occurring at a future time.

In one embodiment, the supported codecs storage 204 is a storage unit that stores a description of the properties of each codec supported by switch 130. Supported codecs include different codecs that support different call types (i.e., media types). For example, the supported codecs include one or more conventional: (1) audio codecs that support voice calls; (2) video codecs that support videophone, videoconference and videopresence calls (referred to herein collectively as "video calls"); and (3) data conferencing codecs that support one or more of screen sharing, whiteboarding, application sharing and presentation sharing. In another embodiment, the supported codecs storage 204 is a storage that includes a description of the properties of each codec supported by the telephony system 195. In one embodiment, the description included in the supported codecs storage 204 for each supported codec includes an identification string and the bandwidth to reserve for that codec. In one embodiment, the identification string is comprised of the name and the sampling rate of the codec. A codec's bandwidth is used by the settings manager 218 and the bandwidth manager 220 to allocate bandwidth as calls are initiated.

In one embodiment, the supported codecs storage 204 includes one or more conventional fax codecs and/or modem codecs.

In one embodiment, telephony system 195 is initially installed with descriptions of specific codecs stored in the supported codecs storage 204 of the configuration storage module 202. Codecs for which a description is initially stored in the supported codecs storage 204 are referred to as default codecs. The descriptions of codecs stored in the supported codecs storage 204 can be modified or deleted by a user with administrative rights using the server's user interface at the server 110 or at an endpoint (e.g., softphone 123). In one embodiment, descriptions of default codecs initially stored in the supported codecs storage 204 cannot be modified or deleted. Additionally, a user using the server's user interface can store a description of a new codec or modify and existing codec in the supported codecs storage 204.

The codec lists 206 include an identification of one or more codecs supported by the switch 130. Supported codecs include one or more conventional audio codecs, video codecs and/or data conferencing codecs. A site 100 is not required to support codecs for all available media types. In one embodiment, an identification of a codec is the name of the codec or the identification string of the codec. In one embodiment, the codec lists 206 identifications for codecs that support inter-site and intra-site fax/modem calls.

In one embodiment, the configuration storage module 202 stores different codec lists 206 for different media types. For example, the configuration storage module 202 stores a first codec list 206 for audio codecs, a second codec list 206 for video codecs and a third codec list 206 for data conferencing codecs. A codec list 206 is referenced by switch 130 to negotiate call settings for a call.

In one embodiment, instead of storing separate codec lists for each media type, the configuration storage module 202 stores a single codec lists for all the different media types. For example, the configuration storage module 202 stores a single codec list that contains information for two or more of the following: audio codecs; video codecs; data conferencing codecs; fax codecs; and modem codecs.

The codecs that are part of each codec list 206 are ranked in a priority order that is determined by user/administrator preferences stored in the administrator settings storage 208. The different media types are also ranked in a priority order based on preferences stored in the administrator settings storage 208. The difference between a codec priority order and a media priority order is that the codec priority order ranks the codecs in a codec list 206 against other codecs in the same codec list 206, whereas the media priority order ranks the different bandwidth pools (e.g., voice pool, video pool and/or data conferencing pool) to determine the sequence for borrowing bandwidth for the purpose of cascading pools.

A codec list 206 can be modified or deleted via an endpoint or server 110. Modifying a codec list 206 includes one or more of adding or removing an identification of one or more codecs and changing the ranking of priority order for codecs in the codec list 206. In addition, new codec lists 206 can be created by a user with administrative rights at an endpoint or server 110. In one embodiment, telephony system 195 is initially installed with specific codec lists 206. In one embodiment, codec lists 206 initially installed with the telephony system 195 cannot be deleted or modified.

The administrator settings storage 208 includes general settings information for the site 100 that are used to manage bandwidth for the site 100. Specifically, the administrator settings storage 208 includes a media preferences list for site 100. The media preferences list includes a list of the media priority order, and one or more of the voice preferences list, video preferences list and a data conferencing preferences list.

The media priority order ranks the different bandwidth pools (e.g., voice pool, video pool and/or data conferencing pool) to determine the sequence for borrowing bandwidth for the purpose of cascading pools.

The media preferences lists describe user/administrator preferences for the different media types that are used by the settings manager 218 and the bandwidth manager 220 (described below) to determine how to negotiate call settings for a call. There is a media preferences list for each media type. The voice preferences list includes the preferred bandwidth settings for voice calls. The video preferences list includes the preferred bandwidth settings, resolution settings and frame rate settings for video calls. The data conferencing preferences list includes the preferred bandwidth settings, resolution settings, frame rate settings and screen sharing formats.

The bandwidth settings indicate which codec list 206 should be used for each type of call. In one embodiment, there are three different types of calls: intra-site calls, inter-site calls and fax/modem calls. Intra-site calls are calls within site 100, inter-site calls are calls between two different sites and fax/modem calls are calls that involve data transfer. Additionally, bandwidth settings include the amount of bandwidth allocated for site 100. If a site is coupled to more than one WAN, the administrator settings storage 208 includes information as to which WANs the site is connected to and bandwidth settings for each WAN. For example, if a first site is coupled to multiple WANs, the administrator settings storage 208 may include information that the first site is coupled to a second site by a first WAN and that the first site is coupled to a third site by a second WAN.

In one embodiment, the bandwidth settings also include mapping data for one "via site." According to this embodiment each site 100 in a system 195 is assigned one via site. A via site is the next site 100 that call communications would have to flow through to get from a source site 100 to a destination site 100. A source site 100 is a site that originates a call offer, and a destination site 100 is the site having the endpoint for which the source site's 100 call offer is addressed. Each of the above described features is discussed in further detail with reference to FIGS. 3C-3D, 4-7, 10A, 10B and 11A-11E.

The resolution settings include information about the maximum, minimum or a predetermined range of resolution values required by the site 100 to connect a video or data conferencing call. In one embodiment, the sites involved in connecting a video or data conferencing call (i.e., the source site, destination site and optional via sites) are required to have a codec supporting a video resolution value less than the stored maximum resolution setting, or more than the stored minimum resolution setting. If the media preferences list includes a range of acceptable resolution values, all the sites involved in connecting the call are required to support a video resolution value equal to or less than the maximum resolution of the stored video resolution range and equal to or more than the minimum resolution of the stored video resolution range. In one embodiment, the resolution settings includes information about what the switch 130 should do if the resolution requirements for the source site cannot be met by one or more of the other sites involved in the call. For example, if the destination site 100 (and/or one of the via sites) does not support the requirements of the source site's 100 resolution settings, the resolution settings includes an indication that the switch 130 should connect the call using audio data only (i.e., the call is connected as a voice call). The resolution settings can also include an indication that the call should not be connected and an error message is sent to the endpoint that originated the call offer.

In one embodiment, the sites involved in connecting a video or data conferencing call (i.e., the source site, destination site and optional via sites) are required to have: (1) one or more codecs in common in their codec lists; and (2) enough bandwidth available in the media pool(s) required by the call request to accommodate the combination of codec, resolution and/or frame rate required by the negotiated codec(s).

The frame rate settings include information about the maximum, minimum or a predetermined range of frame rate values required by the site 100 to connect a video or data conferencing call. The screen sharing format settings include information about the different screen sharing formats required by the site 100 to connect a data conferencing call. These features work similar to the resolution requirement discussed above, and so, that description will not be repeated here.

In one embodiment the resolutions settings, frame rate and screen sharing formats are each assigned a priority order ranking to indicate which of these settings is more important to the administrator/user, and the call settings are determined based in part on this priority order. This is described in further detail with reference to FIG. 8B.

In one embodiment, the cascading pools feature is optional and is only implemented if a user provides an input to the switch 130 to enable the cascading pools feature. This input is stored by the switch 130 in the administrator settings storage 208. Additional settings information stored on the administrator settings storage 208 includes for example, the name of the site, the location of the site or the bandwidth available for the site. The settings information stored in the administrator settings storage 208 can be modified by a user with administrative rights using the server's user interface, or an interface viewable on a display associated with an endpoint such as a phone (e.g., phones 108, 122 or 123).

The reservation storage 210 includes information for reserving bandwidth for calls that are scheduled to occur in the future. The reservation information stored in reservation storage 210 is added or modified using the server's user interface, or an interface viewable on a display associated with an endpoint such as a phone (e.g., phones 108, 122 or 123). For example, a user of phone 122 desires to schedule a conference call at a future date, and accesses an interface viewable on a display associated with phone 122A. The user inputs information to schedule the call that is stored in the reservation storage 210. The call manager 150 accesses this information and reserves bandwidth for the conference call. The call manager 150 also communicates this information to other sites involved in the call so that they reserve bandwidth for the call as well. This feature is described in further detail with references to FIG. 14.

The configuration storage module 202 is coupled by a signal line 132 to the server 110. The server 110 uses the signal line 132 to download information to the configuration storage module 202. The information downloaded by the server 110 includes the information noted above to allow the call manager 150 to perform its conventional functions. In accordance with the present invention, the server 110 also uses signal line 132 to maintain and keep the supported codecs storage 204, the codec lists 206, the administrator settings storage 208 and the reservation storage 210 current. In other words, anytime the server 110 receives instructions from a user to add, remove or modify descriptions of supported codecs, codec lists, administrator settings or reservation information via the user interface or an interface associated with a phone (e.g, phones 107, 108, 121, 122 or 123), the server 110 updates the information stored in the configuration storage module 202. In one embodiment, anytime another call manager 150, server 110 or site 100 adds, removes or modifies descriptions of supported codecs, codec lists, administrator settings or reservation information, the information is propagated to the server 110 and the server 110 in turn updates the information stored in the configuration storage module 202. The configuration storage module 202 is also coupled by signal line 232 to the call manager 150. The configuration storage module 202 uses this coupling to provide stored information to the call manager 150.

A device, such as the processor of the switch 130A, runs the call manager 150 software application and is coupled to and controls one or more endpoints 121, 122A and 123 with which it is associated. While shown as operational and as part of the switch 130 in FIG. 2, those skilled in the art will recognize that in other embodiments, the call manager 150 may be operational as a separate module in the first site 100A or as part of server 110 of FIG. 1A-1C.

Although in the illustrated embodiment the first site 100A has only one call manager 150 in switch 130A, in other embodiments the first site 100A has a different number of call managers 150. Also, more than one call manager 150 can control the same endpoint. The association between a call manager 150 and an endpoint that it controls is accessed through the server 110. Furthermore, although not shown, the second switch 130B includes its own call manager 150.

As shown in FIG. 2, the call manager 150 is coupled to the PSTN or SIP trunk 180 and the network 190. The call manager 150 comprises an extension module 212, a trunk module 214, a location service engine 216, a settings manager 218, a bandwidth manager 220 and a media stream manager 222. In one embodiment, the trunk 180 is a SIP trunk and provides connectivity to SIP-compatible devices. One having ordinary skill in the art will recognize that network 190 also provides connectivity for SIP-compatible devices.

The extension module 212 communicates with endpoints coupled to the call manager 150 in order to allow a user to perform call-related functions on an endpoint. In addition, the extension module 212 is used to communicate with other call managers 150 in the telephony system 195.

The trunk module 214 is coupled to and controls the interaction between the endpoints 121, 122A and 123 and the PSTN or SIP trunk 180. In particular, the call manager 150/switch 130 is often coupled to a trunk line. The trunk module 214 of the call manager 150 manages the usage of the trunk line by multiple endpoints 121, 122A and 123 optimizes the usage of the trunk line. The trunk module 214 also manages trunk services such as caller identification, direct inward dial, etc.

The location service engine 216 resolves the dialed numbers (converts raw dialed digits into routable contacts) and routes the call to the destination endpoint such a phone, trunk, hunt group, auto attendant, pickup group etc. In one embodiment, the location service engine 216 routes calls using the mapping information stored in the administrator settings storage 208.

The settings manager 218 is coupled to the network 190 and at the initiation of a call between two endpoints negotiates with the endpoints or with another call manager 150, which call settings to use for the call (i.e., depending on the call type, which codecs, frame rate, resolution, screen-sharing format). The settings manager 218 communicates with the bandwidth manager 220 to negotiate call settings for calls based on the media type of the call, information stored in codec lists 206 and the administrator settings storage 208. The functionality of the settings manager 218 is further described below with reference to FIGS. 3A-3E, 6-16 and 17A-17E.

The bandwidth manager 220 is coupled to the network 190 and allocates bandwidth necessary to support calls handled by the call manager 150. In one embodiment, if cascading pools is enabled, the bandwidth manger borrows bandwidth from lower priority pools in cases where there is not enough bandwidth available in a pool to connect a call. For example, if voice media is a higher priority than video media, and if there is not enough bandwidth in the voice pool to connect a voice call, the bandwidth manager 220 borrows bandwidth from the video pool to connect the voice call. In one embodiment, the bandwidth manager 220 tracks calls for which it has borrowed bandwidth, receives an indication when those calls are terminated, and then re-allocates borrowed bandwidth to the lower priority pools after receiving an indication that the call is terminated. The functionality of the bandwidth manager 218 is further described below with reference to FIGS. 3A-3E, 6-16 and 17A-17E.

The media manager 222 creates and manages media streams. The media manager 222 also handles call control and converting audio waveforms to and from Real-time Transport Protocol ("RTP") packets using the call settings negotiated for the call. The media manager 222 is coupled for communication with the network 190 and the endpoints 121, 122A and 123. The media manager 222 also performs encoding/decoding in case of analog endpoints and physical trunks using the sampling rate of the codec negotiated for the call.

In one embodiment, one or more of the above described components of the call manager (i.e., the extension module 212, trunk module 214, location service engine 216, settings manager 218, bandwidth manager 220 and media stream manager) are a specialized hardware apparatus configured to perform the function of the particular components. For example, one or more of the extension module 212, trunk module 214, location service engine 216, settings manager 218, bandwidth manager 220 and media stream manager is a combination of one or more electronic circuits configured to provide the above-described functionality for that component. In one embodiment, the one or more electronic circuits that comprises the component includes one or more of: (1) a processor; (2) a non-transitory computer-readable memory (e.g., RAM, a hard-drive, a buffer, a circular buffer, etc.) communicatively coupled to the processor; and (3) processor-executable firmware stored on the non-transitory memory.

METHODS AND EXAMPLES

Figure 3A:
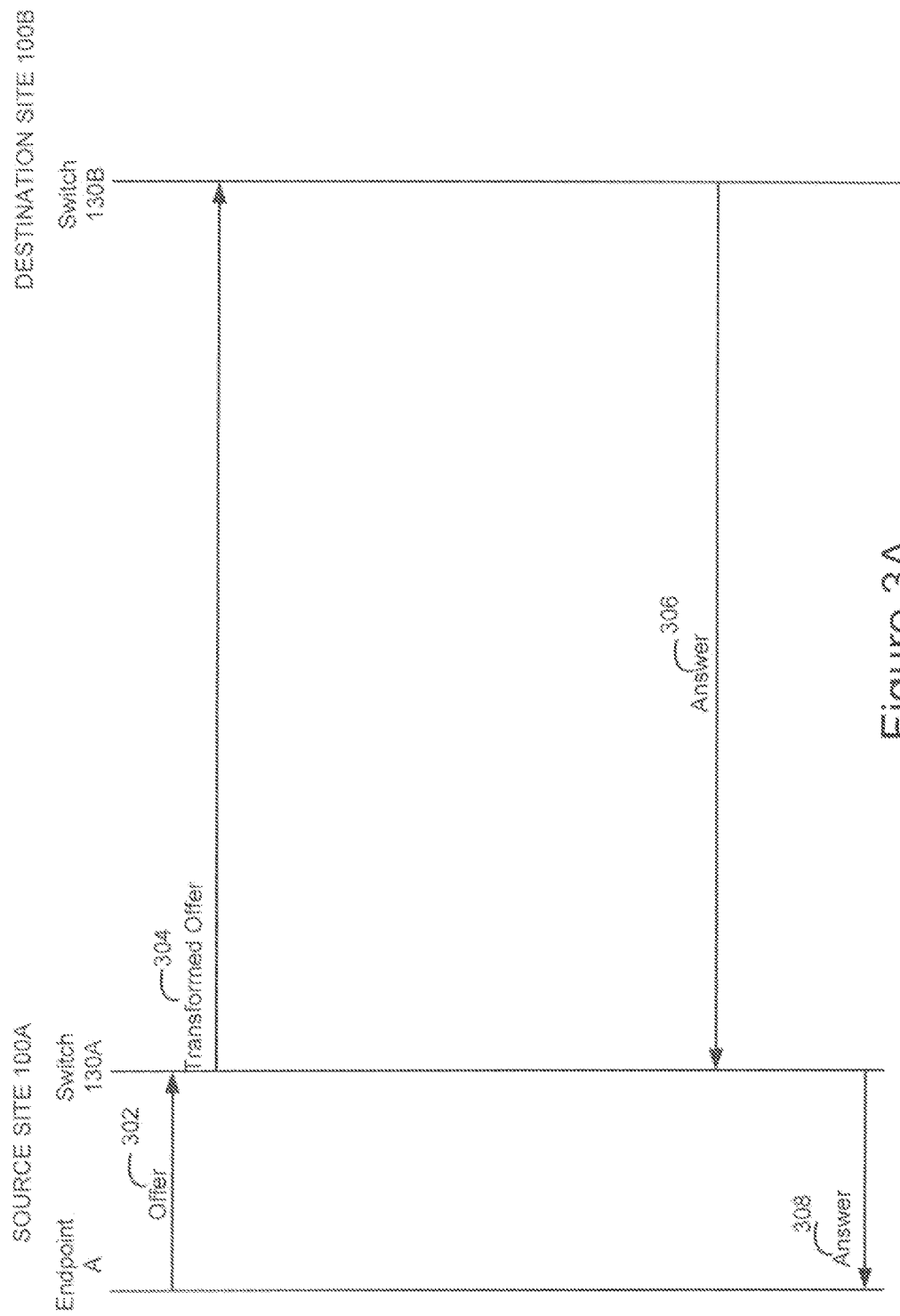
FIG. 3A-3D are diagrams illustrating methods for managing bandwidth for a call between a source endpoint and a destination endpoint according to several embodiments of the present invention.

Referring now to FIG. 3A, depicted is diagram illustrating a method for managing bandwidth for a call between a source endpoint and a destination endpoint according to one embodiment of the present invention. The endpoint A is a communication device such as analog phone 121, software phone 123 or IP phone 122. Endpoint A transmits an offer message 302 to a switch 130A at the source site 100A. The switch 130A receives the offer message 302 and determines mapping information to transmit the offer to the destination site 100. The switch 130A transmits the transformed offer message 304 to the switch 130B at the destination site 100B. The switch 130B at the destination site 100B receives the transformed offer message 304, determines mapping information and transmits an answer message 306 to switch 130A at the source site 100A. The switch 130A receives the answer message 306 and transmits an answer signal 308 to the endpoint A.

In one embodiment, the switch 130 acts as a gateway for devices such as the analog phone 121. For example, in response to receiving signals from the analog phone 121 (or other devices which do not process codecs), the switch 130 generates offer messages for the phone 121. The switch 130 also receives responses from other devices (e.g., phones 122, 123) for the analog phone 121 and handles these responses on behalf of the phone 121.

In one embodiment the switch 130 acts as a gateway for devices such as POTS phone 107 and mobile phone 108. For example, in response to receiving signals from the phone 107/108, the switch 130 generates offers messages for the phone 107/108. The switch 130 also receives responses from other devices (e.g., phones 122, 123) for the phone 107/108 and handles these responses on behalf of the phone 107/108.

Figure 3B:
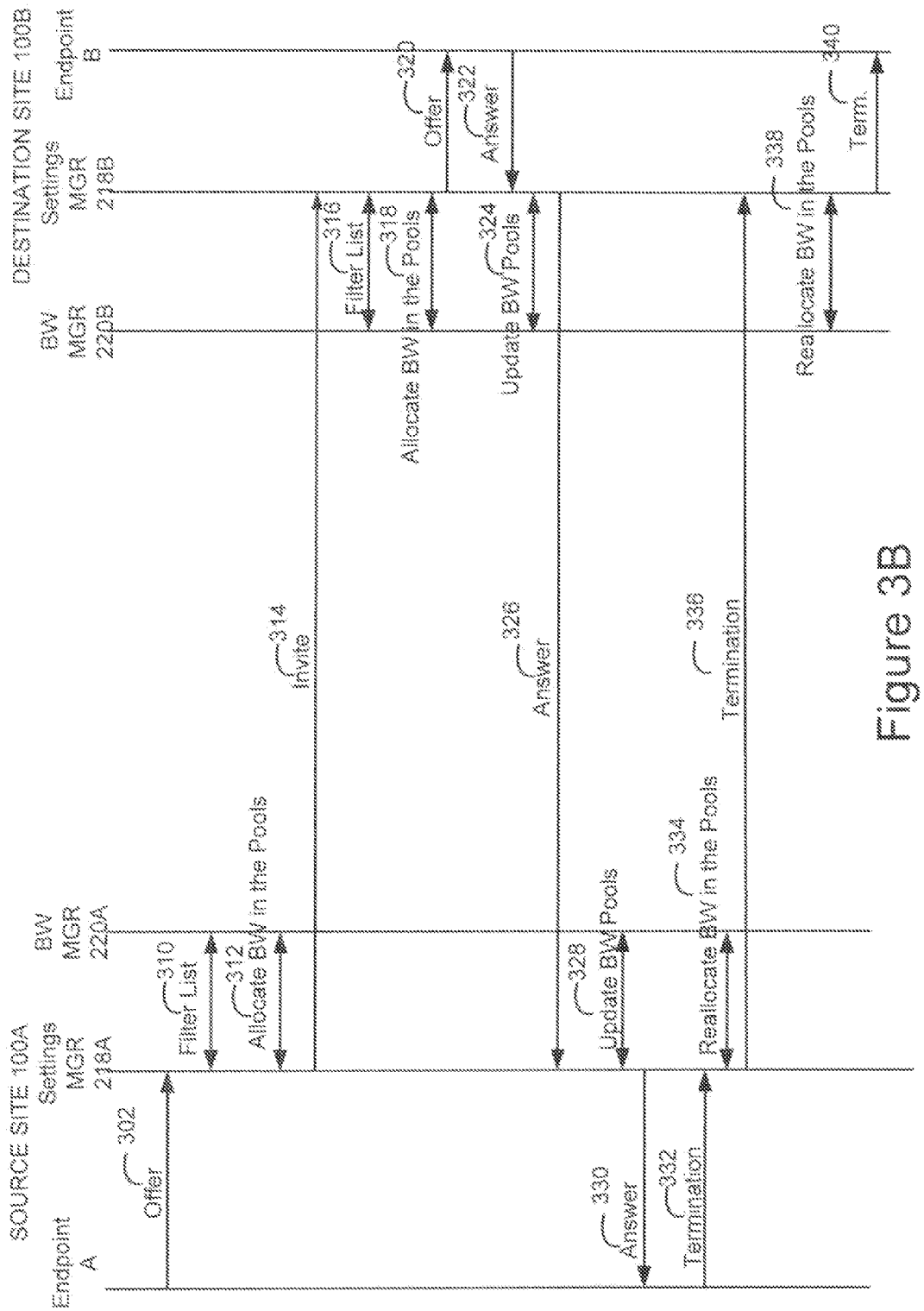

Turning now to FIG. 3B, depicted is diagram illustrating a method for managing bandwidth for a call between a source endpoint and a destination endpoint according to one embodiment of the present invention. Portions of the description for FIG. 3B are applicable to FIGS. 3C-3E. FIG. 3B features bandwidth allocation using pool bandwidth.

The endpoint A transmits an offer message 302 to the settings manager 218A. The settings manager 218A receives the offer message 302. The offer message 302 includes an endpoint A media settings list. The endpoint A media settings list includes an indication of the media type(s) being requested for the call, the codecs supported by the endpoint (audio, video and/or data conferencing), the supported frame rates, and the supported screen sharing formats and/or resolutions. The settings manager 218A retrieves the codec list(s)

206 and the media preferences list(s) applicable to the call type(s), and determines a source media settings list. The settings manager 218A determines the source media settings list based on the media type(s) of the requested call, the prioritization of the source site's 100A applicable codec list(s) and the media preferences indicated in the source site's 100A media preference list(s). The source media settings list includes a prioritized list of the codecs supported by the source site 100A that are relevant to the media type of the requested call. The source media settings list also includes, depending on the requested media type, the priority order of the requested media type and one or more of the voice preferences list, video preferences list and a data conferencing preferences list. In one embodiment, the source media settings lists are predetermined and stored in the administrator settings storage 208.

The settings manager 218A communicates signal 310 with the bandwidth manager 220A to filter the source media settings list against the endpoint A media settings list. The result of this filtering resolves a first filtered media preferences list that includes an indication of the media type(s) being requested for the call, a prioritized list of the codecs supported by both the site 100A and the endpoint A that are relevant to requested media type(s), a prioritized list of the frame rate settings supported by both the site 100A and the endpoint A, a prioritized list of the screen sharing format supported by both the site 100A and the endpoint A and/or a prioritized list of the resolution settings supported by both the site 100A and the endpoint A. The frame rates, screen sharing formats and resolution settings are prioritized based on how closely they match the preferences indicated in the media preferences list(s). In one embodiment, the first filtered media preferences list also includes an indication of whether cascading pools is enabled for the source site 100A. In one embodiment, for the purpose of clarity, the first filtered media preferences list is referred to as a "first call settings list."

The settings manager 218A communicates 312 with the bandwidth manager 220A to allocate bandwidth in the applicable media pools based on the first filtered media preferences list. Allocating bandwidth includes reserving bandwidth for the worst case scenario from each of the applicable media pools. In other words, allocating bandwidth reserves bandwidth sufficient to satisfy the most bandwidth expensive codec(s), frame rate, screen-sharing format and resolution from the first filtered media preferences list. In one embodiment, if (1) the required bandwidth for a given pool exceeds the bandwidth available for that pool and (2) the filtered media preferences list includes an indication that cascading pools are enabled, the bandwidth manager borrows bandwidth from the pool of the media type having the next lowest media priority ranking in order to reserve enough bandwidth for the worst case scenario. In one embodiment, instead of borrowing bandwidth from the pool of the media type having the next lowest media priority ranking, bandwidth is borrowed from a pool having a lower media priority ranking in order to reserve enough bandwidth for the worst case scenario. Allocating bandwidth is described in further detail with reference to FIGS. 12 and 13.

The settings manager 218A transmits an invite message 314 to the settings manager 218B of the destination site 100 B. The invite message includes the first filtered media preferences list. An invite message is a message used to establish communication of one or more media types between different communication agents (e.g., one or more of an endpoint, a call manager 150, etc.). In one embodiment, a single call manger 150 manages bandwidth for two or more sites, and an invite message is a signal internal to the components of the call manager 150 used to build a call between two or more endpoints or between an endpoint and a conference bridge. It will be understood to persons having ordinary skill in the art that the term "invite message" is not intended to limit the scope of the disclosure to devices that use session initiation protocol ("SIP"). Instead, the communication agents can use SIP, H.323, Media Gateway Control Protocol, Simple Gateway Control Protocol and/or protocols that are predecessors, successors, derivative and/or similar to any of these protocols. For example, in one embodiment the apparatuses and methods described herein use a proprietary protocol based on SIP (i.e., a protocol that is a derivative of SIP). In another embodiment, different communication agents use different protocols, and the call manager includes conventional technology for translating communications between the different protocols.

The settings manager 218B receives and analyzes the invite message 314 to determine the requested media type(s) for the call. The settings manager 218B determines the destination media preferences list similar to how the settings manager 218A determines the source media preferences list. In one embodiment, the destination media preferences list is predetermined and stored in the administrator settings storage 208 at the destination site 100B. The destination media preferences list includes information similar to the source media preferences list. The settings manager 218B communicates 316 with the bandwidth manager 220B to filter the destination media preferences list against the first filtered media preferences list similar to the filtering occurring for communication 310. This filtering resolves a second filtered media preferences list. The second filtered media list includes an indication of the media type(s) being requested for the call, a prioritized list of the codecs supported by site 100B, site 100A and endpoint A that are relevant to requested media type(s), a prioritized list of the frame rate settings supported by site 100A, site 100B and endpoint A, a prioritized list of the screen sharing format supported by site 100A, site 100B and endpoint A and/or a prioritized list of the resolution settings supported by site 100A, site 100B and endpoint A.

The settings manager 218B communicates 318 with the bandwidth manager 220B to allocate bandwidth in the applicable media pool(s). The allocation of bandwidth that occurs with communication 318 is similar to the allocation that occurs with communication 312. The settings manager 218B communicates 320 an offer message to the endpoint B. The offer message includes the second filtered media preferences list. The endpoint B receives the offer message 320 and transmits an answer message 322 to the settings manager 218B. The answer message 322 includes an endpoint B media preferences list. The endpoint B media preferences list includes information similar to the endpoint A media preferences list. The settings manager 218B receives 322 the endpoint B media preferences list and determines a call settings list that includes the actual media settings that will be used to connect the call. Specifically, the call settings list includes a description of: (1) the highest priority codec(s) supported by site 100A, site 100B, endpoint A and endpoint B that are relevant to requested media type(s); (2) the highest priority frame rate supported by site 100A, site 100B, endpoint A and endpoint B; (3) the highest priority screen sharing format supported by site 100A, site 100B, endpoint A and endpoint B; and/or (4) the highest priority resolution setting supported by site 100A, site 100B, endpoint A and endpoint B. Accordingly, in one embodiment, the call settings list includes a description of the call settings negotiated among more than one site for connecting the call. In one embodiment, the call settings list includes a description of the call settings negotiated among the source site, destination site and any intervening via sites.

The settings manager 218B communicates 324 with the bandwidth manager 220B to update the bandwidth pools based on the call settings list. Updating the bandwidth pools comprises adjusting the bandwidth reserved from the pool(s) so that they are sufficient to satisfy the requirements of the call settings list. In one embodiment, updating the bandwidth pools includes releasing bandwidth back to the media pools since the call settings list may require less bandwidth than the worst case scenario accounted for in communication 318.

The settings manager 218B transmits 326 an answer message to the settings manager 218A of the destination site 100A. The answer message includes the call settings list. The settings manager 218A receives the answer message 326. The settings manager 218A communicates 328 with the bandwidth manager 220A to update the bandwidth pools similar to the updating done for communication 324. The settings manager 218A communicates an answer message 330 to the endpoint A. The call is connected when endpoint A receives the answer message. In one embodiment the bandwidth manager 220A tracks the call connection and adjusts bandwidth allocated from the pools based on fluctuations in bandwidth requirements necessary to keep the call connected. Tracking the call connection also enables the bandwidth manager 220A to reallocate bandwidth to the bandwidth pools after the call is terminated.

After some duration of time the endpoint A communicates a termination message 332 to the settings manager 218A. The settings manager 218A communicates 334 an indication of the termination message 332 to the bandwidth manager 220A and the bandwidth manager 220A reallocates bandwidth in the pools. In one embodiment, reallocating bandwidth in the pools includes (1) releasing bandwidth used to connect the call; and (2) redistributing this bandwidth to the lower priority pools. Reallocating bandwidth in the pools is described in further detail with reference to FIGS. 17A-17E. The settings manager 218A transmits a termination message 336 to the settings manager 218 B. The settings manager 218B receives termination message 336. The settings manager 218B communicates 338 with the bandwidth manager 220B to reallocate bandwidth in the pools as described for communication 334. The settings manager 218B transmits a termination signal 340 to the endpoint B. The call ends when the endpoint B receives the termination message. A person having ordinary skill in the art will recognize that the termination signal can originate from endpoint B instead of endpoint A. In this scenario, termination signals 332, 336 and 340 go from the destination site 100B to the source site 100A and communication 338 occurs before communication 334.

Figure 3C:
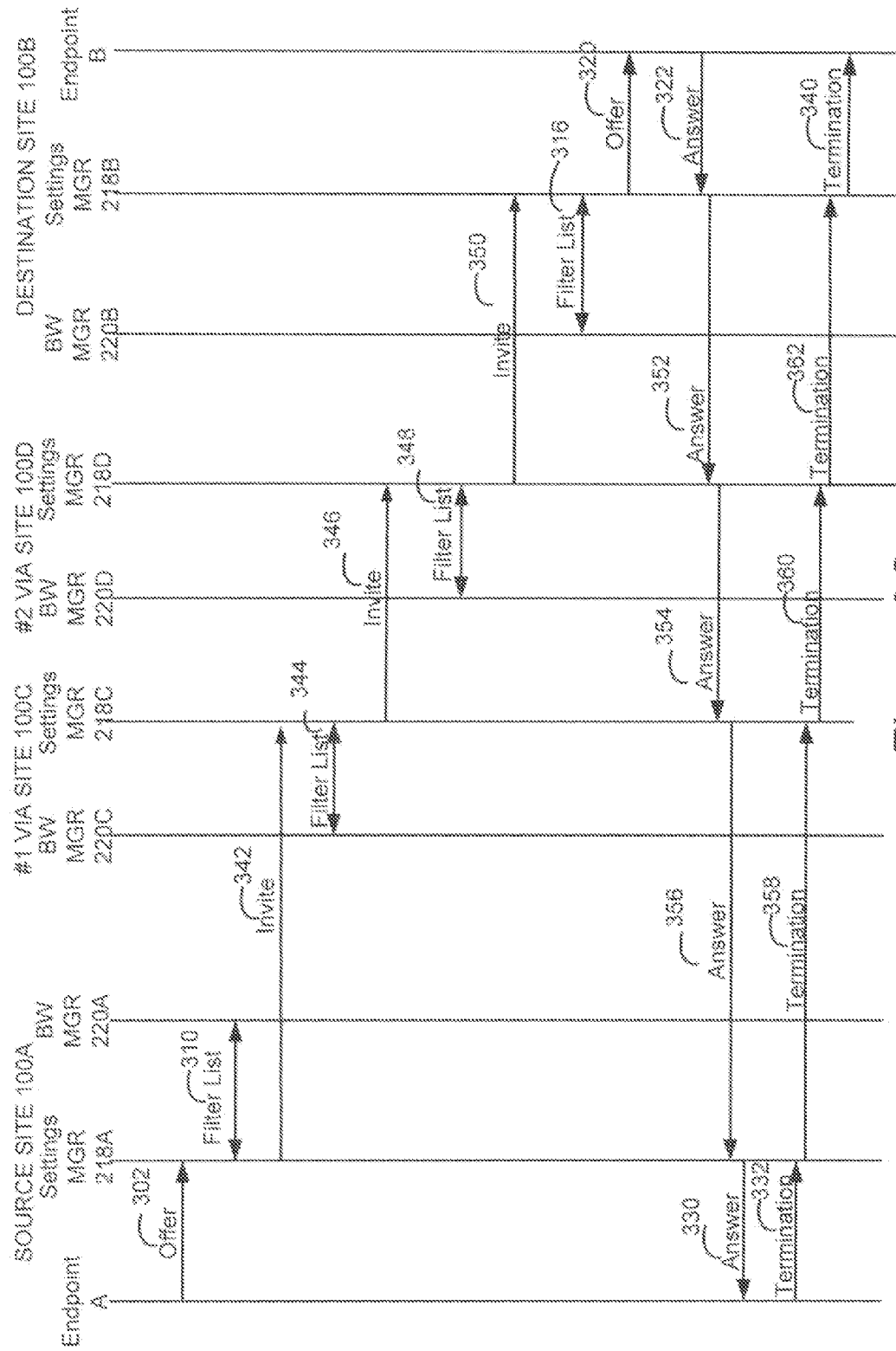

Turning now to FIG. 3C, depicted is a diagram illustrating a method for managing bandwidth for a call according to one embodiment of the present invention. FIG. 3C includes features similar to FIG. 3B, and so, descriptions for these features will not be repeated here. Like features have like reference numbers. The difference between FIG. 3B and FIG. 3C is that FIG. 3C depicts a method for an embodiment having two via sites (a first via site 100C and a second via site 100D) and no bandwidth pools.

At communication 310, the settings manager 218A filters the source media settings list against the endpoint A media settings list, communicates with the bandwidth manager 220A to determine bandwidth requirements for the worst case scenario as described for FIG. 3B and reserves bandwidth at the source site 100A accordingly. The settings manager 218A determines mapping information for the first via site 100C. The process for determining the mapping information is described in further detail with reference to FIGS. 4, 5, 11A (step 1116) and 11B (step 1134). The settings manager 218A transmits 342 an invite message to the settings manager 218C of the first via site 100C. The invite message 342 includes the first filtered media preferences list described for FIG. 3B.

The settings manager 218C receives and analyzes the invite message 342 to determine the requested media type(s) for the call, determine a first via preferences list and filter 344 the list similar to the filtering 316 for the destination site 100B described for FIG. 3B. The first via preferences list includes information similar to the destination media preferences list. The list resolved as a result of the filtering done at communication 344 is referred to as the third filtered media preferences list. The settings manager 218C determines mapping information for the second via site 100D. The settings manager 218C transmits an invite signal 346 to the settings manager 218D of the second via site 100D. The settings manager 218D repeats the steps performed by the first via site 100C. In performing these steps, the settings manager 218D determines a second via preferences list. The second via preferences list includes information similar to the first via preferences list. The list resolved as a result of the filtering done at communication 348 is referred to as the fourth filtered media preferences list. The settings manager 218D transmits an invite message 350 to the settings manager 218B of the destination site 100B.

The settings manager 218B for the destination site 100B transmits messages and performs steps similar to those described for FIG. 3B (e.g., signals 316, 318, 320, 322 and 324).

In this embodiment, the second filtered media preferences list includes an indication of the media type(s) being requested for the call, a prioritized list of the codecs supported by site 100A, site 100B, site 100C, site 100D and endpoint A that are relevant to requested media type(s), a prioritized list of the frame rate settings supported by site 100A, site 100B, site 100C, site 100D and endpoint A, a prioritized list of the screen sharing format supported by site 100A, site 100B, site 100C, site 100D and endpoint A and/or a prioritized list of the resolution settings supported by site 100A, site 100B, site 100C, site 100D and endpoint A.

Also in this embodiment, the call settings list includes: (1) the highest priority codec(s) supported by site 100A, site 100B, site 100C, site 100D, endpoint A and endpoint B that are relevant to requested media type(s); (2) the highest priority frame rate supported by site 100A, site 100B, site 100C, site 100D, endpoint A and endpoint B; (3) the highest priority screen sharing format supported by site 100A, site 100B, site 100C, site 100D, endpoint A and endpoint B; and/or (4) the highest priority resolution setting supported by site 100A, site 100B, site 100C, site 100D, endpoint A and endpoint B.

The destination site sends an answer message 352 to the settings manager 218D for the second via site 100D. The settings manager 218D receives the answer message 352 and transmits an answer message 354 to the settings manager 218C for the first via site 100C. The settings manager 218C receives the answer message 354 and transmits an answer message 356 to the settings manager 218A for the source site 100A. The settings manager 218A receives the answer message 356 and transmits an answer message 330 to the endpoint A. The call is connected when the endpoint A receives the answer message 330.

The above-described process is referred to herein as propagating the answer message from the endpoint B to the endpoint A. In one embodiment, propagating an answer message means to transmit an answer message from an endpoint that originated the answer message to the endpoint that is the intended recipient of the answer message. For example, turning to FIG. 3B, communication 326 is an example of one embodiment of propagating an answer message. In another embodiment, propagating an answer message includes transmission of the answer message from the originating endpoint to one or more via sites prior to the receipt of the answer message by the endpoint that is the intended recipient of the answer message. For example, turning to FIG. 3C and FIG. 3D, communications 322, 352, 354, 356, 330 are examples of propagating an answer message. In one embodiment, propagating an answer message also includes, for example in FIG. 3D, communications 324, 368, 370 and 328 since these steps are included, in one embodiment, in building a call between endpoints. In one embodiment, a conference bridge with a call manager 150 component originates the answer message. In another embodiment, the conference bridge with a call manager 150 component is the intended recipient of the answer message.

After a period of time the endpoint A transmits a termination message 332 to the settings manager 218A. The settings manager 218A transmits a termination message 358 to the settings manager 218C of the first via site 100C. The settings manager 218C receives the termination message 358 and transmits a termination message 360 to the settings manager 218D. of the second via site 100D. The settings manager 218D receives the termination message 360 and transmits a termination message 362 to the settings manager 218B of the destination site 100B. The settings manager 218B receives the termination message 362 and transmits a termination message 340 to the endpoint B. The call is terminated when endpoint B receives the termination message 340. The above described process is referred to herein as propagating the termination message from endpoint A to endpoint B. As with FIG. 3B, a person having ordinary skill in the art will recognize that the initial termination message can originate at endpoint B and propagate from endpoint B to endpoint A.

In one embodiment, propagating a termination message means to transmit a termination message from an endpoint that originated the termination message to the endpoint that is the intended recipient of the termination message. For example, turning to FIG. 3B, communication 336 is an example of one embodiment of propagating a termination message. In another embodiment, propagating a termination message includes transmission of the termination message from the originating endpoint to one or more via sites prior to the receipt of the termination message by the endpoint that is the intended recipient of the termination message. For example, turning to FIG. 3C and FIG. 3E, communications 332, 358, 360, 362, 340 are examples of propagating a termination message. In one embodiment, propagating a termination message also includes, for example in FIG. 3E, communications 334, 372, 374 and 338 since these steps are included, in one embodiment, in breaking down a call between endpoints. In one embodiment, a conference bridge with a call manager 150 component originates the termination message. In another embodiment, the conference bridge with a call manager 150 component is the intended recipient of the termination message.

Figure 3D:
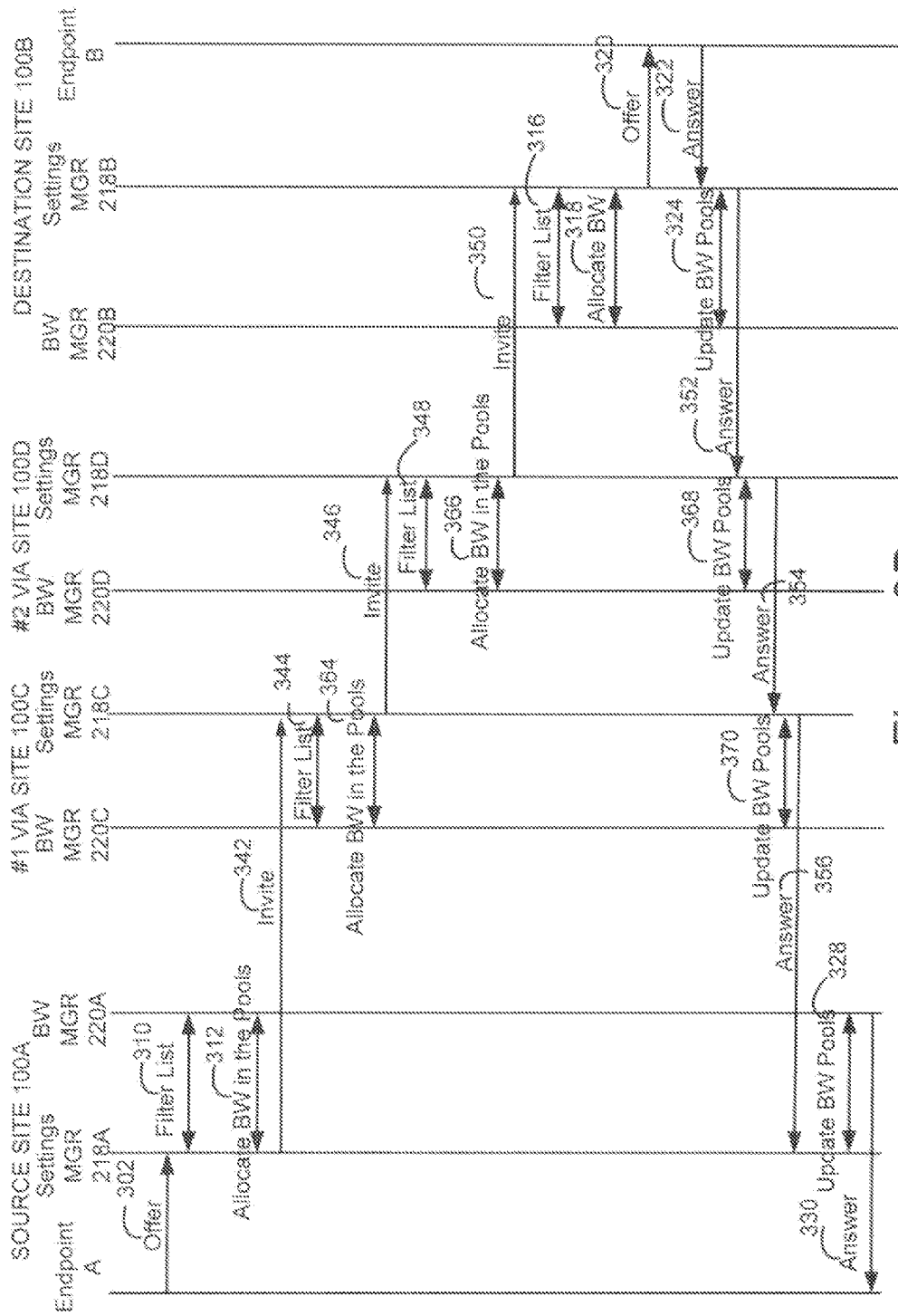

Turning now to FIG. 3D, depicted is a diagram illustrating a method for managing bandwidth for a call between an endpoint A and an endpoint B according to one embodiment of the present invention. FIG. 3D includes features similar to FIGS. 3B and 3C, and so, descriptions for these features will not be repeated here. Like features have like reference numbers. The difference between FIG. 3C and FIG. 3D is that FIG. 3D depicts a method for an embodiment having two via sites and bandwidth pools. Further differences are described below.

After the settings manager 218C communicates 344 to generate the third filtered media preferences list, the settings manager 218C communicates 364 to allocate bandwidth in the via site 100C media pools. The allocation that occurs for communication 364 is similar to the allocation that occurs for communication 312. After the settings manager 218D communicates 348 to generate the fourth filtered media preferences list, the settings manager 218D communicates 366 to allocate bandwidth in the via site 100D media pools. The allocation that occurs for communication 366 is similar to the allocation that occurs for communication 312. The second filtered media preferences list and the call settings list are as described for FIG. 3C.

During the process of propagating the answer message from endpoint B to endpoint C, the settings manager 218D communicates 368 to update the bandwidth pools for the second via site 100D. The updates that occur for communications 368 and 370 are similar to the update that occurs for communication 324 in FIG. 3B.

Figure 3E:
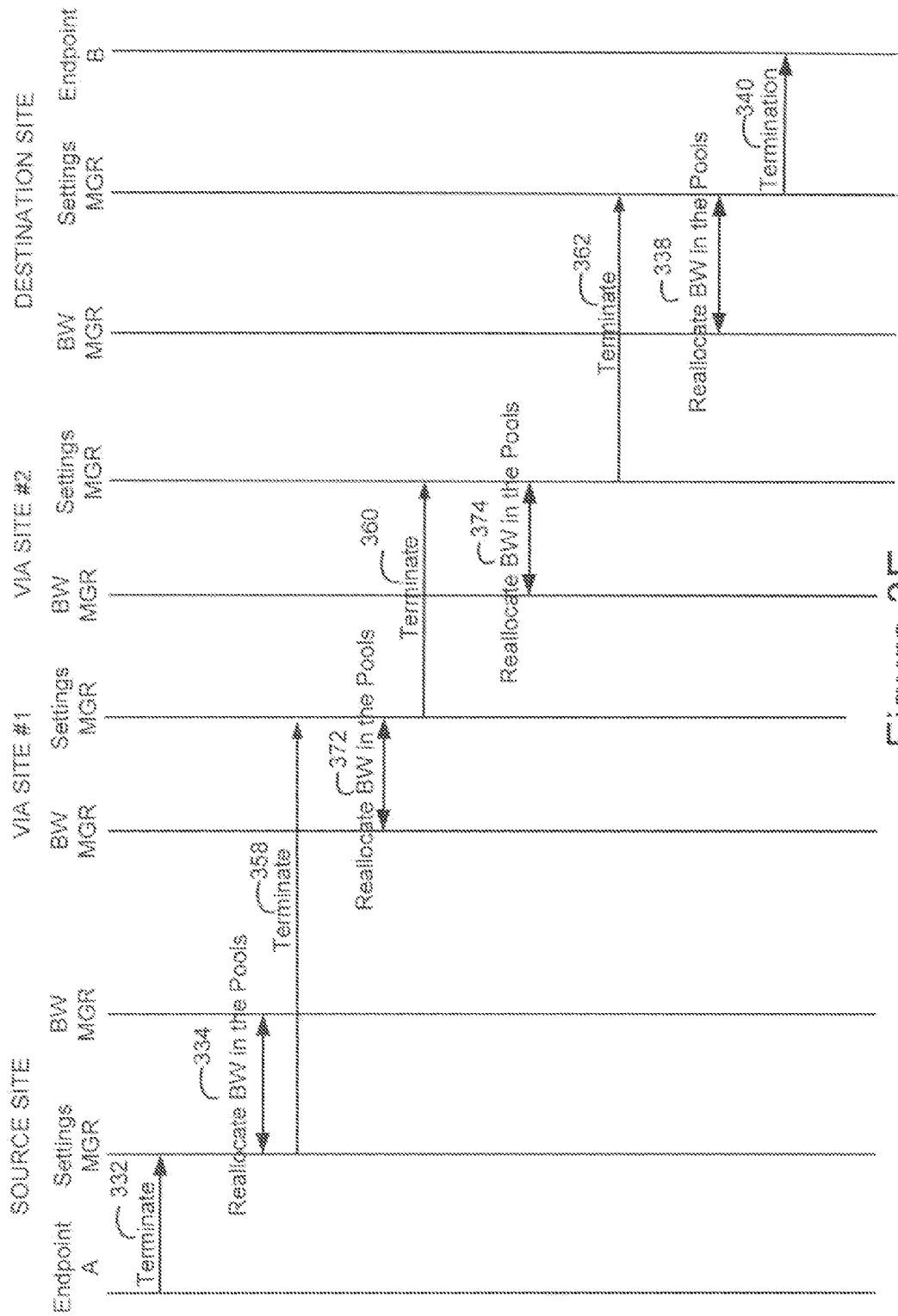
FIG. 3E is a diagram illustrating a method for terminating a call according to one embodiment of the present invention.

Turning now to FIG. 3E, depicted is a diagram illustrating a method for terminating a call between an endpoint A and an endpoint B according to one embodiment of the present invention. FIG. 3E includes features similar to FIGS. 3B and 3C, and so, descriptions for these features will not be repeated here. Like features have like reference numbers. FIG. 3E is a continuation of the method depicted in FIG. 3D. Specifically, FIG. 3E depicts termination of the call connected by the method depicted in FIG. 3D.

Some period of time after the endpoint A receives the answer message 330, the endpoint A transmits a termination message 332 similar to the one described with reference to FIG. 3B. This termination message is propagated to the endpoint B similar to the answer message. Message 334 is as described with reference to FIG. 3B. Messages 358, 360 and 362 are as described with reference to FIG. 3C. Messages 372 and 374 are similar to message 338 described with reference to FIG. 3B. Messages 338 and 340 are as described with reference to FIG. 3B.

In one embodiment a site such as site 100 does not have a switch 130, and instead has a processor-based device including a call manager 150 and a configuration storage module 202 that is used instead of the switch 130. For example, a site 100 includes a conference bridge that has a call manager 150 and a configuration storage module 202 comprised within the conference bridge.

In another embodiment, a single switch 130 manages bandwidth for two or more sites 100. One having ordinary skill in the art will recognize that a single switch 130 can be communicatively coupled with two or more sites 100 (that may or may not be geographically disparate locations from one another) and configured to provide the bandwidth management functionality described herein. For example, site 100A is located in Chicago, a site 100C is located in Seattle, site 100D is located in Boise and site 100B is located in Melbourne, Australia. The endpoint A is at the site 100A in Chicago and the endpoint B is at the site 100B in Melbourne. A single switch 130 is communicatively coupled to each site 100A, 100B, 100C, 100D. In other words, the call manager 150 for this one switch includes components as described for FIG. 2 that are configured to manage bandwidth for more than one site 100. For example, upon receiving an offer message 302 from endpoint A requesting communications with endpoint B, the switch 130 does not communicate with a different call manager, but instead handles all the above communications internally among the different components of the single call manager 150 so that a call between endpoint A and endpoint B is connected similar to as described above, for example, as described above for FIG. 3C. In one embodiment, the sites 100A, 100B, 100C, 100D have different pools for different media types, and the call manager 150 allocates bandwidth among different pools for the different sites 100A, 100B, 100C, 100D similar to as described above, for example, as described above for FIG. 3B and/or FIG. 3D.

Figure 4:
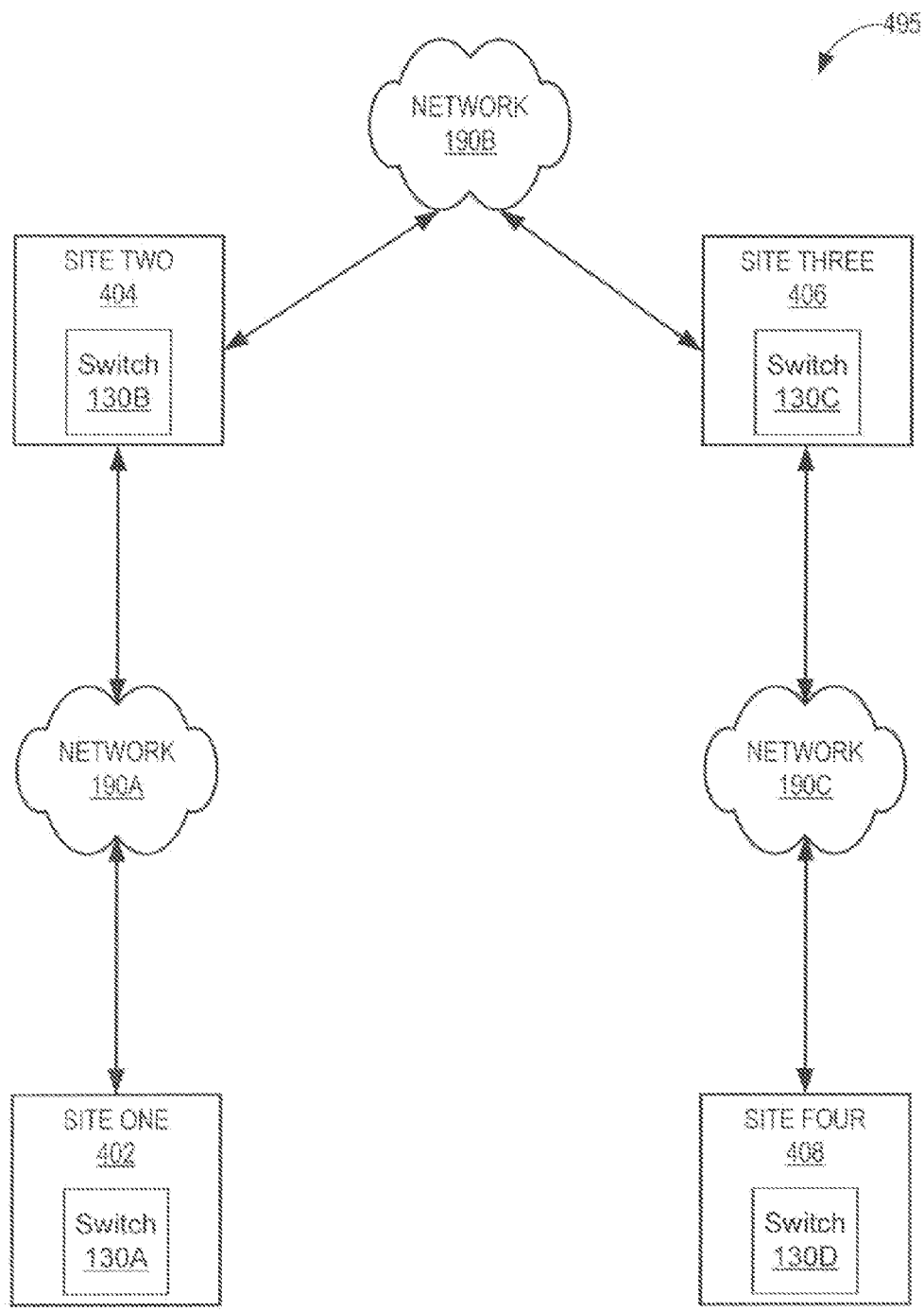
FIG. 4 is a high-level block diagram illustrating a functional view of a distributed telephony system according to one embodiment of the present invention.

FIG. 4 is a high-level block diagram illustrating a functional view of a distributed telephony system according to one embodiment of the present invention. More specifically, depicted is an embodiment in which the system 495 comprises four sites 402, 404, 406, 408 and three networks 190A, 190B, 190C. Each site comprises a switch 130A, 130B, 130C, 130D, respectively. Site one 402 is communicatively coupled to the first network 190A. The first network 190A is communicatively coupled to site two 404. Site two 404 is communicatively coupled to the second network 190B. The second network 190B is communicatively coupled to site three 406. Site three 406 is communicatively coupled to the third network 190C. The third network 190C is communicatively coupled to site four 408.

Figure 5:
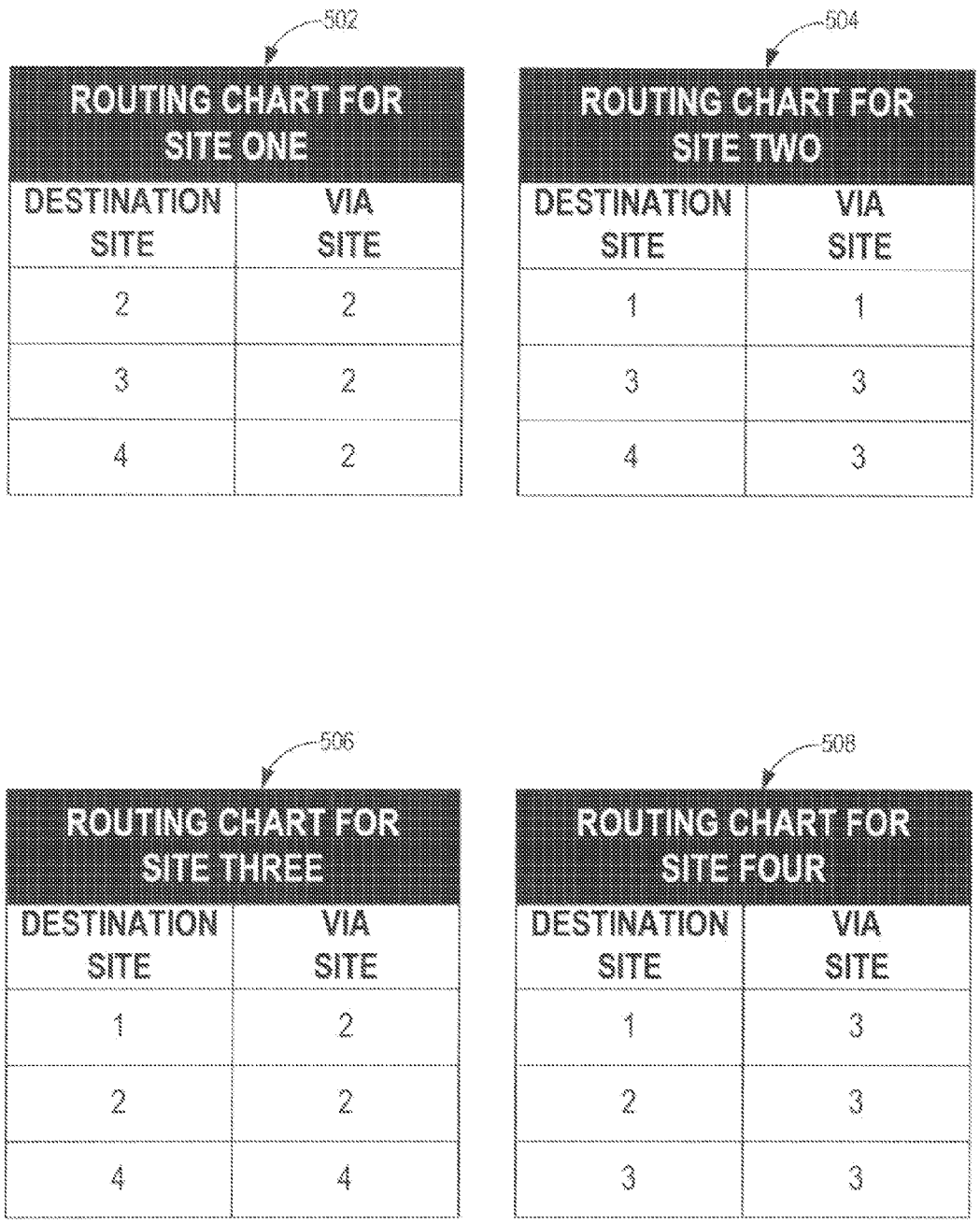
FIG. 5 is a diagram illustrating mapping coordinates for different sites in a distributed telephony system according to one embodiment of the present invention.

Turning now to FIG. 5, depicted is a diagram illustrating mapping coordinates for different sites in a distributed telephony system according to one embodiment of the present invention. More specifically, FIG. 5 depicts the mapping coordinates for system 495 depicted in FIG. 4.

The mapping coordinates depicted in FIG. 5 is stored in each site's own administrator settings storage 208 and used by each site's own location service engine 216 to determine how to route calls for a given destination site (i.e., "determine mapping information"). More specifically, if the location service engine 216 is provided information describing the destination site for a given call, the call manager 150 can use the mapping coordinates stored in the site's storage 208 to determine which via site to send the call signals to in order to connect the call to the destination site.

In some instances the via site will be the destination site. In these cases the location service engine 216 of the via site receives the call signal and proceeds in taking steps necessary to connect the call. In other instances the via site is not the destination site. Each via site also has mapping coordinates stored in the site's administrator settings storage 208. Thus, in cases where the via site is not the destination site, the via site's call manager 150/location service engine 216: (1) receives the call signal; (2) determines the destination site for the call; (3) retrieves mapping coordinates; (3) determines mapping information to communicate the call signal to the next via site based on the destination site for the call and the mapping coordinates; and (4) sends an appropriate call signal to the next via site.

Chart 502 includes mapping coordinates for site one 402. If the destination site for a call signal is site two 404, then the next via site is site two 404. If the destination site for a call signal is site three 406, then the next via site is site two 404. If the destination site for a call signal is site four 408, then the next via site is site two 404.

Chart 504 includes mapping coordinates for site two 404. If the destination site for a call signal is site one 402, then the next via site is site one 402. If the destination site for a call signal is site three 406, then the next via site is site three 406. If the destination site for a call signal is site four 408, then the next via site is site three 406.

Chart 506 includes mapping coordinates for site three 406. If the destination site for a call signal is site one 402, then the next via site is site two 404. If the destination site for a call signal is site two 404, then the next via site is site two 404. If the destination site for a call signal is site four 408, then the next via site is site four 408.

Chart 508 includes mapping coordinates for site four 408. If the destination site for a call signal is site one 402, then the next via site is site three 406. If the destination site for a call signal is site two 404, then the next via site is site three 406. If the destination site for a call signal is site three 406, then the next via site is site three 406.

Figure 6:
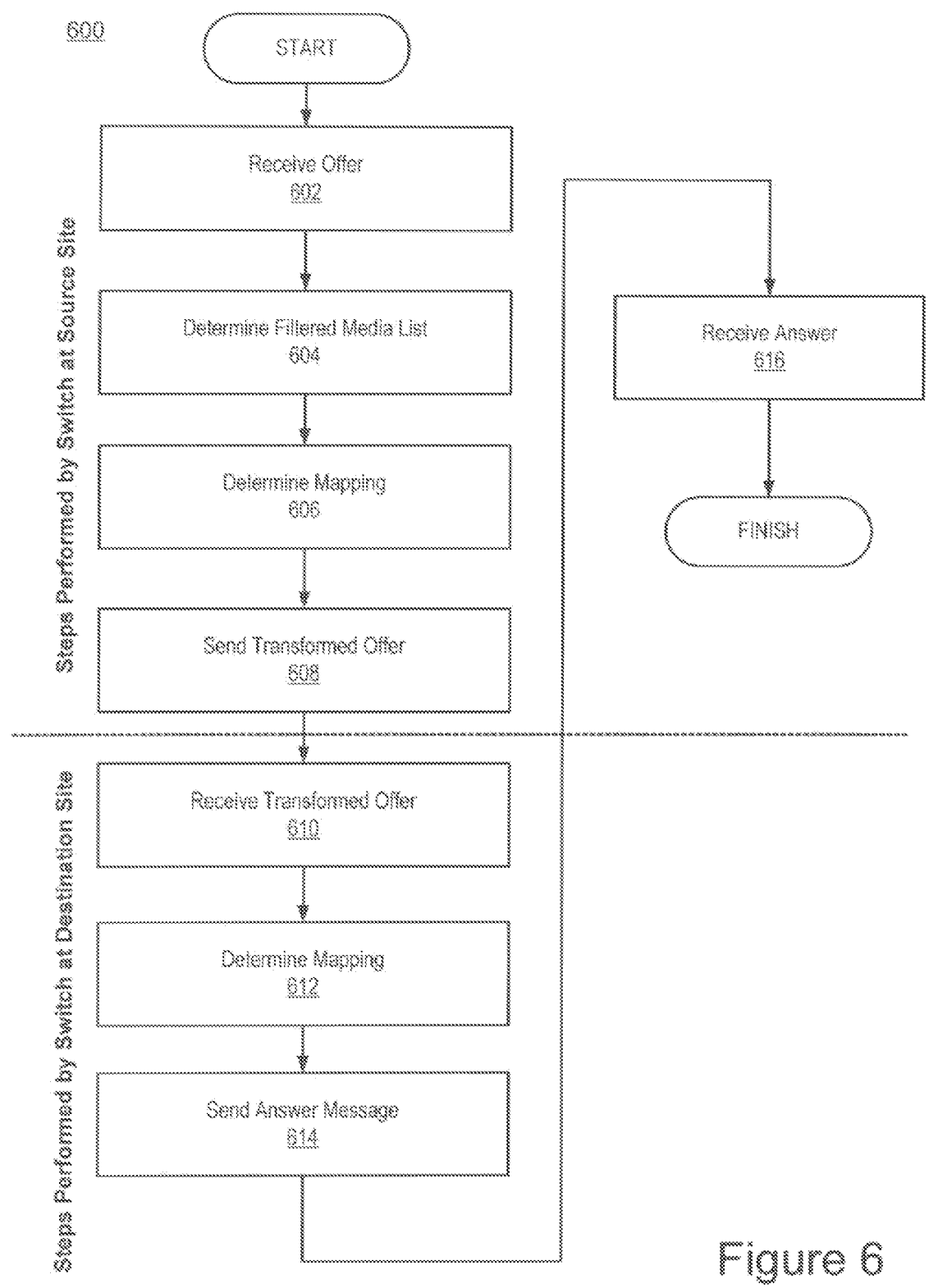
FIG. 6 is a flowchart illustrating a method for managing bandwidth for a call between two endpoints using pooled bandwidth according to one embodiment of the present invention.

Turning now to FIG. 6, depicted is a flowchart illustrating a method 600 for managing bandwidth for a call using pooled bandwidth according to one embodiment of the present invention. The steps depicted in FIG. 6 correlate to the method described for FIG. 3A. For the purpose of clarity, the switch at the source site is referred to as switch 130A and the switch at the destination site is referred to as switch 130B. The switch 130A receives 602 an offer message (communication 302). The switch 130A determines 604 a first filtered media preferences list. The switch 130A retrieves mapping coordinates and determines 606 mapping information for the destination site. The switch 130A sends 608 a transformed offer to the destination site (communication 304). The switch 130B at the destination site receives 610 the transformed offer (communication 304). The switch 130B retrieves mapping coordinates and determines 612 mapping information for the source site. The switch 130B sends 614 an answer message to the source site (communication 306). The source site receives 616 the answer from the destination site (communication 306).

Figure 7:
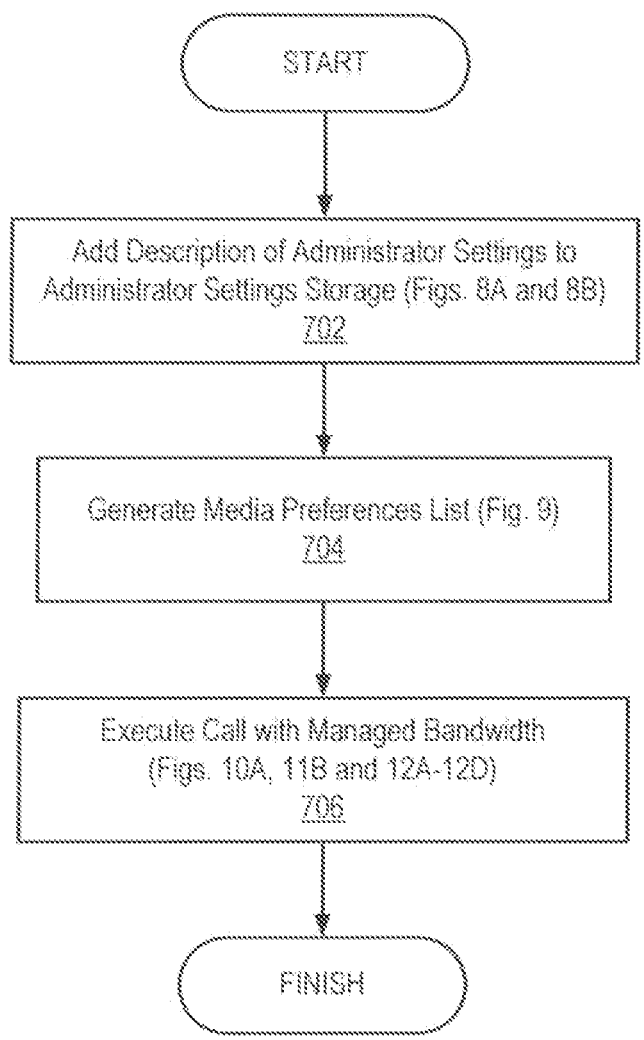
FIG. 7 is a flowchart illustrating a method managing bandwidth for a call between two endpoints according to one embodiment of the present invention.

Turning now to FIG. 7, depicted is a flowchart illustrating a method 700 for managing bandwidth for a call between two endpoints according to one embodiment of the present invention. At step 702 a description of administrator settings are added to the administrator settings storage 208. For example, the description of the media preferences list, priority rankings for the media preferences list or priority rankings for the media types are added to the administrator settings storage 208. A media preferences list is generated 704 and a call is executed 706 with the bandwidth managed by the call manager 150.

Figure 8A:
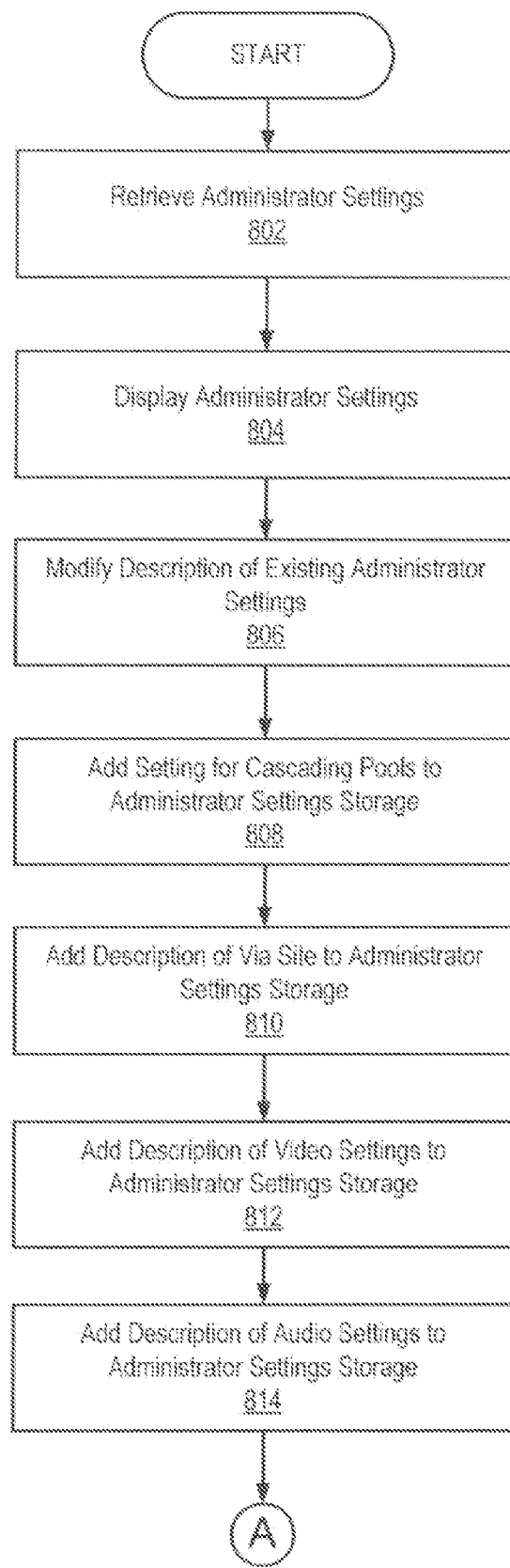
FIGS. 8A and 8B are flowcharts illustrating a method editing administrator settings according to one embodiment of the present invention.
Figure 8B:
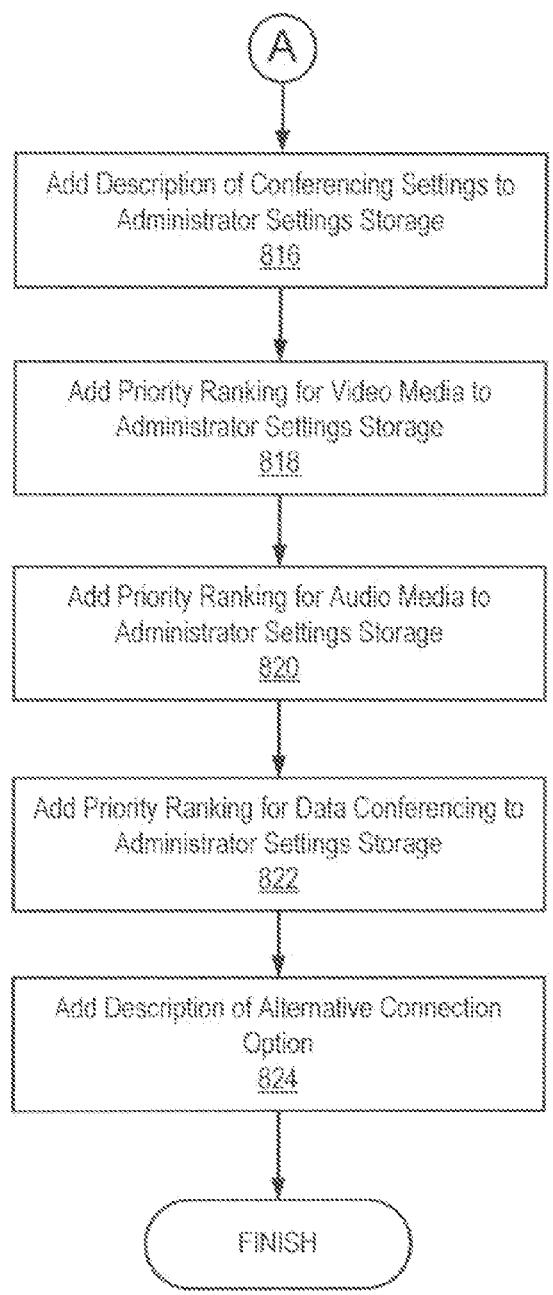

Turning now to FIGS. 8A and 8B, depicted are flowcharts illustrating a method for editing administrator settings 702 according to one embodiment of the present invention. The administrator settings are retrieved 802 from the administrator settings storage 208. The administrator settings are displayed 804 on an interface viewable by a user/administrator. The user/administrator provides input(s) to the interface: (1) modifying 806 a description of existing administrator settings; (2) enabling 808 or disenabling the cascading pools feature; (3) defining 810 a via site; (4) describing 812 preferred settings for video media; (5) describing 814 preferred settings for voice media; (6) describing 816 preferred settings for data conferencing media; (7) defining 818 a priority order for the media settings applicable to video calls; (8) defining 820 a priority order for the media settings applicable to voice calls; (9) defining 822 a priority order for the media settings for data conferencing calls; and/or (10) describing 824 an alternative connection option for use in the event that a preferred media setting cannot be satisfied. For example, the preferred resolution or frame rate for a media cannot be satisfied, the switch 130 can be configured to connect an audio-only call (i.e., a voice call). These inputs are received by the switch 130 and stored in the administrator settings storage 208. In one embodiment, the call settings list 338 described in FIGS. 3B-3E is determined based in part on the priority rankings described above for steps 818-822.

Figure 9:
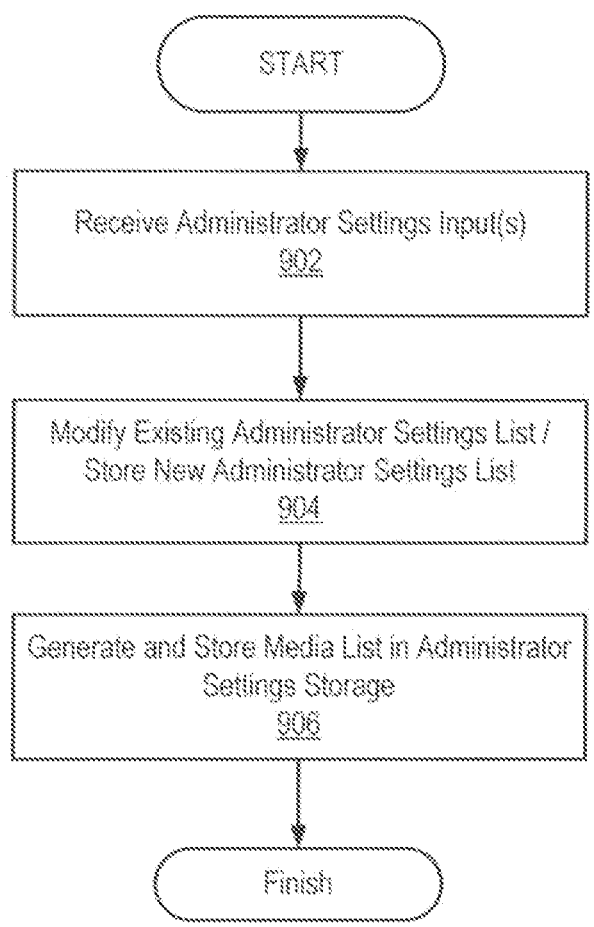
FIG. 9 is a flowchart illustrating a method for generating media preferences lists according to one embodiment of the present invention.

Referring now to FIG. 9, depicted is a flowchart illustrating a method 704 for generating a media preferences lists. Administrator setting inputs are received 902 via an interface of the server 110 as described for FIGS. 8A and 8B. The switch 130 receives the inputs and stores 904 them in the administrator settings storage 208. If existing administrator settings are modified, these modifications are stored 904 in the administrator settings storage 208. The switch 130 generates 906 media preferences lists for each media type based on the inputs in FIGS. 8A and 8B. The switch stores 906 the media preferences lists in the administrator settings storage 208.

FIGS. 10A, 10B and 11A-11E depict flowcharts illustrating methods for managing bandwidth for a call according to various embodiments of the prevent invention.

Figure 10A:
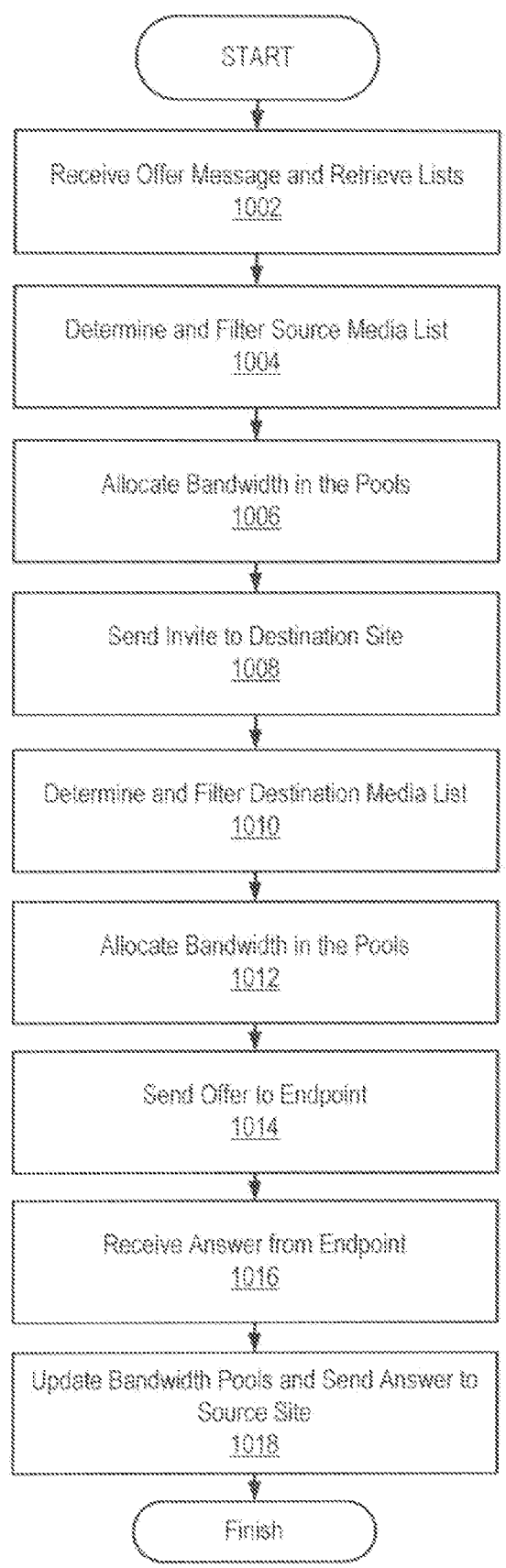
FIGS. 10A, 10B and 11A-11E are flowcharts illustrating methods for managing bandwidth for a call between two endpoints using pooled bandwidth according to several embodiments of the present invention.

Referring to FIG. 10A, the method 706A depicted here corresponds to the method depicted in FIG. 3B. For the purpose of clarity, the switch at the source site is referred to as switch 130A and the switch at the destination site is referred to as switch 130B. The switch 130A receives 1002 an offer message from the endpoint A (communication 302). The switch 130A determines and filters 1004 the source media preferences list (communication 320). The switch 130A allocates 1006 bandwidth in the pools (communication 312). The switch 130A determines mapping information and sends an invite 1008 to the destination site (communication 314).

The destination site receives the invite. The switch 130B determines and filters 1010 the destination media preferences list (communication 316). The switch 130B allocates 1012 bandwidth in the destination site's pools (communication 318). The switch 130B sends 1014 an offer message to endpoint B (communication 320). The switch 130B receives 1016 an answer message from endpoint B (communication 322). The destination site updates the bandwidth in the pools and sends 1018 an answer message to the source site (communications 324 and 326). The answer message is propagated to the endpoint A, and, at a later time, a termination message is propagated from one endpoint to the other.

In one embodiment, the switch 130A determines mapping information for the next site before allocating bandwidth. For example, the switch 130A determines mapping information for the next site prior to allocating bandwidth in the pools as described for steps 1006 and/or 1012.

Figure 10B:
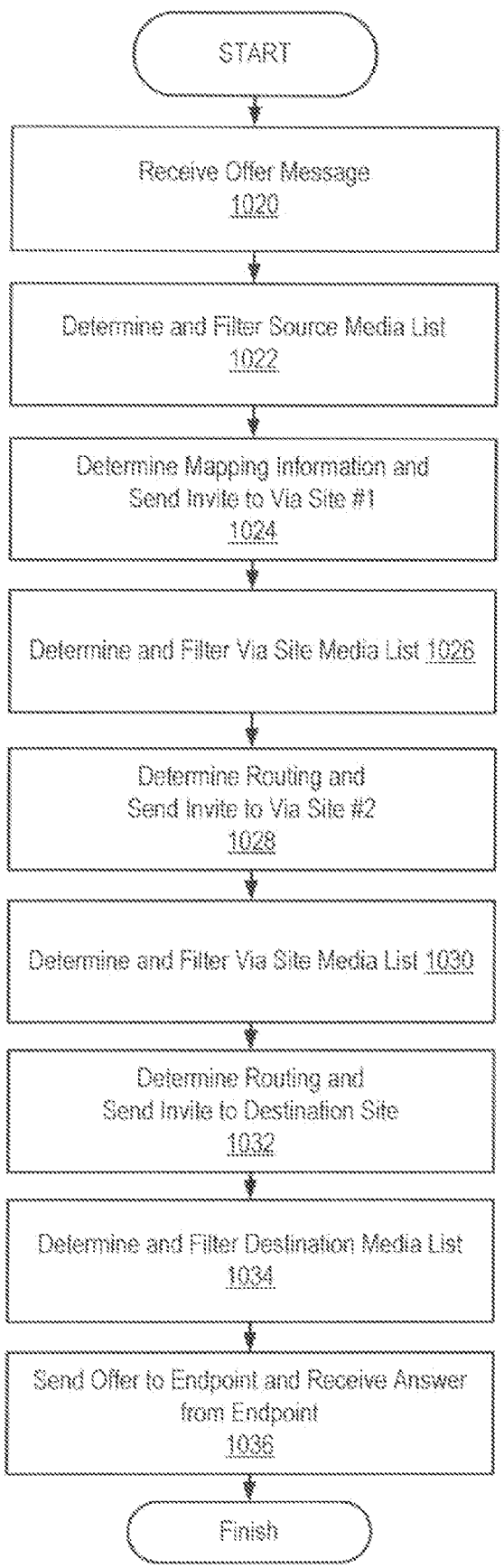
Figure 11A:
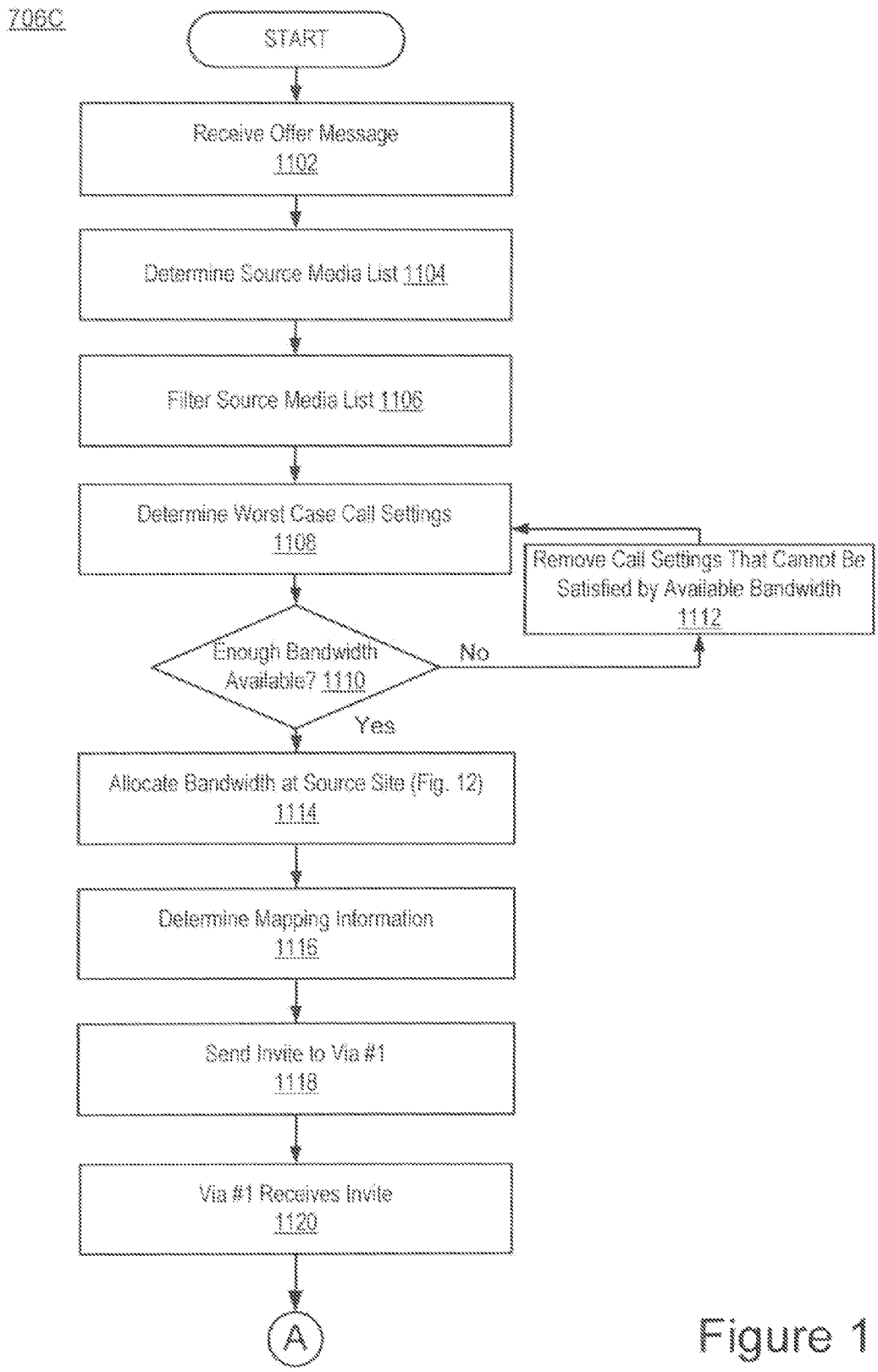
Figure 11B:
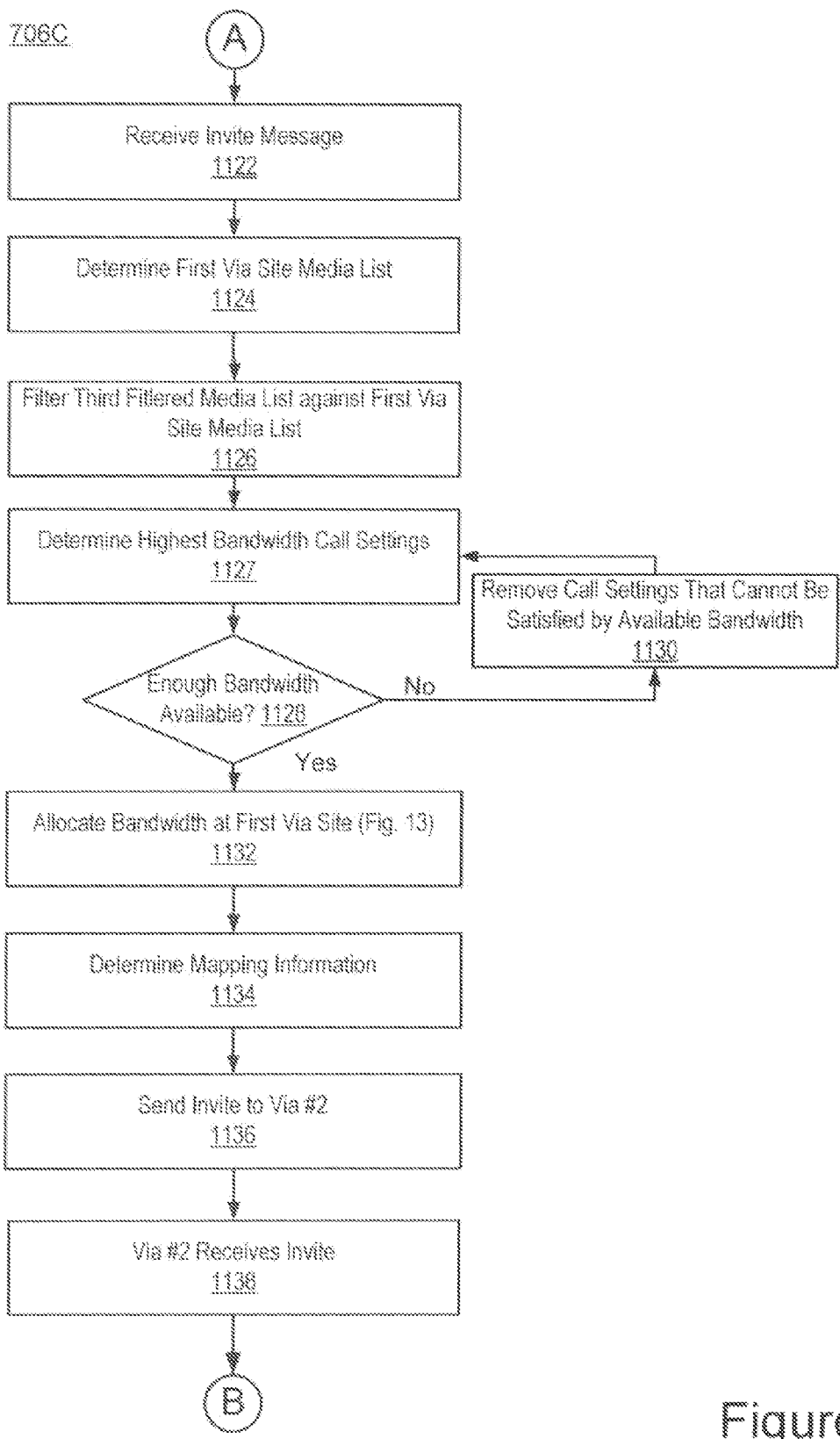
Figure 11C:
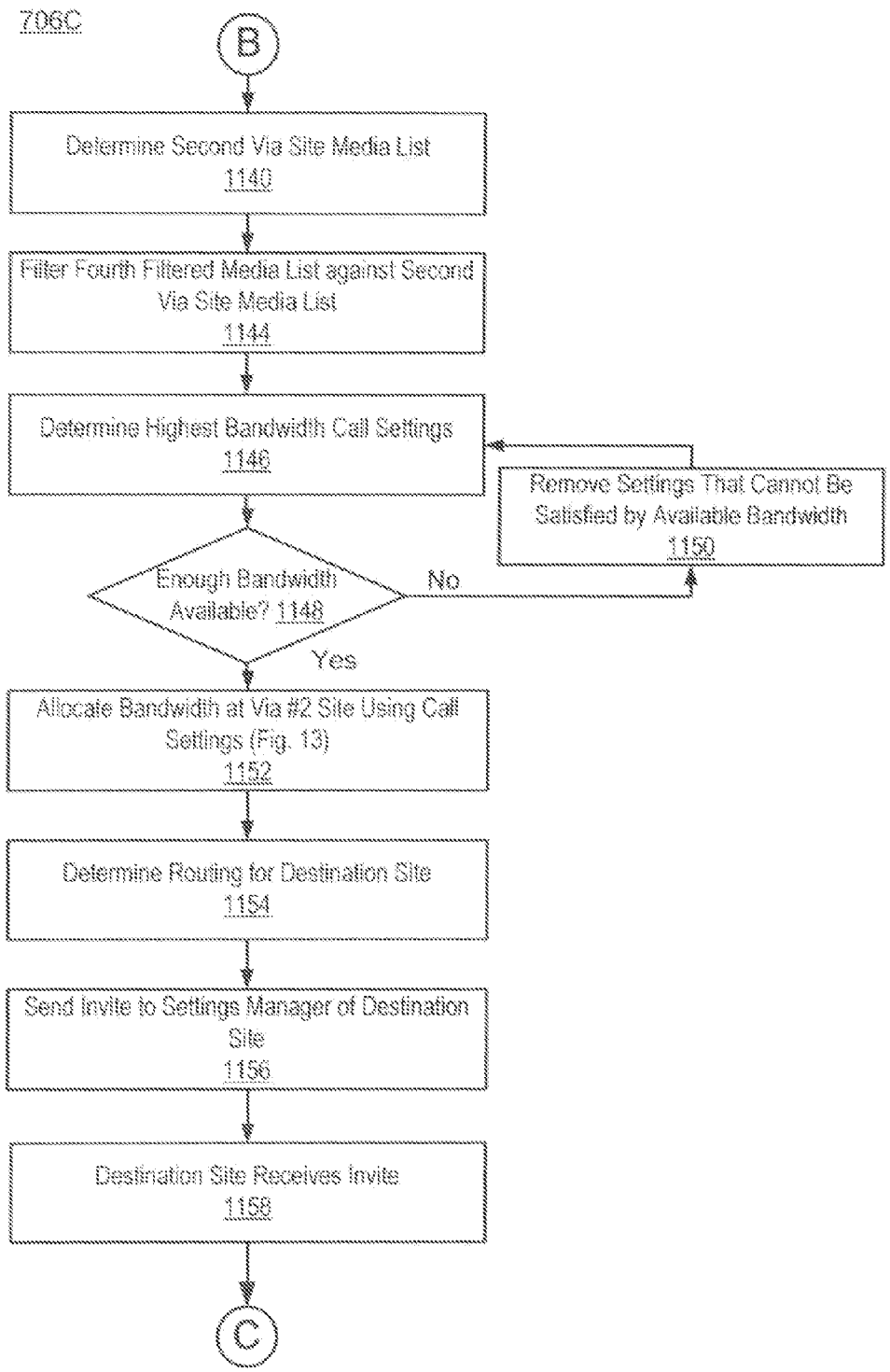
Figure 11D:
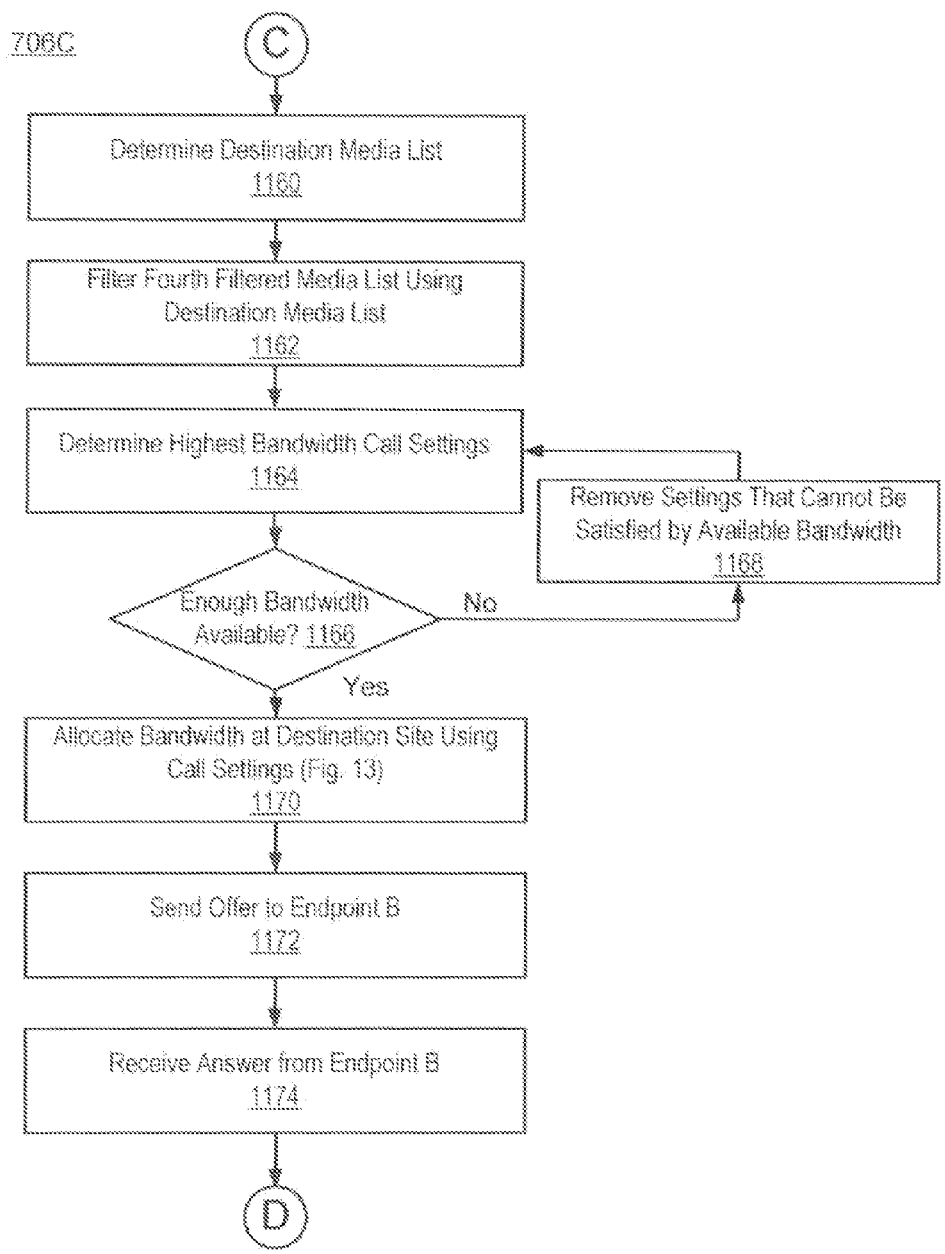
Figure 11E:
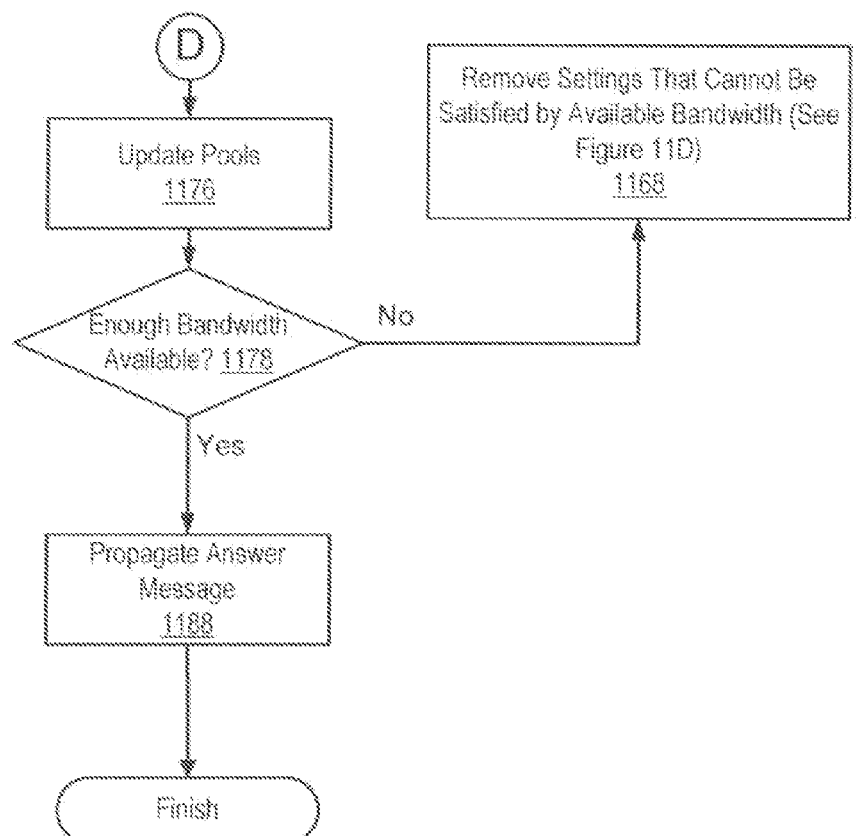

Referring to FIG. 10B, the method 706B depicted here corresponds to the method depicted in FIG. 3C. For the purpose of clarity, the switch at the source site is referred to as switch 130A, the switch at the destination site is referred to as switch 130B, the switch at the first via site is referred to as switch 130C and the switch at the second via site is referred to as switch 130D. The switch 130A receives 1020 an offer message from an endpoint (communication 302). The switch 130A determines and filters 1022 a source media preferences list (communication 320). The switch 130A determines 1024 mapping information and sends an invite to the first via site (communication 342).

The switch 130C for the first via site receives the invite, determines the first via site media preferences list and filters 1026 the list (communication 344). The switch 130C determines 1028 mapping information and sends an invite to the second via site (communication 346). The switch 130D for the second via site receives the invite, determines the second via site media preferences list and filters 1030 the list (communication 348). The switch 130D determines 1032 mapping information and sends an invite to the destination site. The destination site receives the invite, determines and filters 1034 the destination media preferences list (communication 316). The destination site's switch 130B sends 1036 an offer message to the endpoint B (communication 320) and receives an answer message (communication 322). The answer message is propagated to the endpoint A, and, at a later time, a termination message is propagated from one endpoint to the other.

Referring to FIG. 11A-11E, the method 706C depicted here corresponds to the method depicted in FIG. 3D. For the purpose of clarity, the switch at the source site is referred to as switch 130A, the switch at the destination site is referred to as switch 130B, the switch at the first via site is referred to as switch 130C and the switch at the second via site is referred to as switch 130D. The switch 130A receives 1102 an offer message from an endpoint (communication 302). The switch 130A determines 1104 the source media preferences list. The switch 130A filters 1106 the source media preferences list using the endpoint A media preferences list received in the offer (communication 320). The switch 130A determines 1108 the worst case call settings. The switch 130A determines 1110 if the network has enough bandwidth to support the worst case call settings. If enough bandwidth is not available, the switch 130A removes 1112 the settings that require more bandwidth than is available, and then repeats steps 1108 and 1110 until a suitable first filtered media preferences list is found. In one embodiment, the switch 130A removes 1112 the settings that require more bandwidth than is available, and then repeats steps 1106, 1108 and 1110 until a suitable first filtered media preferences list is found. If a suitable first filtered media preferences list cannot be found, the switch 130A sends an error message to the endpoint A. The switch 130A allocates 1114 bandwidth in the pools (communication 312). The switch determines 1116 mapping information and sends 1118 an invite to the first via site (communication 342). The first via site receives 1120 the invite (communication 342).

In one embodiment, the switch 130A determines mapping information for the next site before allocating bandwidth. For example, the switch 130A determines mapping information for the next site prior to allocating bandwidth in the pools as described for step 1114.

FIGS. 11B-11E repeat steps similar to those described above for FIG. 11A (with reference to the description for FIG. 3D), and so that description will not be repeated here.

Figure 12:
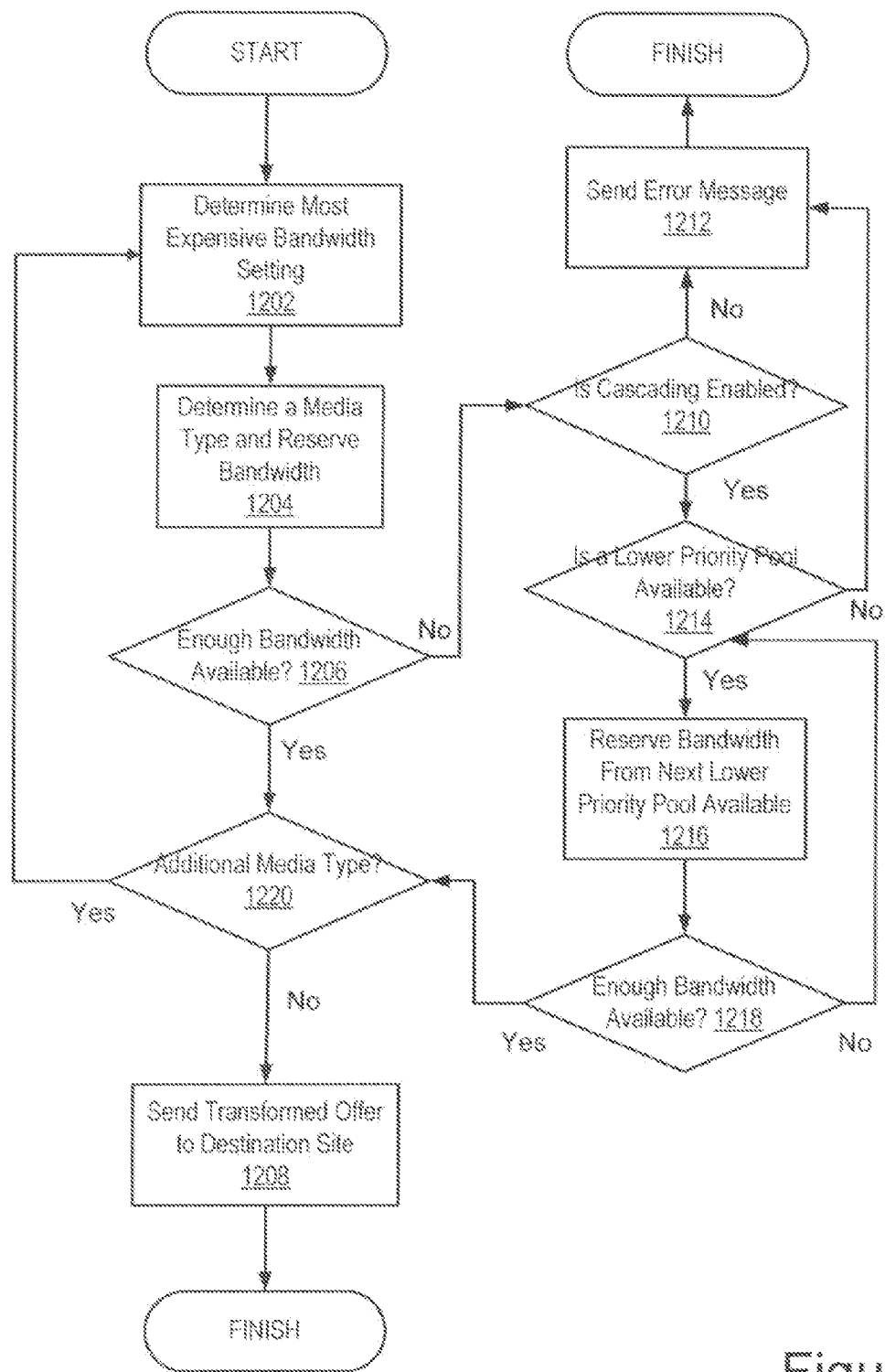
FIGS. 12 and 13 are flowcharts illustrating methods for negotiating variables for a call according to one embodiment of the present invention.

Turning now to FIG. 12, depicted is a flowchart illustrating a method 1200 for allocating pooled bandwidth at a source site according to one embodiment of the present invention. For example, FIG. 12 depicts allocating bandwidth in the pools as described above for FIG. 3B (communication 312), FIG. 3D (communications 312) and FIG. 11A (step 1114). For the purpose of clarity, since the switch is at the source site it is referred to as switch 130A. The switch 130A determines 1202 the most expensive bandwidth setting for all media types based on the first filtered media preferences list. The switch 130A determines 1204 a first media type and reserves bandwidth based on the determination of step 1202. For the first media type, the switch 130A determines 1206 whether enough bandwidth is available for the most expensive bandwidth settings. If enough bandwidth is available, the switch 130A checks to see if there is an additional media type 1220. If there is an additional media type 1220, the method proceeds to step 1202. If there is not an additional media type, the switch 130A sends 1208 the transformed offer to the destination site.

If enough bandwidth is not available, the switch 130A checks 1210 information in the media preferences list to see if cascading pools are enabled. If cascading pools are not enabled, the switch sends 1212 an error message 1212 to the endpoint. If cascading pools are enabled, the switch 130A checks 1214 to see if a lower priority pool is available. If a lower priority pool is not enabled, the switch sends 1212 an error message to the endpoint. If a lower priority pool is available, the switch 130A reserves 1216 bandwidth from the next lower priority pool. The switch 130A checks 1218 to see if enough bandwidth is available. If enough bandwidth is not available, the switch 130A repeats step 1214. If enough bandwidth is available, the method proceeds to step 1220.

Figure 13:
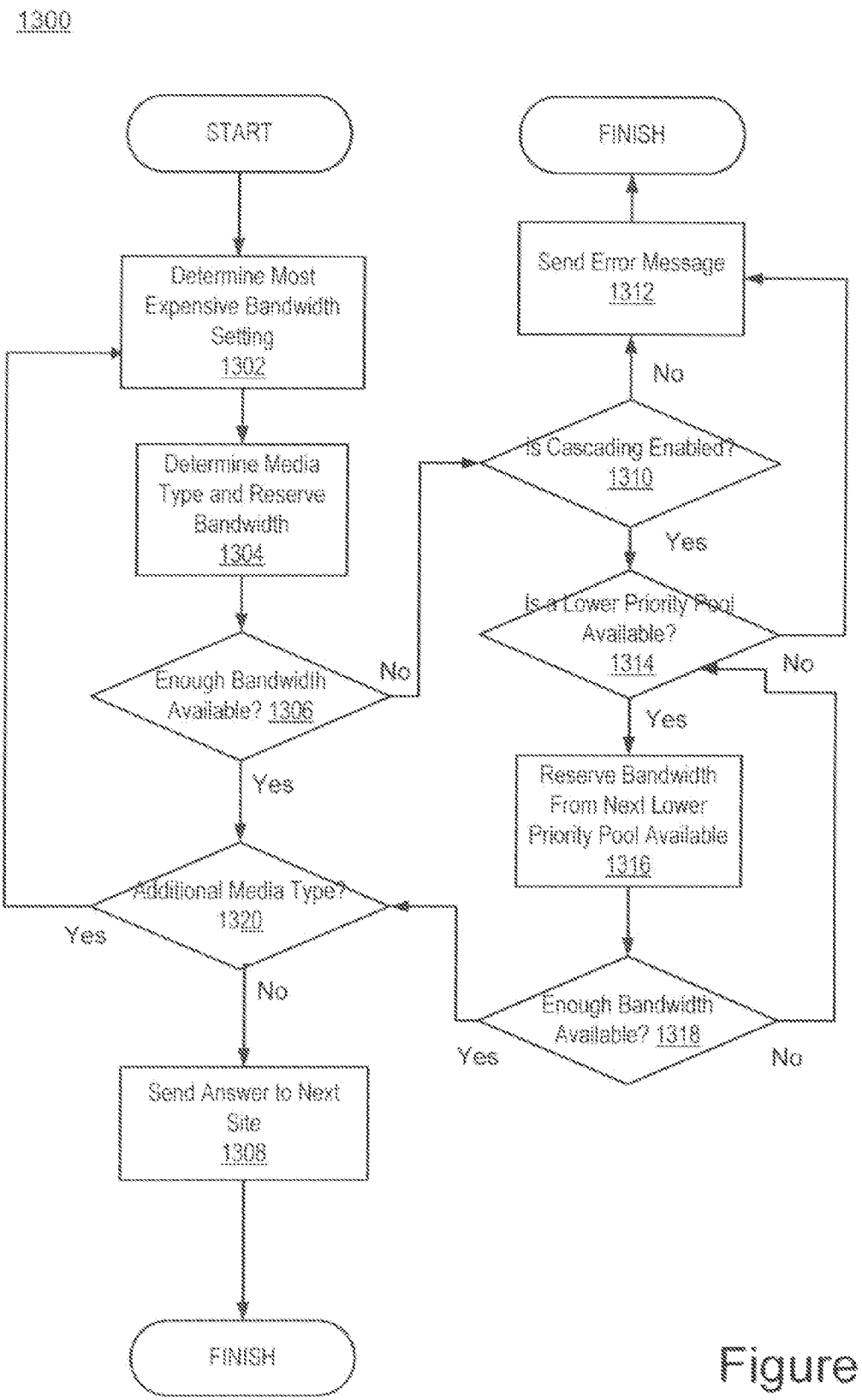

Turning now to FIG. 13, depicted is a flowchart illustrating a method 1300 for allocating pooled bandwidth at a destination site (or a via site) according to one embodiment of the present invention. For example, FIG. 12 depicts allocating bandwidth in the pools as described above for FIG. 3B (communication 318), FIG. 3D (communications 364, 366, 318), FIG. 11B (step 1132), FIG. 11C (step 1152) and FIG. 11D (step 1170). FIG. 13 depicts steps substantially similar to those of FIG. 12, and so, that description will not be repeated here. The difference between FIG. 13 and FIG. 12 is, for example, at step 1308 the answer is sent to the source site (or an intervening via site) instead of the destination site.

In one embodiment, step 1312 includes (1) sending the error message to the source endpoint by propagating the error message across one or more via sites and (2) the via sites and source site releasing bandwidth previously allocated for the call. For example, refer to FIG. 3D, and assume that a video call includes a source site 100A, a first via site 100C, a second via site 100D and a destination site 100B. The destination site 100B determines that it has inadequate bandwidth to connect the call at communication 318. The destination site sends the error message described for step 1312 in FIG. 13 to the settings manager 218D of the second via site 100D. The settings manager 218D releases the bandwidth previously allocated for the call at step 366. The settings manager 218D sends an error message to the settings manager 218C of the first via site 100C. The settings manager 218C releases the bandwidth previously allocated for the call at step 364 and sends an error message to the settings manager 218A of the source site 100A. The settings manager 218A releases the bandwidth previously allocated for the call at step 312 and sends an error message to the endpoint A. One having ordinary skill in the art will recognize how this process would work if one of the via sites 100C, 100D determines that the site 100C and/or 100D has inadequate bandwidth to complete a call and sends an error message described for step 1312.

In one embodiment, an administrator modifies the size of one or more of the pools while a call is ongoing and the switch 130 borrows bandwidth during the ongoing call in order to account for the change in the pool size. For example, a video pool is initially assigned a bandwidth of 3 MB/S and a video call is ongoing that requires 2 MB/S. The video media type is also assigned a higher media priority ranking than the data conferencing media type. An administrator enters input in an interface (see FIG. 19) changing the size of the video pool to 1 MB/S. If the data conferencing pool has 1 MB/S of bandwidth available, the switch 130 borrows bandwidth from the data conferencing pool since (1) the video pool now has a bandwidth deficiency; (2) the data conferencing pool has unused bandwidth and (3) the video media type has a higher media priority ranking than the data conferencing media type.

In one embodiment, bandwidth is measured in kilobytes per second (KB/S) instead of megabytes per second (MB/S). For example, in FIG. 29 bandwidth is measured in KB/S.

Figure 14:
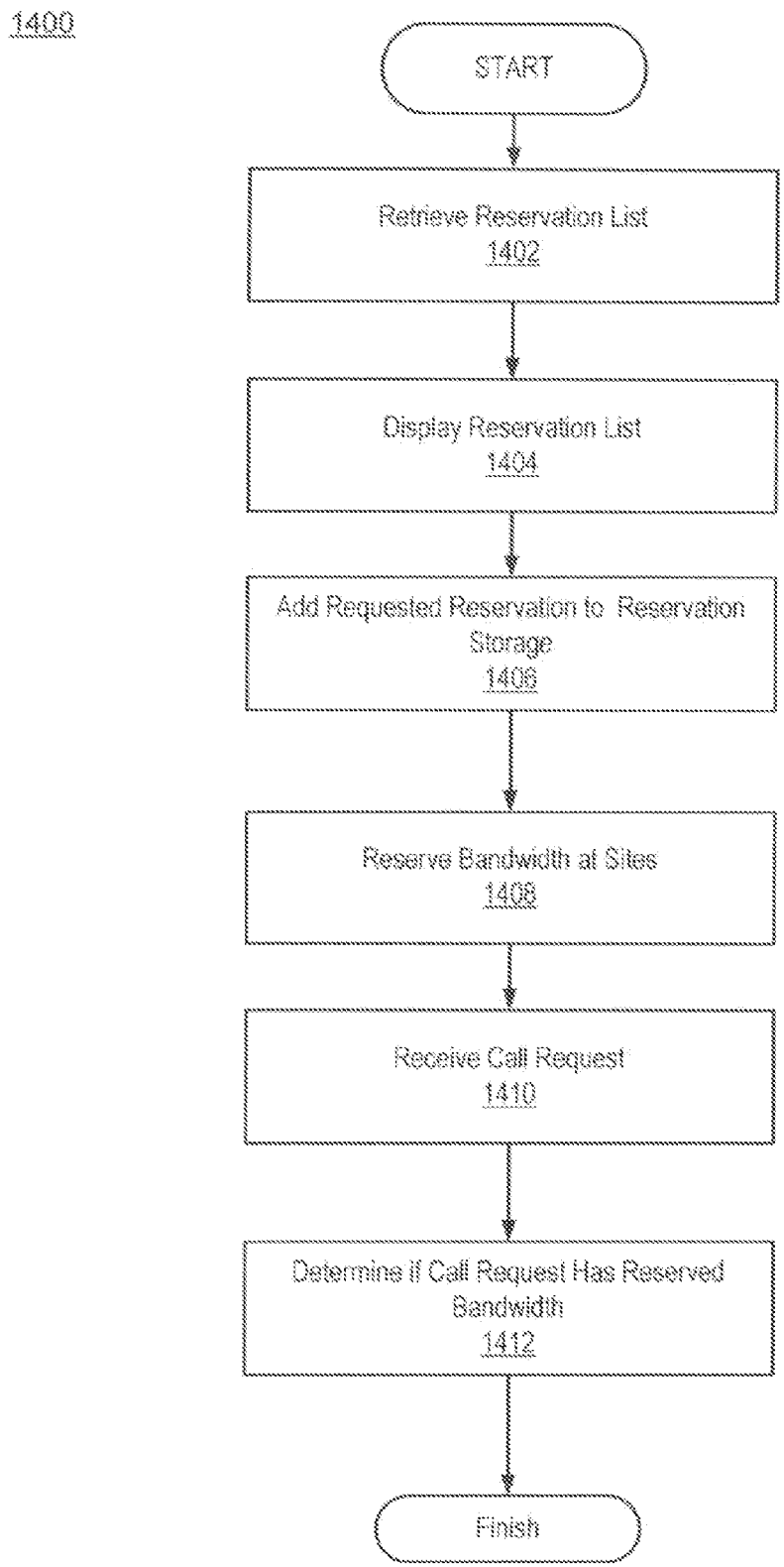
FIG. 14 is a flowchart illustrating a method for reserving bandwidth according to one embodiment of the present invention.

Turning now to FIG. 14, depicted is a flowchart illustrating a method 1400 for reserving bandwidth according to one embodiment of the present invention. The switch 130 receives a request to add a reservation to the reservation list stored in the reservation storage 210. In one embodiment, the reservation includes the media type(s) for the call, the number of users who are members of the reservation (i.e., the users who will be using the bandwidth reserved by the reservation), the names of the members of the reservation, and/or the extension numbers of the members of the reservation. The switch 130 retrieves 1402 the reservation list from the reservation storage 210. The switch 130 displays 1404 a reservation list on an interface, for example, the interface associated with the server 100. The switch 130 receives an input to add a new reservation, or modify existing reservation. The switch 130 adds 1406 the reservation call (i.e., the call set up by the reservation) to the reservation list stored in the reservation storage 210. The switch 130 reserves 1408 bandwidth adequate to meet the demands of the reservation call at the source site, for example, using the process outlined for FIG. 12. In one embodiment, reserving bandwidth for a reservation call includes allocating bandwidth from pools and/or cascading pools. The switch 130 sends communications to all the other sites that will be used in the reservation call to reserve bandwidth sufficient to meet the demands of the call. The other sites then reserve actual bandwidth sufficient to meet the bandwidth demands of the call. In one embodiment, if one or more of the sites does not have available bandwidth to meet the bandwidth demands of the call, that site sends (or propagates) an error message to the source site's switch 130. Unlike other call reservations, which do not actually reserve bandwidth for a future call, method 1400 actually reserves bandwidth resources for the future call. By contrast, other call reservation merely reserve resource on the bridge, and do not reserve actual bandwidth resources for the call. In one embodiment, sending communications to all the other sites that will be used in the reservation call, as described above and with reference to FIG. 12, is referred to as "propagating a reservation request to the other sites that will be used in the reservation call" or similar language.

The switch 130 receives 1410 a call request. The switch 130 determines 1412 whether or not the call request is a member of the call reservation. For example, the switch 130 asks the calling party to provide a code to indicate that the call request is from a member of the call reservations. In another example, the switch 130 looks at the source of the call request and determines based on this information whether or not the calling party is a member the call reservation. In one embodiment, if the call request is not a member of the reservation, the call is not allowed to use the bandwidth reserved for the call reservation.

One having ordinary skill in the art will recognize that the members of the reservation can be identified by a class of users or other conventional groupings not described above.

In one embodiment, an administrator modifies the size of one or more of the pools while a reservation call is ongoing and the switch 130 borrows bandwidth during the ongoing reservation call in order to account for the change in the pool size. For example, a video pool is initially assigned a bandwidth of 3 MB/S and a reservation call having a video media type is ongoing that requires 2 MB/S. The video media type is also assigned a higher media priority ranking than the data conferencing media type. An administrator enters input in an interface (see FIG. 19) changing the size of the video pool to 1 MB/S. If the data conferencing pool has 1 MB/S of bandwidth available, the switch 130 borrows bandwidth from the data conferencing pool since (1) video pool now has a bandwidth deficiency; (2) the data conferencing pool has unused bandwidth and (3) the video media type has a higher media priority ranking than the data conferencing media type.

Figure 15:
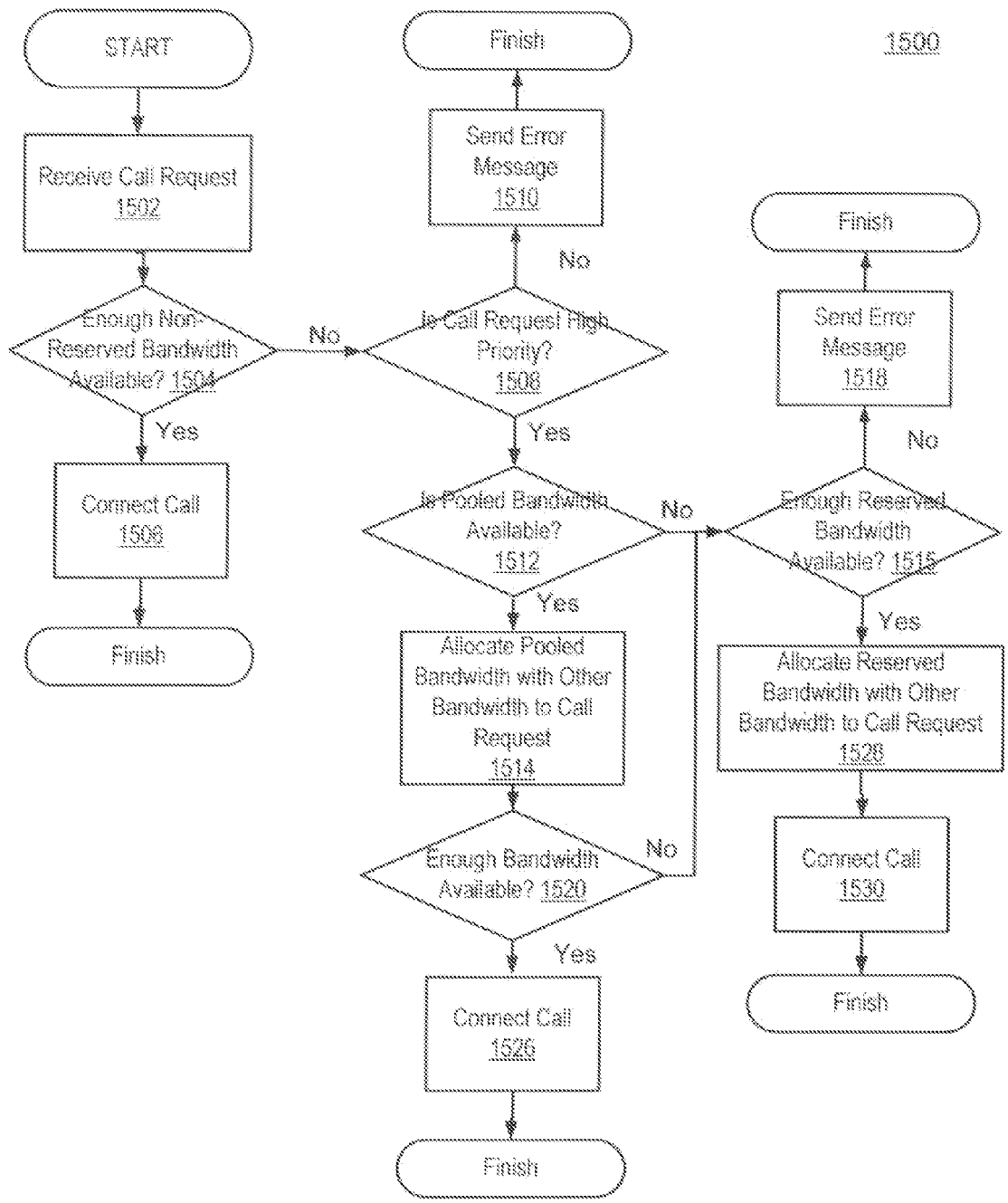
FIG. 15 is a flowchart illustrating a method for responding to calls requesting reserved bandwidth according to one embodiment of the present invention.

Turning now to FIG. 15, depicted is a flowchart illustrating a method 1500 for reserving bandwidth according to one embodiment of the present invention. The switch 130 receives 1502 a call request. The switch 130 determines 1504 whether there is enough non-reserved bandwidth to connect the call. If there is enough non-reserved bandwidth to make call at step 1504, the switch 130 connects 1506 the call. If there is not enough non-reserved bandwidth to connect the call at step 1504, the switch 130 determines 1508 if the call request is a high priority. For example, the switch 130 prompts the calling party to provide a code indicating that the call is for an emergency, or that the calling party is a member of a call group in which membership indicates that the call request is a high priority. In one embodiment, the switch 130 identifies the priority of the call based on the dialed number.

If the call request is not a high priority, then the switch 130 sends an error message 1510 and the method ends. If the call request is a high priority at step 1508, then the switch 130 checks 1512 to see if pooled bandwidth is available. If pooled bandwidth is not available, then the switch 130 checks 1515 to see if enough reserve bandwidth is available to connect the call. If there is not enough reserved bandwidth available to connect the call, then the switch 130 sends 1518 an error message to the calling party. If there is enough reserve bandwidth to connect call, then the switch 130 allocates 1528 reserved bandwidth with other bandwidth, if necessary, to connect the call. The switch 130 then connects 1530 the call.

If pooled bandwidth is available at step 1512, and the switch 130 allocates 1514 pooled bandwidth with other bandwidth, if necessary, to connect the call. The switch 130 checks 1520 to see if there is enough bandwidth to connect the call. If there is enough bandwidth to connect the call, then the switch 130 connects 1526 the call. If there is not enough bandwidth to connect the call at step 1520, then the method proceeds to step 1515.

Figure 16:
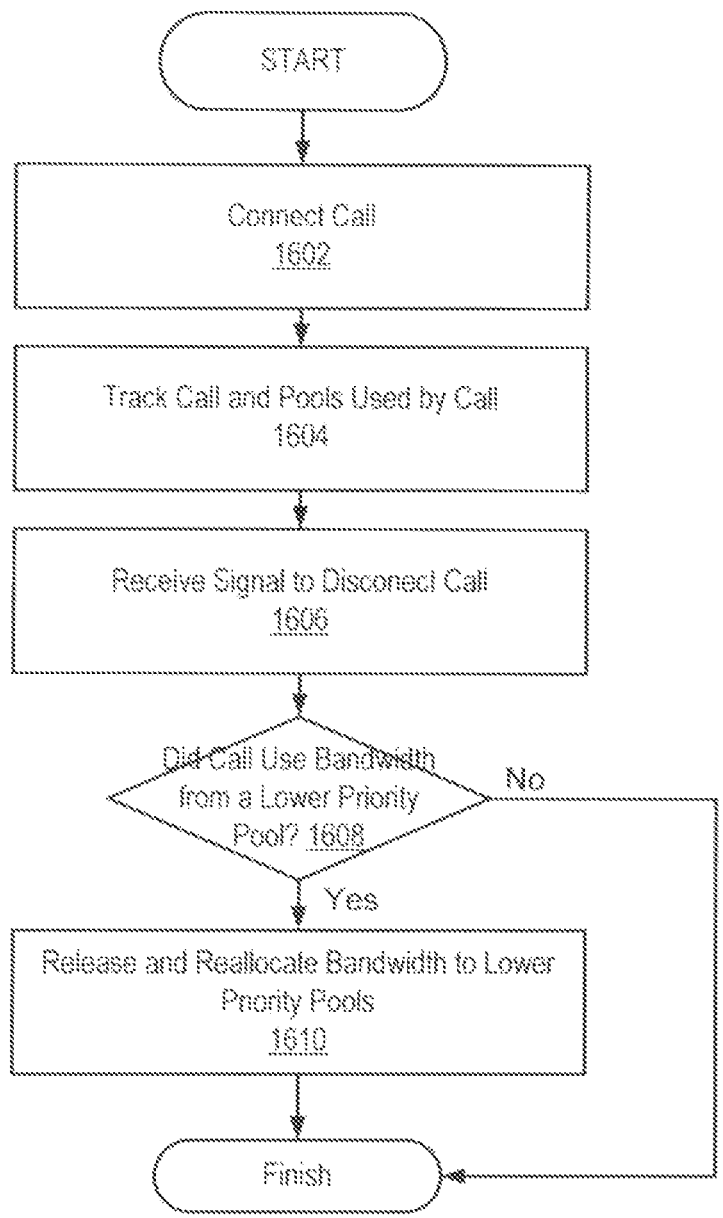
FIG. 16 is a flowchart illustrating a method for reallocating bandwidth to a lower priority pool after call termination according to one embodiment of the present invention.

Turning now to FIG. 16, depicted is a flowchart illustrating a method 1600 for reallocating bandwidth to lower priority pools after call termination according to one embodiment of the present invention. The switch 130 connects 1602 the call. As the call is ongoing, the switch 130 tracks 1604 the call and the source of the bandwidth used during the call. For example, the switch 130 tracks the source of bandwidth used to connect the call, i.e., from which pools the bandwidth was sourced from. In one embodiment, the switch 130 also tracks the source of bandwidth used to keep the call connected over the course of the call. For example, the switch 130 tracks as bandwidth requirements fluctuate and bandwidth is added or subtracted in order to keep the call connected and the source of this bandwidth. The switch 130 receives 1606 a termination signal. The switch 130 determines 1608 whether the call borrowed bandwidth from a lower priority pool over the course of the call. If the call did not borrow bandwidth from a lower priority pool, then the method ends. If the call did borrow bandwidth from a lower priority pool, then the switch 130 releases and reallocates 1610 the bandwidth back to the lower priority pools.

In one embodiment, the switch 130 does not track bandwidth on a call-by-call basis as described above, but instead (1) tracks whether bandwidth is borrowed for a particular media type, (2) receives a termination signal indicating that a call is ending; (3) determines whether the termination signal is for a call having a media type that borrowed bandwidth as described in the first step; (4) if the ending call has a media type that borrowed bandwidth, the switch releases the borrowed bandwidth and reallocates the borrowed bandwidth to the lower priority pools.

In one embodiment, the site 100 is coupled to multiple WANs 190, the bandwidth for the site 100 is the total bandwidth available across the each of these WANs 190, and the switch 130 tracks bandwidth for each WAN 190.

Turning now to FIGS. 17A-17E, depicted are bar graphs illustrating pooled bandwidth according to one embodiment of the present invention. In one embodiment the bandwidth for each site is pooled into a voice pool, video pool and a data conferencing pool. The site also reserves an amount of bandwidth for asynchronous data. For example, 20 percent of site bandwidth is assigned to the voice pool, 30 percent is assigned to the video pool, 40 percent is assigned to the data conferencing pool and 10 percent is reserved for asynchronous data. For the purpose of clarity, FIGS. 17A-17E assumes that bandwidth for asynchronous data is set to zero.

Figure 17A:
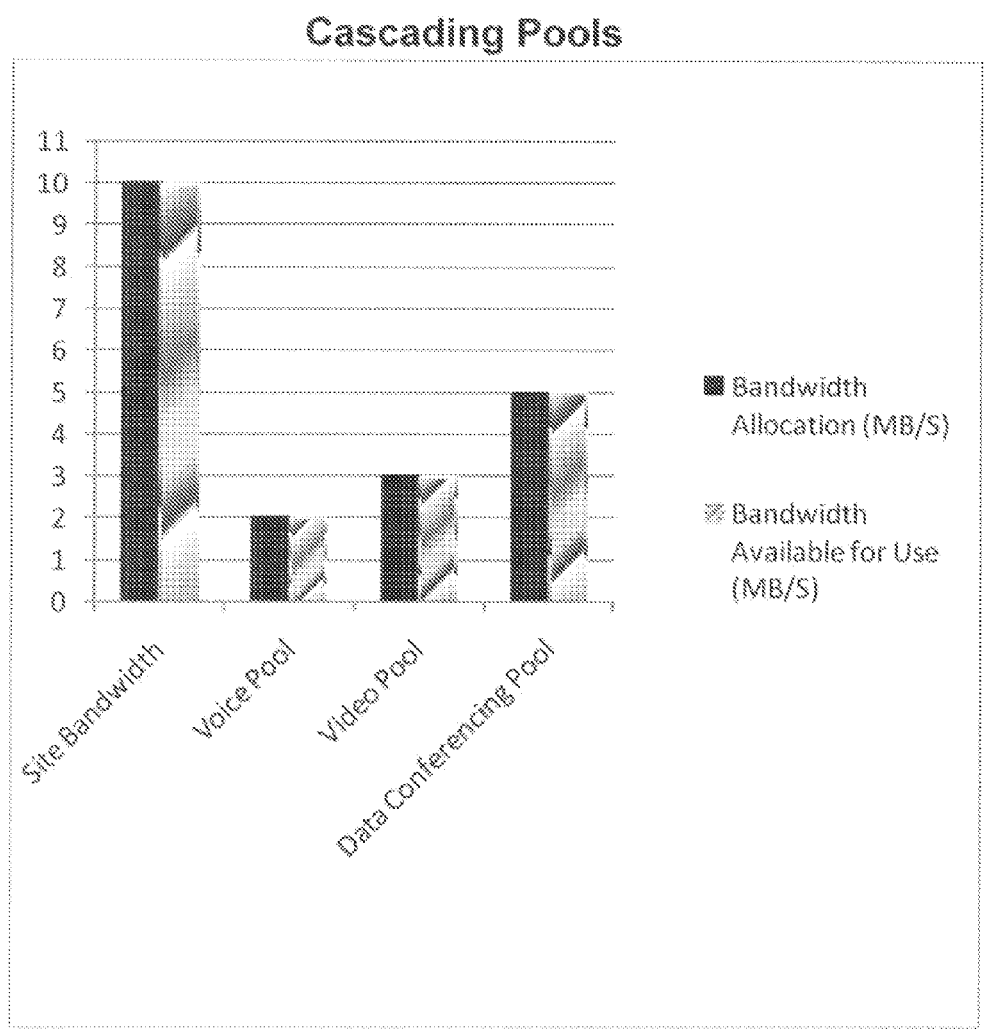
FIGS. 17A-17E are bar graphs illustrating pooled bandwidth according to one embodiment of the present invention.

Referring to FIG. 17A, this graph shows a situation where no calls are ongoing at the site. The site bandwidth is the total bandwidth available at the site. In one embodiment, the site is coupled to multiple WANs and the site bandwidth is the total bandwidth across these WANs. The voice pool is a portion of the site bandwidth allocated for voice calls. The video pool is a portion of the site bandwidth allocated to video calls. The data conferencing pool is a portion of the site bandwidth allocated to data conferencing calls.

The black bars indicate the bandwidth allocation measured megabytes per second (MB/S), and the striped grey bars indicates bandwidth available for use as measured in MB/S. In 17A-17E, the priority order for the media types indicates that video is a higher priority than data conferencing, and that voice is a higher priority than video (i.e., voice>video>data conferencing).

Here, for site bandwidth, the black bar of the graph shows that the site has a total bandwidth of 10 megabytes per second and the striped grey bar shows that 10 MB/S are available for use. For the voice pool, the black bar of the graph shows that the voice pool is allocated 2 MB/S and the striped grey bar shows that 2 MB/S are available for use. For the video pool, the black bar of the graph shows that the video pool is allocated 3 MB/S and the striped grey bar shows that 3 MB/S are available for use. For the data conferencing pool, the black bar of the graph shows that the data conferencing pool is allocated 5 MB/S and the striped grey bar shows that 5 MB/S are available for use.

Figure 17B:
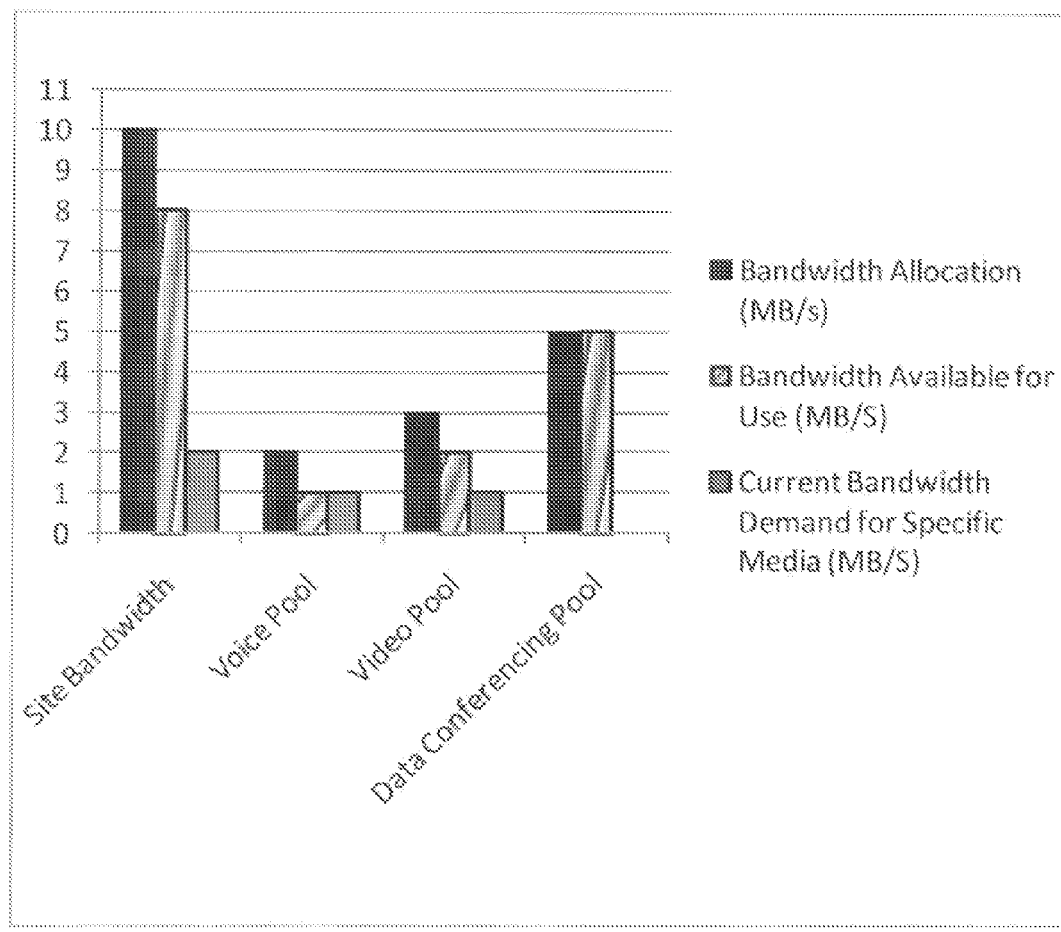

Referring to FIG. 17B, this graph shows an instance where a voice and video call are ongoing, but not exceeding their bandwidth allocations. The solid grey bar indicates the current bandwidth demand for a specific media in MB/S. Adding the values for the striped grey bar ("Bandwidth Available for Use") and the solid grey bar ("Current Bandwidth Demand for Specific Media") equals the value of the black bar ("Bandwidth Allocation").

For the site bandwidth, the black bar of the graph shows that the site has a total bandwidth of 10 MB/S, the striped grey bar shows that 8 MB/S are available for use and the solid grey bar shows that 2 MB/S are currently in use (8 MB/S+2 MB/S=10 MB/S).

For the voice pool, the black bar of the graph shows that the voice pool is allocated 2 MB/S, the striped grey bar shows that 1 MB/S is available for use and the sold grey bar shows that 1 MB/S is currently in use. Since, for the voice pool, the value for the striped grey bar is 1 MB/S less than the value for the black bar (2 MB/S), this indicates that 1 MB/S of the voice pool bandwidth is in use at the time of the graph. This is confirmed by the solid grey bar for the voice pool, which indicates that one or more voice calls are ongoing and that the current bandwidth demand for these calls is 1 MB/S.

For the video pool, the black bar of the graph shows that the video pool is allocated 3 MB/S, the striped grey bar shows that 2 MB/S are available for use and the sold grey bar shows that 1 MB/S is currently in use. Since, for the video pool, the value for the striped grey bar is 1 MB/S less than the value for the black bar (3 MB/S), this indicates that 1 MB/S of the video pool bandwidth is in use. This is confirmed by the solid grey bar for the video pool, which indicates that one or more video calls are ongoing and that the current bandwidth demand for these calls is 1 MB/S.

For the data conferencing pool, the black bar of the graph shows that the data conferencing pool is allocated 5 MB/S and the striped grey bar shows that 5 MB/S are available for use. Since no grey bar is present for the data conferencing pool, this indicates that there are no data conferencing calls occurring at the time of this graph.

If for either the pools the value for the solid grey bar had exceeded the value for the solid black bar, this would indicate that the bandwidth requirements for these media types exceeded their bandwidth allocation, and that borrowing from another bandwidth pool (i.e., the cascading pools feature) would be required to connect the call.

Figure 17C:
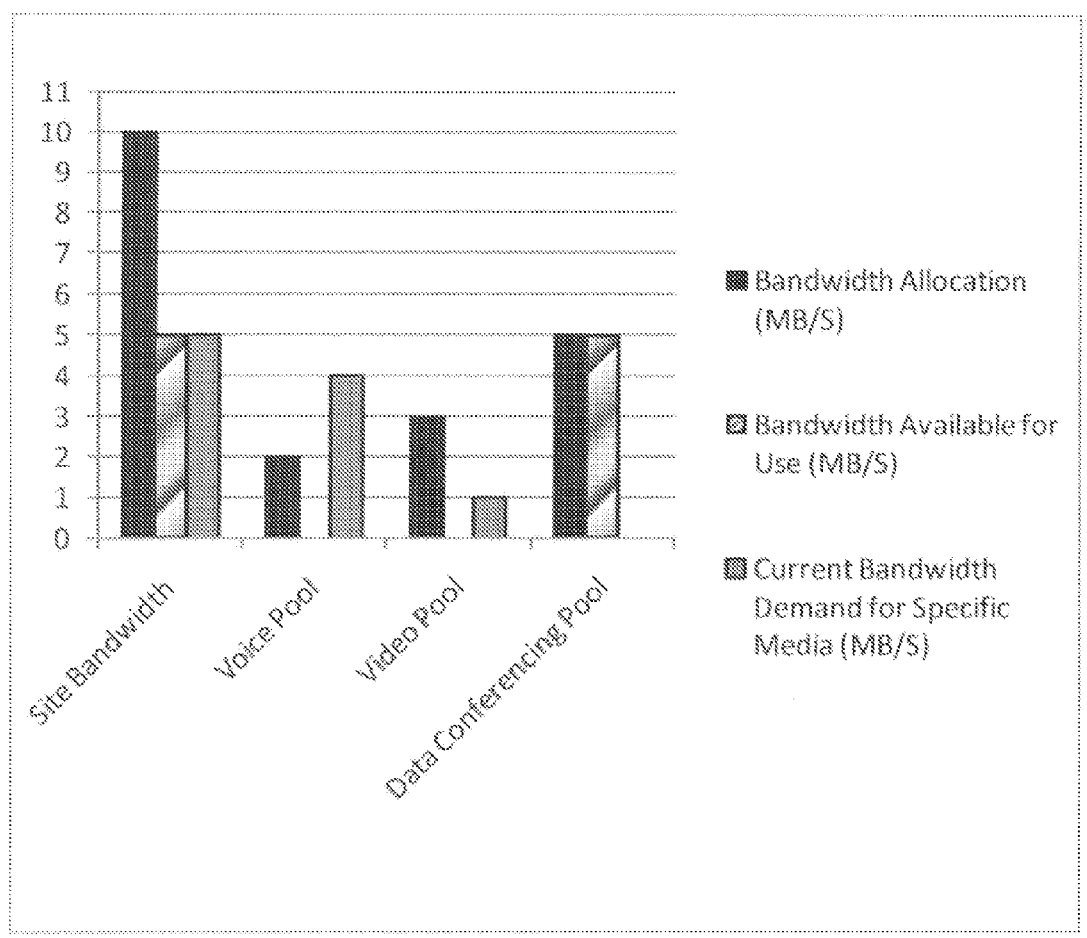

Referring to FIG. 17C, this figure is a continuation of FIG. 17B. Specifically, this graph shows an instance where the voice and video call are ongoing, but additional voice calls are occurring so that the bandwidth requirements for the voice calls exceeds the bandwidth allocation for the voice pool. Thus, the bandwidth manager 220 must borrow bandwidth from a lower priority pool.

For the site bandwidth, the black bar of the graph shows that the site has a total bandwidth of 10 MB/S, the striped grey bar shows that 5 MB/S are available for use and the solid grey bar shows that 5 MB/S are currently in use.

For the voice pool, the black bar of the graph shows that the voice pool is allocated 2 MB/S, the absence of a striped grey bar indicates that 0 MB/S are available for use and the solid grey bar shows that 4 MB/S are currently in use. Since, for the voice pool, the value for the solid grey bar is 2 MB/S more than the value for the black bar (2 MB/S), this indicates that 2 MB/S of the voice pool bandwidth is in use and that 2 MB/S are being borrowed from another pool in order to connect the voice calls. Since the next lowest priority media is a video, then the switch 130 will borrow bandwidth from the video pool if the video pool has available bandwidth.

For the video pool, the black bar of the graph shows that the video pool is allocated 3 MB/S, the absence of a striped grey bar indicates that 0 MB/S are available for use and the solid grey bar shows that 1 MB/S is currently in use. Since, the value for the solid black bar is 3 MB/S and the value of the sold grey bar is only 1 MB/S, this indicates that 2 MB/S are being borrowed from the video pool. Here, these 2 MB/S are being borrowed by the voice pool.

Figure 17D:
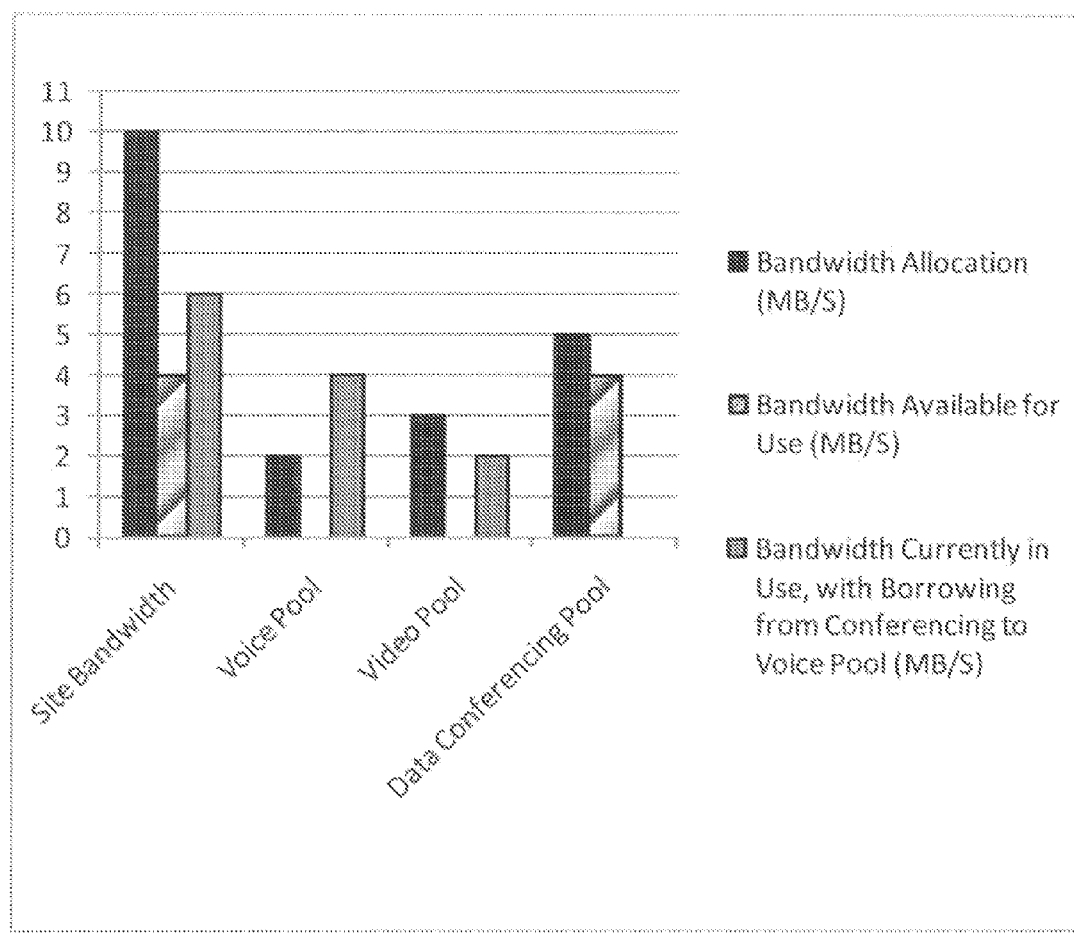

The values for the data conferencing pool are unchanged from FIG. 17D, and so, that description will not be repeated here.

Referring to FIG. 17D, this figure is a continuation of the FIGS. 17B and 17C. The features of FIG. 17C are similar to FIG. 17D, and so, like descriptions will not be repeated. The difference here is that, for the site bandwidth, the striped grey bar indicates that 4 MB/S are available for use and the solid grey bar indicates that 6 MB/S are in use. In other words, between FIGS. 17C and 17D, 1 MB/S more bandwidth is being used across the site.

For the video pool, the solid grey bar shows that an additional 1 MB/S is being used. Since in FIG. 17C no bandwidth was available for use in making video calls (as indicated by the absence of a striped grey bar for the video pool), the video pool is borrowing bandwidth from a lower priority pool to connect the additional video calls. Here, the next lower priority pool is the data conferencing pool.

For the data conferencing pool, the value for the striped grey bar is 1 MB less than the value for the solid black bar (5 MB/S), and the absence of a sold grey bar indicates that no data conferencing calls are ongoing. This indicates that 1 MB/S is being borrowed from the data conferencing pool in order to connect the additional video calls and make up the 1 MB/S deficit in the video conferencing pool.

Figure 17E:
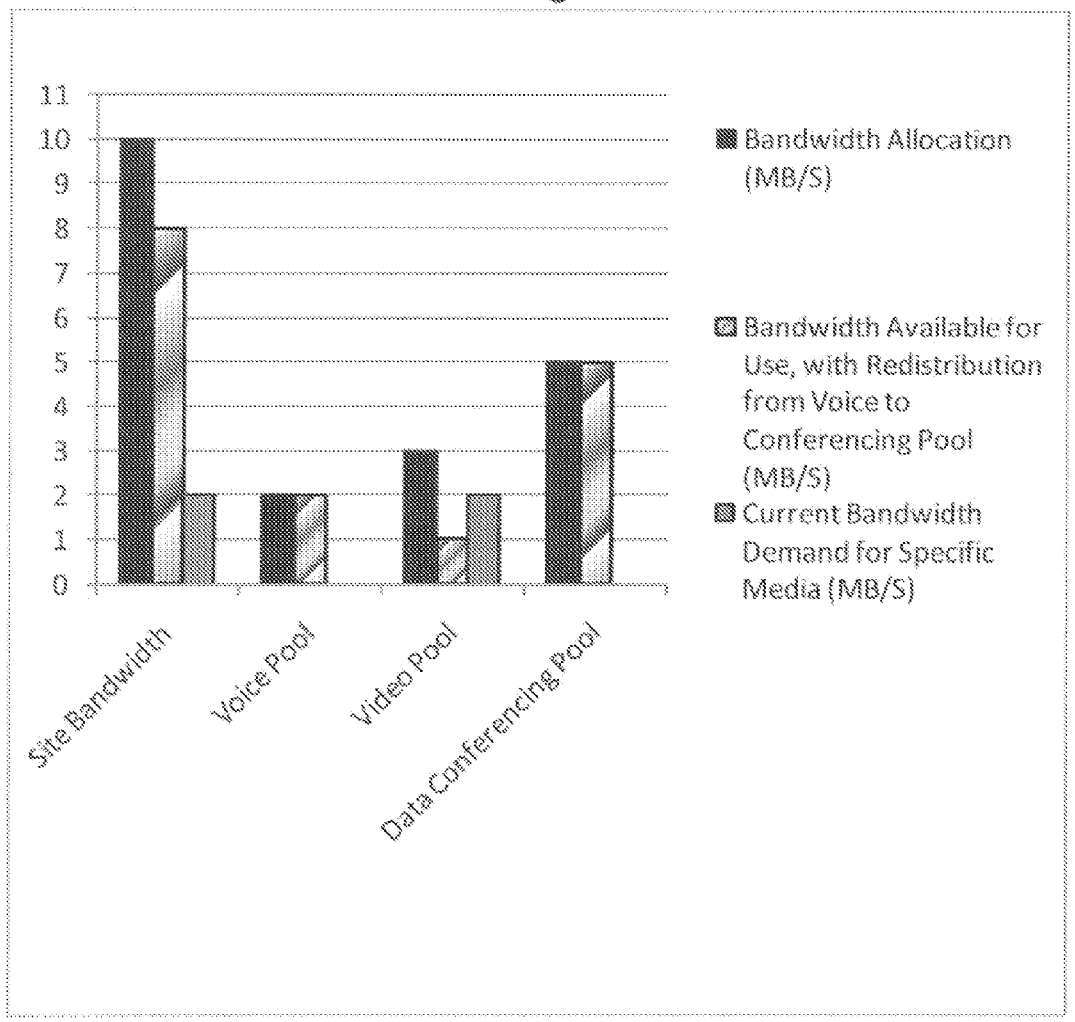

Referring to FIG. 17E, this figure is a continuation of the FIGS. 17B-17D. The features of FIG. 17E are similar to FIG. 17D, and so, like descriptions will not be repeated. The difference here is that for voice calls, all the voice calls occurring in FIG. 17B and FIG. 17C are terminated, but the video calls occurring in FIGS. 17B, 17C and 17D are ongoing.

The bandwidth manager 220 tracked the borrowing from pools that occurred in FIG. 17D, and reallocates the bandwidth upon termination of the calls. Specifically, bandwidth borrowed from the video pool to connect the voice calls of FIG. 17C is reallocated by the bandwidth manager 220 to the video pool. Upon reallocation of the borrowed bandwidth to the video pool, the video pool now has sufficient bandwidth to connect all the video calls without borrowing from the data conferencing pool. Since the video pool does not need to borrow bandwidth from the data conferencing pool, the bandwidth manager 220 reallocates the bandwidth that the video pool borrowed in FIG. 17D to the data conferencing pool.

In one embodiment, a processor-based device (e.g., a computer) is communicatively coupled to the switch 130 and the switch 130 tracks real time allocation of bandwidth among the different sites 100 involved in connecting a call. The switch 130 includes a display module (not pictured). The display module is codes and routines that are part of the call manager 150 that causes the switch 130 to track real time information about the allocation of bandwidth among the different sites 100, store information describing the real time allocation of bandwidth in the configuration module 202 and execute a display function. A display function is a function executed by the display module in which the display module generates and sends a display signal to the processor based device. The display signal is received by the processor based device, and, responsive to receiving and processing the display signal, the processor based devices generates a second signal based on the display signal that causes a display device communicatively coupled with the processor based device (e.g., a monitor) to display the real time allocation of the bandwidth among the different sites 100.

In one embodiment the switch 130 further includes a analysis module (not pictured) that can analyze historical bandwidth use based on the real time data stored in the configuration module 202 and generate historical reports of how pools and via sites have been utilized. These reports can be displayed on a display device similar to the display function described above in the previous paragraph. In one embodiment the switch includes an alert module (not pictured) that tracks bandwidth usage in the different pools and generates alert signals when pools reach or approach shortages. These alerts can also be displayed on a display device similar to the display function described above in the previous paragraph.

Turning now to FIG. 18A, depicted is an example of the supported codecs panel 1802. The name column 1804 has the identification strings of the codecs supported by the switch 130. In one embodiment, each codec identification sting is comprised of the name and sampling rate of the codec. The bandwidth column 1806 identifies the bandwidth required by the codecs in the name column 1804. The default column 1808 indicates whether the codec in the name column 1804 is a default codec. If the default column indicates "Yes," it signifies that the codec in the same row was initially installed with the telephony system 195. On the other hand, if the default column indicates "No," it signifies that the codec in the same row was added by a user with administrative rights after the telephony system 195 was installed. To delete the descriptions of one or more codecs, the respective boxes in the first column are selected for those codecs and the delete button 1813 is pressed. Pressing the new button 1812 causes the new codec panel 1814 to appear.

FIG. 18B is an example of the new codec panel 1814 that is presented to a user when the user presses on the new button 1812 of FIG. 18A, according to one embodiment of the present invention. The name entry field 1816 is where a user enters the identification string of the new codec, which in this case is "G726/8000". The identification string must be entered in the name entry field 1816 exactly as expected by devices in the telephony system 195. The bandwidth entry field 1818 is where the user enters the bandwidth of the new codec. Default field 1820 is checked if the codec in the name entry field was originally installed with the telephony system 195. In this case, default field 1820 is not checked, which means the new codec is being added after the telephony system 195 was installed. Pressing save button 1822 causes the server 110 to store the description of the new codec. Pressing the close button 1824 closes the new codec panel 1814 without saving any changes. Previous button 1826 and next button 1828 allow the user to navigate through the codecs listed in the supported codecs panel 1802 to view and possibly edit the description of a supported codec.

Figure 19:
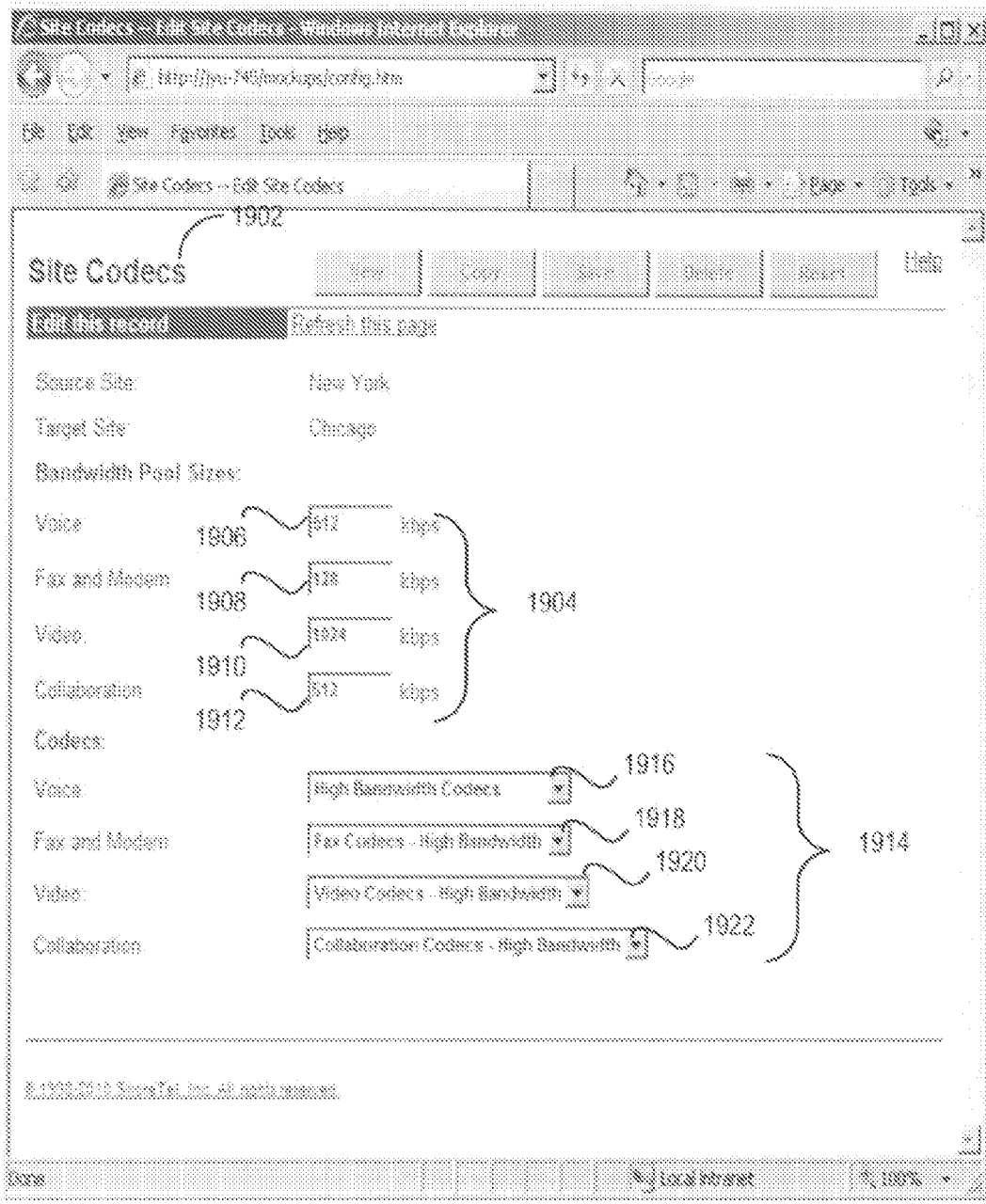
FIG. 19 is an example of a site codec panel according to one embodiment of the present invention.

Turning to FIG. 19, depicted is an example of a site codecs panel 1902 according to one embodiment of the present invention. The site codecs panel comprises a group of bandwidth pool size fields 1904 and a group of codec drop-down boxes 1914. The bandwidth pool size fields 1904 provide an interface for specifying the amount of bandwidth allocated to each pool. The bandwidth pool size fields comprise a voice pool size filed 1906, a fax and modem pool size field 1908, the video pool size field 1910 and a data collaboration field 1912. For each of the bandwidth pool size fields, the user/administrator can provide inputs to specify the size of the respective media field. These inputs are received by the switch 130 and stored in the administrator settings storage 208.

The codec drop-down boxes 1914 comprise a voice codec drop-down box 1916, a fax and modem codec drop-down box 1918, a video codec drop-down box 1920 and a collaboration drop-down box 1922. For each of the codec drop down boxes 1914, a user can provide input providing preferred codecs for the particular media type. These inputs are received by the switch 130 and stored in the administrator settings storage 208.

Figure 20:
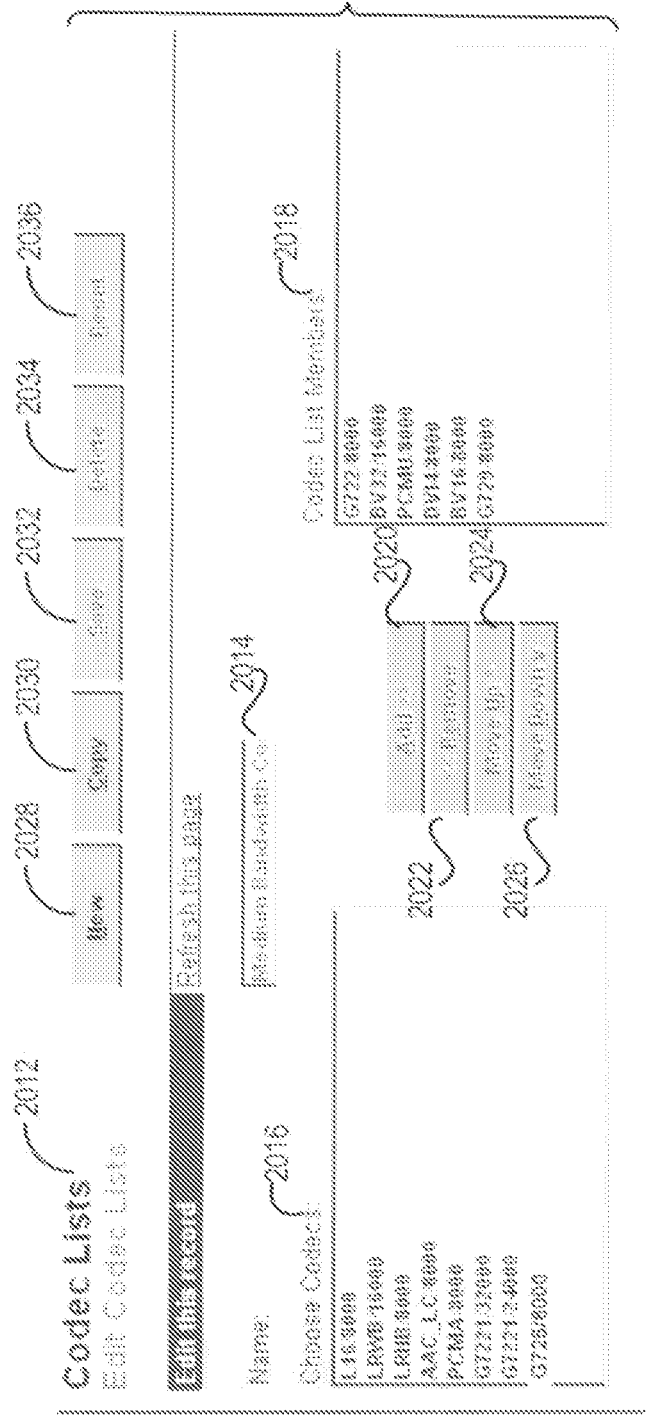
FIG. 20 is an example of an edit codec lists panel according to one embodiment of the present invention.

Turning now to FIG. 20, depicted is an example of the edit codec list panel 2012 that allows a user to view or edit an existing codec list 206 according to one embodiment of the present invention. For example, this panel 2012 allows the user to view or the codec lists 206 depicted in FIG. 2 and described throughout this application, including, for example, element 1914 in FIG. 19 and elements 2112, 2114 and 2116 in FIG. 21. The name field 2014 has the name of the codec list that is being viewed or edited. The choose codecs region 2016 displays an identification string of each codec supported by call manager 150 and that are not members of the codec list. Codec list members region 2018 displays an identification string of each codec that is part of the codec list. A codec can be added to the codec list by selecting an identification string of desired codec in the choose codecs region 2016 and then pressing add button 2020. To remove a codec from the codec list, an identification string of a desired codec in the codec list members region 2018 is selected and remove button 2022 is pressed. To change the ranking of a codec within the codec list members region 2018, an identification string of a desired codec is selected in the codec list members region 2018, and move up button 2024 or move down button 2026 is pressed. To save changes to the codec list, save button 2032 is pressed. The new button 2028 is pressed to create a new codec list. To use the displayed codec list as a template for a new codec list, copy button 2030 is pressed. Pressing delete button 2034, deletes the codec list that is being viewed. To revert the codec list to the last saved version, reset button 2036 is pressed.

Figure 21:
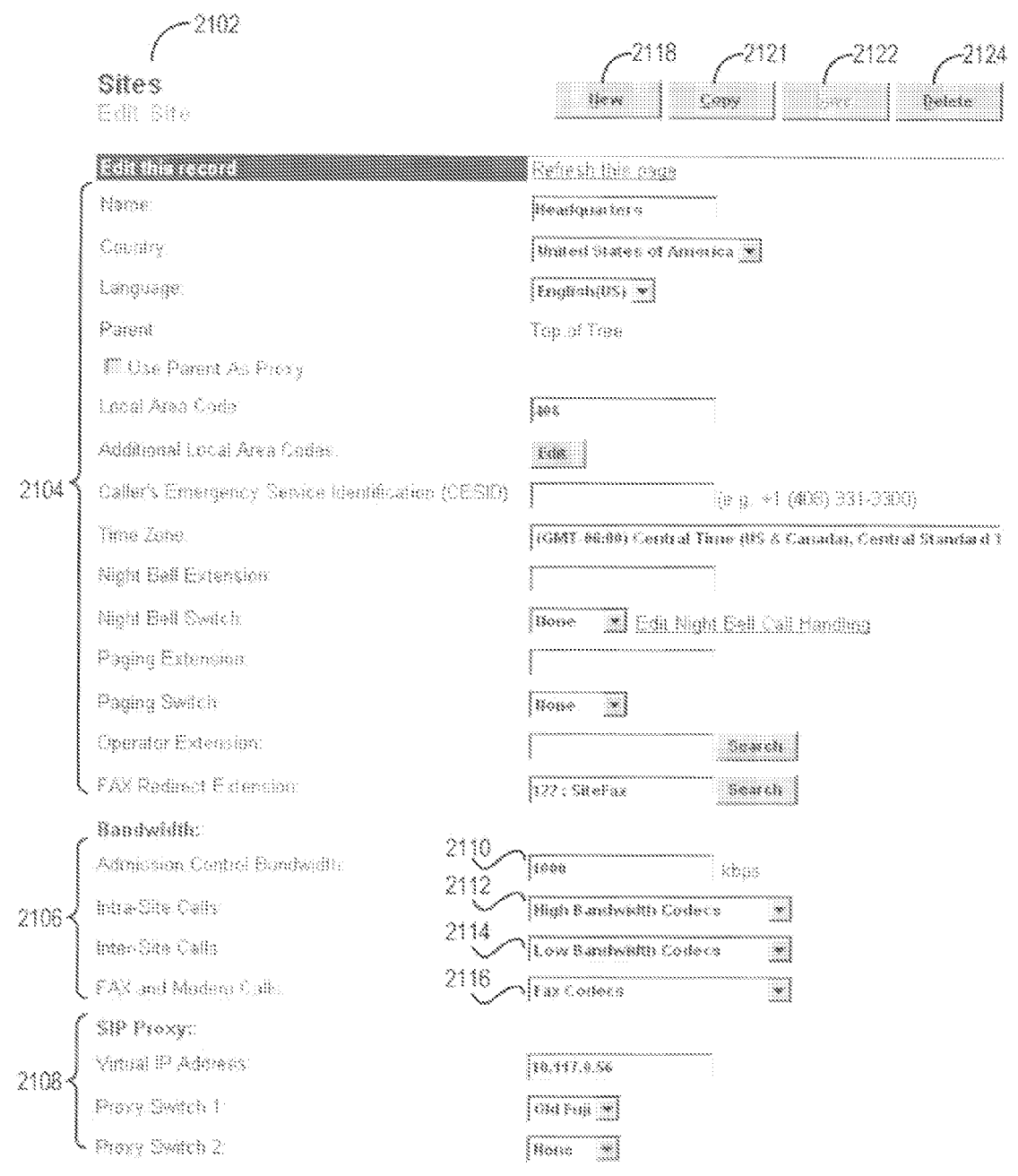

Turning now to FIG. 21, depicted is an example of the edit site panel 2102 used by a user for viewing or editing settings (e.g., media preferences included in the media preferences list) for site 100 according to one embodiment of the present invention. Section 2104 includes fields where the site's general information settings can be edited. Bandwidth section 2106 includes an admission control bandwidth field 2110, which is the amount of total inter-site WAN bandwidth allocated to site 100. Intra-site calls dropdown 2112, inter-site calls dropdown 2114, and fax and modem calls dropdown 2116 each allows the user to set which codec list to use for each of those types of calls. It should be noted that if site 100 was coupled to multiple WANs, the edit site panel 2102 would include a bandwidth section and an inter-site dropdown for each WAN. Section 2108 includes fields where SIP proxy settings can be edited.

To save changes to the site settings, save button 2122 is pressed. New button 2118 is pressed to create a new set of site settings. To use the settings in the edit site panel 2102 as a template for creating a new set of site settings, copy button 2121 is pressed. Delete button 2124 is pressed to erase the site codec settings being viewed on the edit site panel 2102.

Turning now to FIG. 22, depicted is an example of a bandwidth priority panel 2202 for prioritizing bandwidth pools according to one embodiment of the present invention. The bandwidth priority panel 2202 comprises a priority order field 2204, an up button 2206, a down button 2208 and a cascading pools checkbox 2210. The priority order field 2204 lists all the media types for the site 100 and the priority order for the media types. The up button 2206 and the down button 2208 receive input from the user/administrator changing the priority order for the media types. For example, a user can select the "Fax and Modem" media in field 2204 with a mouse click and then mouse click the move up button 2206 to assign/modify the priority order so that "Fax and Modem" are the highest priority. The switch 130 receives input that cascading pools in enabled and stores this input in the administrator settings storage 208. The cascading pools checkbox 2210 receives input indicating whether the cascading pools feature is enabled. For example, if the user checks the cascading pools checkbox 2210 then the switch 130 receives input that cascading pools in enabled and stores this input in the administrator settings storage 208.

Figure 23:
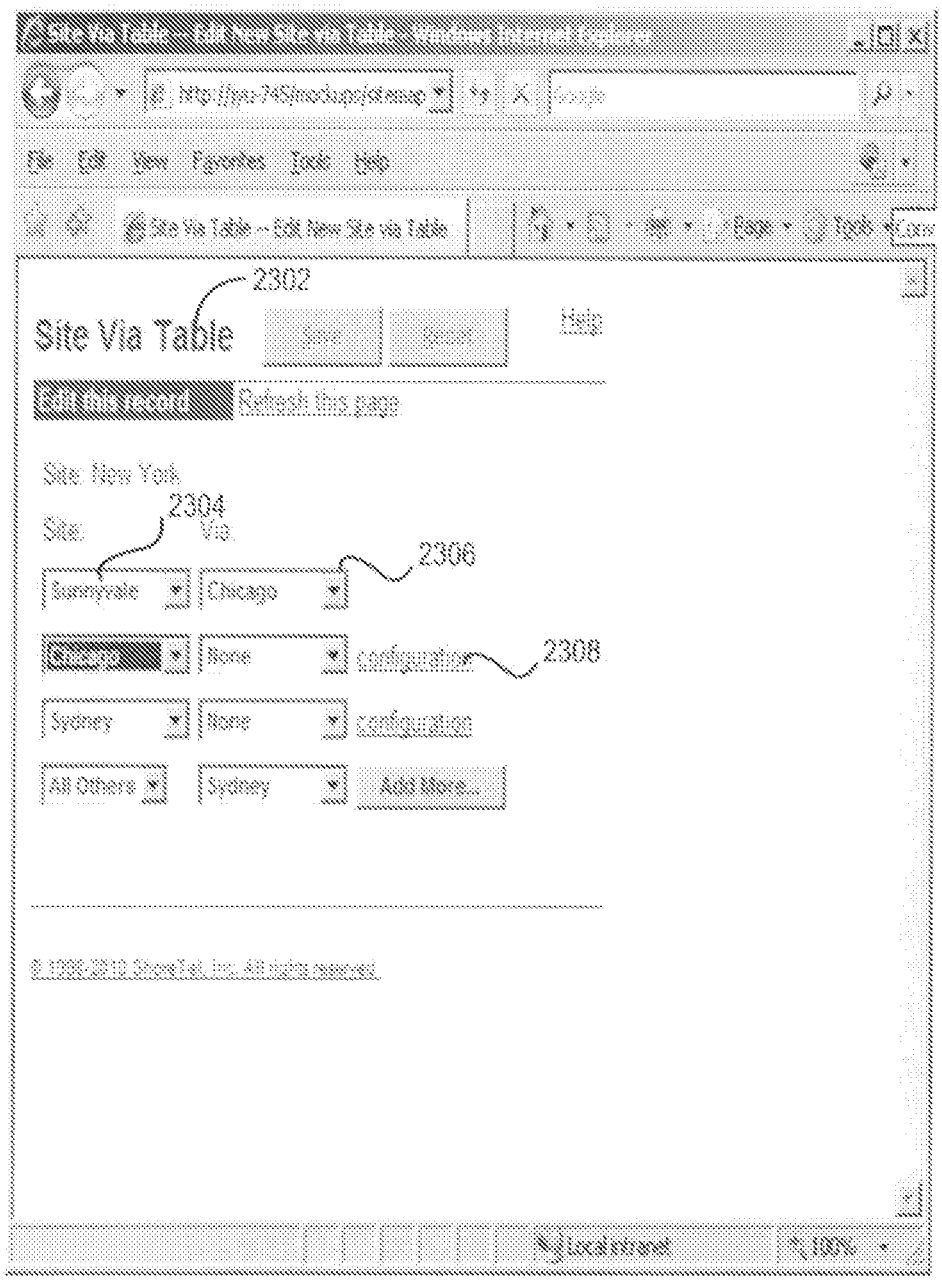
FIG. 23 is an example of a site via table panel according to one embodiment of the present invention.

Turning now to FIG. 23, depicted is an example of a site via table panel 2302 for mapping via sites according to one embodiment of the present invention. The site via table 2302 comprises one or more site drop-down boxes 2304, one or more via site drop-down boxes 2306, and a hyperlink 2308. In one embodiment, each site is assigned one via site. The site drop-down box 2304 receives an input indicating site and the via site drop-down box receives an input indicating the via site for the site indicated in drop-down box 2304. Thus, in this example, the site is "Sunnyvale" and the via site for "Sunnyvale" is "Chicago." The switch 130 receives these inputs and stores them in the administrator settings storage 208. Hyperlink 2308 is configured to receive an input (i.e., a user click), and responsive to this input expose the site codecs panel 1902 depicted in FIG. 19. In one embodiment, the last entry in this table is always "All Others" (as depicted in the drop-down box beneath "Sydney") to simplify configuration by not requiring the administrator to explicitly configure a via for every source/destination pair. For example, in the embodiment depicted in FIG. 23, any sites other than "Sunnyvale," "Chicago" or "Sydney" will use "Sydney" as their via site since it is identified as the via site for any other sites in the system. In one embodiment, a hyperlink such as hyperlink 2308 is not available for the via sites since the system uses the pool for the site it is via through.

Figure 24:
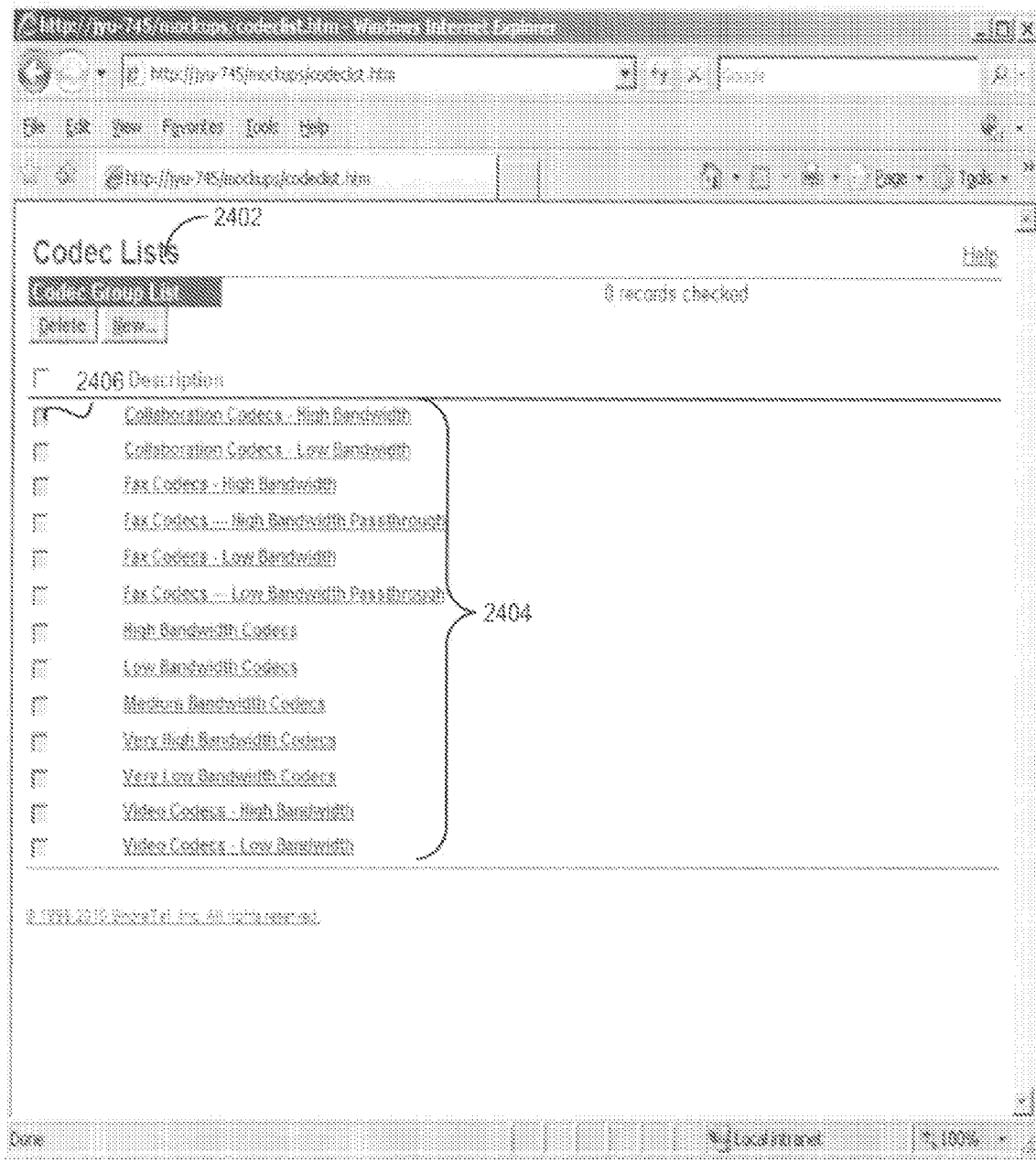
FIG. 24 is an example of a codec lists panel according to one embodiment of the present invention.

Turning now to FIG. 24, depicted is an example of a codec list panel 2402 according to one embodiment of the present invention. The codec list panel 2402 is for adding codecs to a codec list according to one embodiment of the present invention. Group 2404 lists different groups of codecs for different media types. For example, one group of codecs is "Collaboration Codecs—High Bandwidth." The group of codecs includes one or more data-conferencing codecs that are classified as having high bandwidth requirements. In one embodiment, the default is to include all codecs included in group 2404 unless user input is received to delete a particular group of codecs. For example, the checkbox 2406 receives an input indicating the user wants to delete the "Collaboration Codecs—High Bandwidth" codec group. If a user checks box 2406 the switch 130 receives an input and deletes the "Collaboration Codecs—High Bandwidth" codec group from the media preferences list stored in administrator settings storage 208.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for managing bandwidth in a distributed telephony system, the method comprising:

receiving at a source an offer message from a first endpoint to connect a call between the first endpoint and a second endpoint, the offer message including a first media settings list for the first endpoint, the first media settings list identifying one or more media types requested by the first endpoint for the call;

determining a filtered media preferences list based on the first media settings list for the first endpoint and a second media settings list for the source, the filtered media preferences list identifying one or more media types requested for the call;

allocating bandwidth to media pools based on the first filtered media preferences list, each of the media pools associated with a different type of media, wherein allocating bandwidth includes determining that there is insufficient bandwidth for a higher priority media pool and allocating bandwidth from a lower priority media pool to the higher priority media pool;

sending an invite message from the source to a destination, the invite message including the filtered media preferences list; and receiving an answer message from the destination, the answer message including a call settings list that includes actual media settings that will be used to connect the call.

2. The method of claim 1 wherein the destination is a via site.

3. The method of claim 1 wherein the destination is at a same site as the second endpoint.

4. The method of claim 1 wherein the source is a Voice over Internet Protocol (VoIP) switch to which the first endpoint is directly coupled.

5. The method of claim 1 wherein the source is a conference bridge.

6. The method of claim 1 wherein the first media settings list identifies one or more codecs supported by the first endpoint, one or more frame rates supported by the first endpoint, and one or more screen sharing formats supported by the first endpoint.

7. The method of claim 1 wherein the first media settings list identifies at least one of a codec supported by the first endpoint, a frame rate supported by the first endpoint, or a screen sharing format supported by the first endpoint.

8. The method of claim 1 wherein the filtered media preferences list identifies one or more media types requested for the call, a prioritized list of codecs supported by the source and the first endpoint, a prioritized list of frame rate settings supported by the source and the first endpoint, a prioritized list of screen sharing formats supported by the source and the first endpoint, and a prioritized list of resolution settings supported by the source and the first endpoint.

9. The method of claim 1 wherein the call settings list identifies at least one of:

highest priority codecs supported by the first endpoint, the source, the destination, and the second endpoint;

highest priority frame rate settings supported by the first endpoint, the source, the destination, and the second endpoint;

highest priority screen sharing formats supported by the first endpoint, the source, the destination, and the second endpoint; or highest priority resolution settings supported by the first endpoint, the source, the destination, and the second endpoint.

10. The method of claim 1 further comprising updating the bandwidth allocated to the media pools based on the call settings list.

11. The method of claim 1 further comprising:
retrieving mapping coordinates at the source; and
determining mapping information for the destination.

12. The method of claim 1 further comprising reallocating the bandwidth from the higher priority media pool to the lower priority media pool upon termination of the call.

13. The method of claim 1 wherein the call is a reservation for another call.

14. The method of claim 1 wherein the media pools include at least a voice pool, a video pool, and a data conferencing pool.

15. The method of claim 14 wherein the voice pool is a higher priority than the video pool, and the video pool is a higher priority than the data conferencing pool.

16. An apparatus for managing bandwidth in a distributed telephony system, comprising:
a settings manager configured to:
receive an offer message from a first endpoint to connect a call between the first endpoint and a second endpoint, the offer message including a first media settings list for the first endpoint, the first media settings list identifying one or more media types requested by the first endpoint for the call;
determine a filtered media preferences list based on the first media settings list for the first endpoint and a second media settings list for the apparatus, the filtered media preferences list identifying one or more media types requested for the call;
send an invite message from the apparatus to a destination, the invite message including the filtered media preferences list; and
receive an answer message from the destination, the answer message including a call settings list that includes actual media settings that will be used to connect the call;
a bandwidth manager communicatively coupled to the settings manager, the bandwidth manager configured to:
allocate bandwidth to media pools based on the first filtered media preferences list, each of the media pools associated with a different type of media, wherein allocating bandwidth includes determining that there is insufficient bandwidth for a higher priority media pool and allocating bandwidth from a lower priority media pool to the higher priority media pool.

17. The apparatus of claim 16 wherein the apparatus is a Voice over Internet Protocol (VoIP) switch to which the first endpoint is directly coupled.

18. The apparatus of claim 16 wherein the apparatus is a conference bridge.

19. The apparatus of claim 16 wherein the settings manager is further configured to:
retrieve mapping coordinates at the apparatus; and
determine mapping information for the destination.

20. A non-transitory computer readable medium comprising computer program code for managing bandwidth in a distributed telephony system, comprising:
code for receiving at a source an offer message from a first endpoint to connect a call between the first endpoint and a second endpoint, the offer message including a first media settings list for the first endpoint, the first media settings list identifying one or more media types requested by the first endpoint for the call;
code for determining a filtered media preferences list based on the first media settings list for the first endpoint and a second media settings list for a source, the filtered media preferences list identifying one or more media types requested for the call;
code for allocating bandwidth to media pools based on the first filtered media preferences list, each of the media pools associated with a different type of media, wherein allocating bandwidth includes determining that there is insufficient bandwidth for a higher priority media pool and allocating bandwidth from a lower priority media pool to the higher priority media pool;
code for sending an invite message from the source to a destination, the invite message including the filtered media preferences list; and
code for receiving an answer message from the destination, the answer message including a call settings list that includes actual media settings that will be used to connect the call.

* * * * *